(12) United States Patent
Yamazaki et al.

(10) Patent No.: US 12,197,682 B2
(45) Date of Patent: Jan. 14, 2025

(54) ELECTRONIC DEVICE

(71) Applicant: SEMICONDUCTOR ENERGY LABORATORY CO., LTD., Atsugi (JP)

(72) Inventors: Shunpei Yamazaki, Tokyo (JP); Jun Ishikawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 18/432,393

(22) Filed: Feb. 5, 2024

(65) Prior Publication Data
US 2024/0211077 A1 Jun. 27, 2024

Related U.S. Application Data

(63) Continuation of application No. 17/004,518, filed on Aug. 27, 2020, now Pat. No. 11,899,886, which is a
(Continued)

(30) Foreign Application Priority Data

Feb. 28, 2014 (JP) .................. 2014-039913
Mar. 7, 2014 (JP) .................. 2014-045237

(51) Int. Cl.
*G06F 1/16* (2006.01)
*G06F 1/26* (2006.01)
(Continued)

(52) U.S. Cl.
CPC ............ *G06F 3/044* (2013.01); *G06F 1/1635* (2013.01); *G06F 1/1641* (2013.01);
(Continued)

(58) Field of Classification Search
CPC .... G06F 1/1635; G06F 1/1641; G06F 1/1643; G06F 1/1652; G06F 1/1683; G06F 1/26; G06F 1/263
See application file for complete search history.

(56) References Cited

U.S. PATENT DOCUMENTS 5,339,091 A   8/1994   Yamazaki et al.
5,475,398 A   12/1995  Yamazaki et al.
(Continued)

FOREIGN PATENT DOCUMENTS

CN   002724074 Y   9/2005
CN   002862088 Y   1/2007
(Continued)

OTHER PUBLICATIONS

International Search Report (Application No. PCT/IB2015/051210) Dated May 12, 2015.
(Continued)

*Primary Examiner* — Anthony M Haughton
(74) *Attorney, Agent, or Firm* — NIXON PEABODY LLP; Jeffrey L. Costellia

(57) ABSTRACT

An electronic device having a novel structure is provided. A battery is provided in each component of an electronic device, whereby the electronic device includes two batteries. The electronic device including the two batteries and a display portion that can be called a flexible display and has a plurality of foldable portions is provided as a novel device.

7 Claims, 33 Drawing Sheets

Related U.S. Application Data continuation of application No. 16/197,650, filed on Nov. 21, 2018, now Pat. No. 10,809,784, which is a continuation of application No. 15/497,252, filed on Apr. 26, 2017, now Pat. No. 10,139,879, which is a continuation of application No. 14/631,370, filed on Feb. 25, 2015, now Pat. No. 9,710,033.

(51) Int. Cl.
  *G06F 3/044* (2006.01)
  *G06F 3/0488* (2022.01)
  *G09G 3/3225* (2016.01)
  *H05K 5/00* (2006.01)
  *H05K 7/00* (2006.01)
  *G09G 3/20* (2006.01)

(52) U.S. Cl.
  CPC .......... *G06F 1/1643* (2013.01); *G06F 1/1652* (2013.01); *G06F 1/1683* (2013.01); *G06F 1/26* (2013.01); *G06F 1/263* (2013.01); *G06F 3/0488* (2013.01); *G09G 3/3225* (2013.01); *G09G 3/2096* (2013.01); *G09G 2300/0426* (2013.01); *G09G 2310/0221* (2013.01); *G09G 2330/02* (2013.01); *G09G 2370/08* (2013.01)

(56) References Cited

U.S. PATENT DOCUMENTS

| | | | |
|---|---|---|---|
| 5,596,567 A | 1/1997 | DeMuro et al. | |
| 5,778,325 A | 7/1998 | Lindell et al. | |
| 5,963,012 A | 10/1999 | Garcia et al. | |
| 6,127,799 A | 10/2000 | Krishnan | |
| 6,223,990 B1 | 5/2001 | Kamei | |
| 6,372,608 B1 | 4/2002 | Shimoda et al. | |
| 6,509,217 B1 | 1/2003 | Reddy | |
| 6,737,302 B2 | 5/2004 | Arao | |
| 6,791,457 B2 | 9/2004 | Shimura | |
| 6,828,727 B2 | 12/2004 | Yamazaki | |
| 6,837,438 B1 | 1/2005 | Takasugi et al. | |
| 7,027,110 B2 | 4/2006 | Akiyama et al. | |
| 7,181,164 B2 | 2/2007 | Lee et al. | |
| 7,242,445 B2 | 7/2007 | Akiyama et al. | |
| 7,274,168 B2 | 9/2007 | Tsukamoto et al. | |
| 7,408,698 B1 | 8/2008 | Kuo et al. | |
| 7,446,757 B2 | 11/2008 | Mochizuki et al. | |
| 7,471,062 B2 | 12/2008 | Bruning | |
| 7,479,346 B1 | 1/2009 | Chow et al. | |
| 7,705,565 B2 | 4/2010 | Patino et al. | |
| 7,782,274 B2 | 8/2010 | Manning | |
| 7,787,917 B2 | 8/2010 | Aoki et al. | |
| 7,843,169 B1 | 11/2010 | Tsukamoto et al. | |
| 7,855,879 B2 | 12/2010 | Kim | |
| 7,864,151 B1 | 1/2011 | Yamazaki et al. | |
| 8,170,631 B2 | 5/2012 | Aoki et al. | |
| 8,736,162 B2 | 5/2014 | Jin et al. | |
| 8,803,816 B2 | 8/2014 | Kilpatrick, II et al. | |
| 8,825,121 B2 | 9/2014 | Aoki et al. | |
| 8,836,611 B2 | 9/2014 | Kilpatrick, II et al. | |
| 8,860,632 B2 | 10/2014 | Kilpatrick, II et al. | |
| 8,860,765 B2 | 10/2014 | Kilpatrick, II et al. | |
| 8,863,038 B2 | 10/2014 | King et al. | |
| 8,866,840 B2 | 10/2014 | Dahl et al. | |
| 8,890,771 B2* | 11/2014 | Pance | G06F 3/01 345/5 |
| 8,929,085 B2 | 1/2015 | Franklin et al. | |
| 8,933,874 B2 | 1/2015 | Lundqvist et al. | |
| 8,947,320 B2 | 2/2015 | King et al. | |
| 9,009,984 B2* | 4/2015 | Caskey | H04M 1/0247 33/355 R |
| 9,013,884 B2 | 4/2015 | Fukuma et al. | |
| 9,111,841 B2 | 8/2015 | Yamazaki et al. | |
| 9,129,537 B1 | 9/2015 | Lorenzini et al. | |
| 9,164,354 B2 | 10/2015 | Ahlstedt et al. | |
| 9,229,481 B2 | 1/2016 | Jinbo | |
| 9,257,560 B2 | 2/2016 | Adachi et al. | |
| 9,269,914 B2 | 2/2016 | Yamazaki et al. | |
| 9,274,562 B2 | 3/2016 | Franklin et al. | |
| 9,287,341 B2* | 3/2016 | Cheon | H10K 59/351 |
| 9,351,237 B2 | 5/2016 | Selim | |
| 9,356,049 B2 | 5/2016 | Ikeda et al. | |
| 9,356,246 B2 | 5/2016 | Kawata | |
| 9,367,093 B2 | 6/2016 | Pance | |
| 9,377,817 B2 | 6/2016 | Eguchi | |
| 9,395,070 B2 | 7/2016 | Endo | |
| 9,406,898 B2 | 8/2016 | Yamazaki et al. | |
| 9,431,618 B2 | 8/2016 | Kawata et al. | |
| 9,448,592 B2 | 9/2016 | Jin et al. | |
| 9,460,643 B2 | 10/2016 | Hirakata et al. | |
| 9,543,533 B2 | 1/2017 | Yamazaki et al. | |
| 9,565,366 B2 | 2/2017 | Yamazaki et al. | |
| 9,572,268 B2 | 2/2017 | Yamazaki et al. | |
| 9,697,941 B2 | 7/2017 | Lee | |
| 9,710,033 B2 | 7/2017 | Yamazaki et al. | |
| 9,778,689 B2 | 10/2017 | Song et al. | |
| 9,830,844 B2 | 11/2017 | Pance | |
| 10,054,988 B2 | 8/2018 | Jin et al. | |
| 10,139,660 B2* | 11/2018 | Hirakata | G02F 1/133308 |
| 10,528,084 B2 | 1/2020 | Jin et al. | |
| 10,657,857 B2 | 5/2020 | Pance | |
| 10,809,784 B2* | 10/2020 | Yamazaki | G06F 1/1683 |
| 11,314,284 B2* | 4/2022 | Kim | H04M 1/022 |
| 11,737,223 B2* | 8/2023 | Lee | H04M 1/0216 361/809 |
| 11,956,002 B2* | 4/2024 | Cho | G06F 1/1616 |
| 2002/0027636 A1 | 3/2002 | Yamada | |
| 2002/0049714 A1 | 4/2002 | Yamazaki et al. | |
| 2003/0032210 A1 | 2/2003 | Takayama et al. | |
| 2003/0231001 A1 | 12/2003 | Bruning | |
| 2004/0128246 A1 | 7/2004 | Takayama et al. | |
| 2004/0145454 A1 | 7/2004 | Powell et al. | |
| 2004/0160213 A1 | 8/2004 | Stanesti et al. | |
| 2004/0183958 A1 | 9/2004 | Akiyama et al. | |
| 2005/0012842 A1 | 1/2005 | Miyagawa et al. | |
| 2005/0162131 A1 | 7/2005 | Sennami et al. | |
| 2005/0194926 A1 | 9/2005 | Di Stefano | |
| 2005/0215119 A1 | 9/2005 | Kaneko | |
| 2005/0254183 A1 | 11/2005 | Ishida et al. | |
| 2006/0009251 A1 | 1/2006 | Noda et al. | |
| 2006/0125973 A1 | 6/2006 | Akiyama et al. | |
| 2006/0284593 A1 | 12/2006 | Nagy et al. | |
| 2007/0241199 A1 | 10/2007 | Yamazaki et al. | |
| 2008/0058029 A1 | 3/2008 | Sato et al. | |
| 2008/0210762 A1 | 9/2008 | Osada et al. | |
| 2009/0239320 A1 | 9/2009 | Takayama et al. | |
| 2010/0060664 A1 | 3/2010 | Kilpatrick, II et al. | |
| 2010/0064244 A1 | 3/2010 | Kilpatrick, II et al. | |
| 2010/0066643 A1 | 3/2010 | King et al. | |
| 2010/0085382 A1 | 4/2010 | Lundqvist et al. | |
| 2010/0238620 A1 | 9/2010 | Fish | |
| 2011/0126141 A1 | 5/2011 | King et al. | |
| 2011/0210922 A1 | 9/2011 | Griffin | |
| 2012/0038570 A1* | 2/2012 | Delaporte | G06F 1/1679 345/173 |
| 2012/0217516 A1 | 8/2012 | Hatano et al. | |
| 2013/0010405 A1 | 1/2013 | Rothkopf et al. | |
| 2013/0083496 A1* | 4/2013 | Franklin | G06F 3/0412 361/752 |
| 2013/0099757 A1 | 4/2013 | Ham | |
| 2013/0170126 A1 | 7/2013 | Lee | |
| 2014/0097786 A1 | 4/2014 | Grimes et al. | |
| 2014/0111954 A1* | 4/2014 | Lee | H04M 1/0268 361/749 |
| 2014/0132854 A1 | 5/2014 | Wu et al. | |
| 2014/0247544 A1 | 9/2014 | Ryu | |
| 2014/0266033 A1 | 9/2014 | Jeong et al. | |
| 2014/0307314 A1 | 10/2014 | Yanagisawa et al. | |
| 2014/0321074 A1 | 10/2014 | Chida et al. | |
| 2014/0327624 A1 | 11/2014 | Srinivas et al. | |
| 2014/0361980 A1 | 12/2014 | Iwaki et al. | |
| 2014/0375530 A1 | 12/2014 | Delaporte | |
| 2014/0375660 A1 | 12/2014 | Tamaki | |
| 2015/0009128 A1 | 1/2015 | Matsumoto | |

(56) References Cited

U.S. PATENT DOCUMENTS

| | | | |
|---|---|---|---|
| 2015/0014681 | A1 | 1/2015 | Yamazaki |
| 2015/0015195 | A1 | 1/2015 | Leabman et al. |
| 2015/0016126 | A1 | 1/2015 | Hirakata et al. |
| 2015/0022515 | A1 | 1/2015 | Ikeda et al. |
| 2015/0022561 | A1 | 1/2015 | Ikeda et al. |
| 2015/0022957 | A1 | 1/2015 | Hiroki et al. |
| 2015/0023030 | A1 | 1/2015 | Tsukamoto |
| 2015/0035777 | A1 | 2/2015 | Hirakata et al. |
| 2015/0062525 | A1 | 3/2015 | Hirakata |
| 2015/0103023 | A1 | 4/2015 | Iwaki |
| 2015/0140397 | A1 | 5/2015 | Tajima et al. |
| 2015/0144920 | A1 | 5/2015 | Yamazaki et al. |
| 2015/0146069 | A1 | 5/2015 | Yamazaki et al. |
| 2015/0146352 | A1 | 5/2015 | Yanagisawa et al. |
| 2015/0154730 | A1 | 6/2015 | Hirakata et al. |
| 2015/0155528 | A1 | 6/2015 | Takahashi et al. |
| 2015/0155530 | A1 | 6/2015 | Takahashi et al. |
| 2015/0222141 | A1 | 8/2015 | Yamazaki |
| 2015/0227248 | A1 | 8/2015 | Yamazaki et al. |
| 2015/0233557 | A1 | 8/2015 | Aoyama et al. |
| 2015/0243962 | A1 | 8/2015 | Hiroki et al. |
| 2015/0250038 | A1 | 9/2015 | Sakuishi et al. |
| 2016/0232856 | A1 | 8/2016 | Hidaka et al. |
| 2018/0110139 | A1* | 4/2018 | Seo .................. H05K 5/0017 |
| 2018/0120895 | A1 | 5/2018 | Tucker et al. |
| 2019/0339742 | A1* | 11/2019 | Jia .................... G06F 1/1681 |

FOREIGN PATENT DOCUMENTS

| | | | |
|---|---|---|---|
| CN | 102150096 | A | 8/2011 |
| CN | 103259339 | A | 8/2013 |
| EP | 3125067 | A | 2/2017 |
| EP | 3190476 | A | 7/2017 |
| EP | 3444702 | A | 2/2019 |
| JP | 62-147022 | A | 9/1987 |
| JP | 63-015796 | A | 1/1988 |
| JP | 10-084406 | A | 3/1998 |
| JP | 10-307898 | A | 11/1998 |
| JP | 2000-090220 | A | 3/2000 |
| JP | 2001-067446 | A | 3/2001 |
| JP | 2003-006592 | A | 1/2003 |
| JP | 2003-070187 | A | 3/2003 |
| JP | 2003-299255 | A | 10/2003 |
| JP | 2003-309490 | A | 10/2003 |
| JP | 2004-135135 | A | 4/2004 |
| JP | 2004-343410 | A | 12/2004 |
| JP | 2005-004498 | A | 1/2005 |
| JP | 2005-114759 | A | 4/2005 |
| JP | 2005-149238 | A | 6/2005 |
| JP | 2005-316724 | A | 11/2005 |
| JP | 2005-352434 | A | 12/2005 |
| JP | 2006-004015 | A | 1/2006 |
| JP | 2006-243621 | A | 9/2006 |
| JP | 2007-018504 | A | 1/2007 |
| JP | 2007-066619 | A | 3/2007 |
| JP | 2008-293680 | A | 12/2008 |
| JP | 2010-511373 | | 4/2010 |
| JP | 2010-099122 | A | 5/2010 |
| JP | 2012-502321 | | 1/2012 |
| JP | 2012-085104 | A | 4/2012 |
| JP | 2013-015835 | A | 1/2013 |
| JP | 2013-231982 | A | 11/2013 |
| JP | 2013-257420 | A | 12/2013 |
| JP | 2014-068153 | A | 4/2014 |
| KR | 2010-0091857 | A | 8/2010 |
| KR | 2011-0052743 | A | 5/2011 |
| KR | 2011-0055718 | A | 5/2011 |
| KR | 10-1284496 | | 7/2013 |
| TW | 201024977 | | 7/2010 |
| TW | 201312327 | | 3/2013 |
| TW | M453869 | | 5/2013 |
| WO | WO-2001/053919 | | 7/2001 |
| WO | WO-2004/111808 | | 12/2004 |
| WO | WO-2008/083361 | | 7/2008 |
| WO | WO-2010/028394 | | 3/2010 |
| WO | WO-2010/028397 | | 3/2010 |
| WO | WO-2010/028399 | | 3/2010 |
| WO | WO-2010/028402 | | 3/2010 |
| WO | WO-2010/028403 | | 3/2010 |
| WO | WO-2010/028404 | | 3/2010 |
| WO | WO-2010/028405 | | 3/2010 |
| WO | WO-2010/028406 | | 3/2010 |
| WO | WO-2010/028407 | | 3/2010 |
| WO | WO-2011/085080 | | 7/2011 |

OTHER PUBLICATIONS

Written Opinion (Application No. PCT/IB2015/051210) Dated May 12, 2015.
Taiwanese Office Action (Application No. 104106053) Dated Dec. 6, 2018.
Taiwanese Office Action (Application No. 108112923) Dated May 21, 2021.
Taiwanese Office Action (Application No. 110148405) Dated Feb. 15, 2023.
Chinese Office Action (Application No. 202110187437.0) Dated Oct. 21, 2023.

* cited by examiner

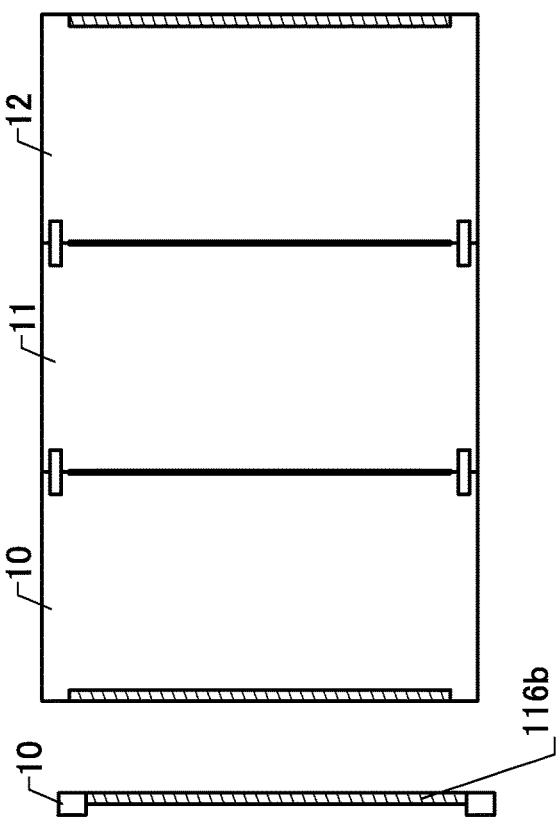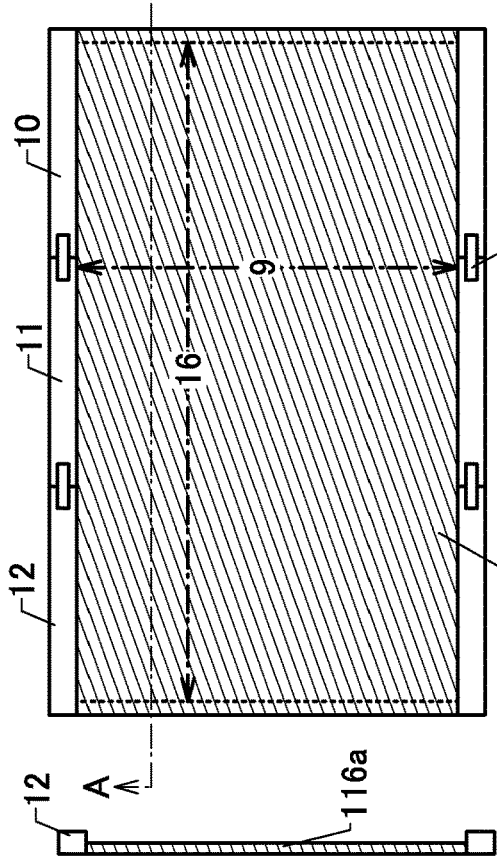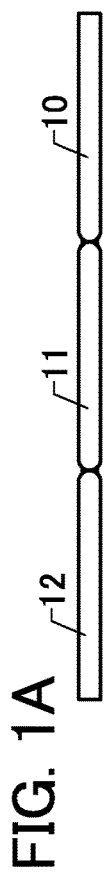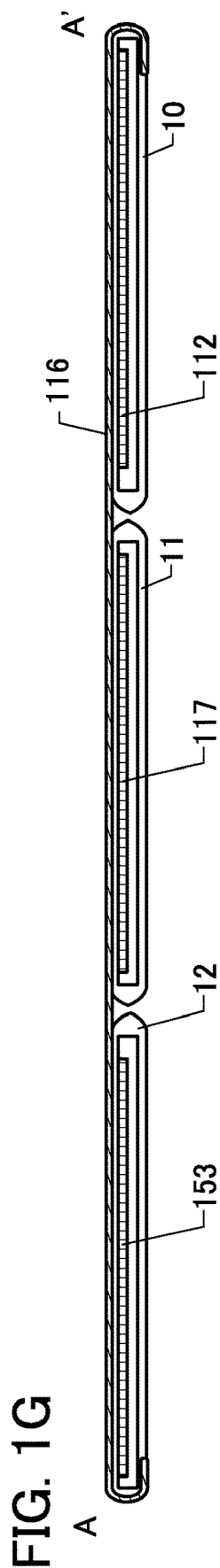

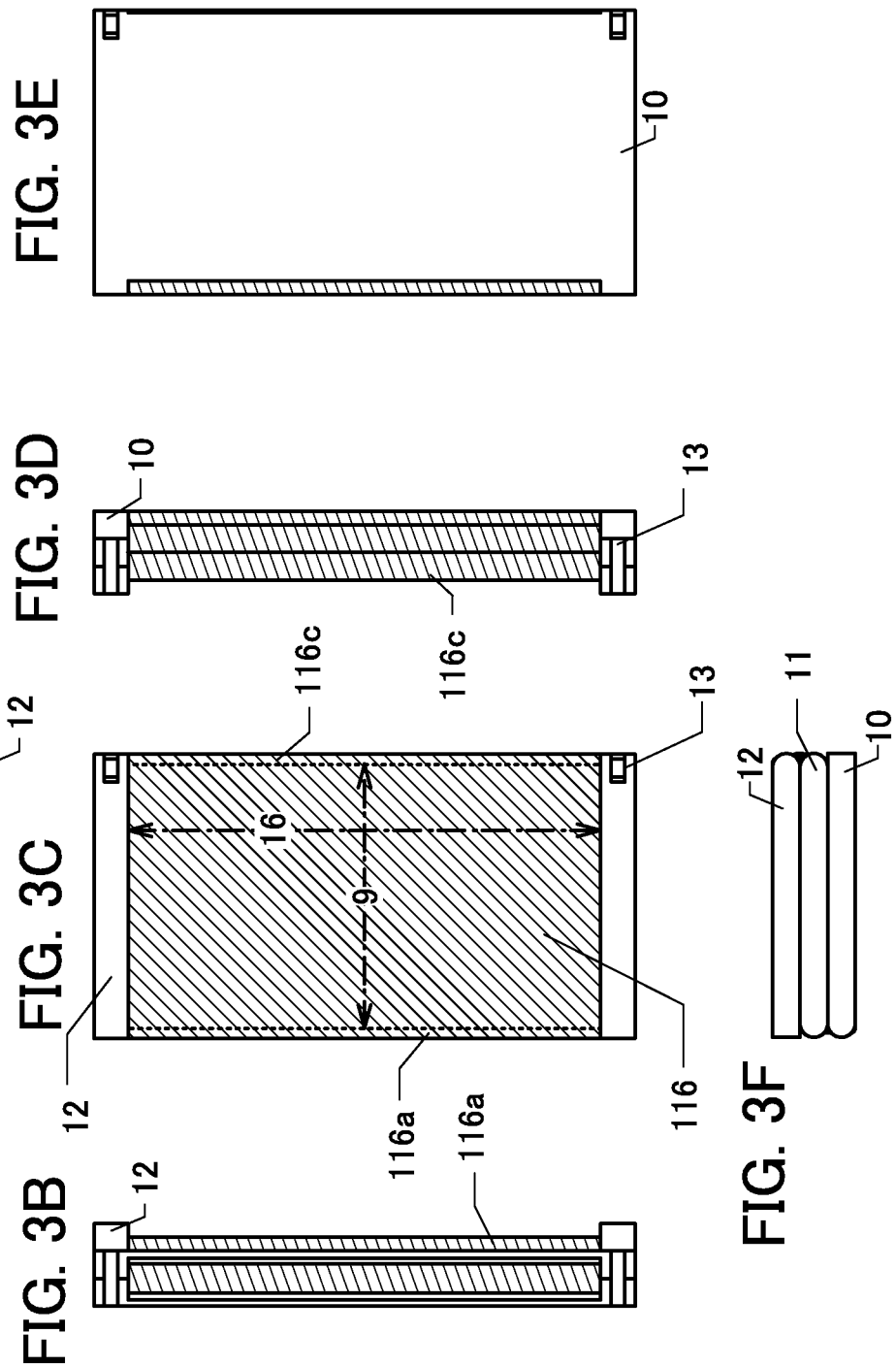

FIG. 11A1
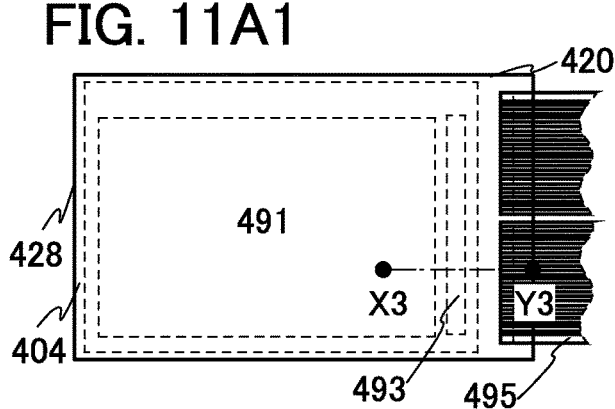
FIG. 11A2
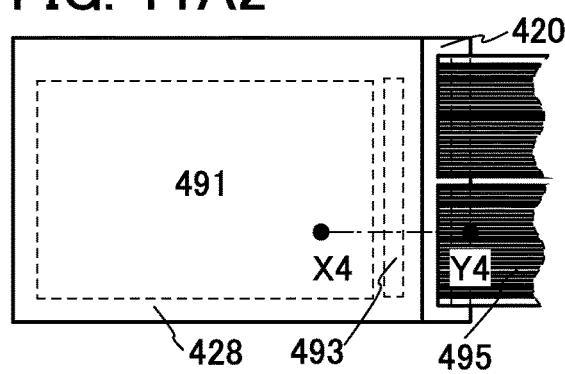
FIG. 11B
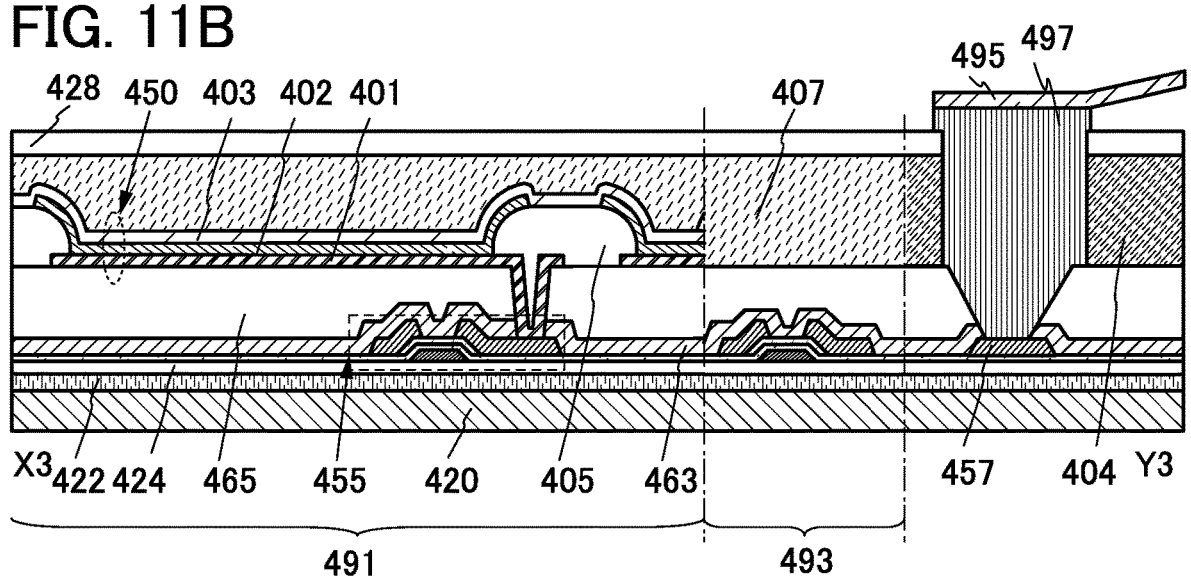
FIG. 11C
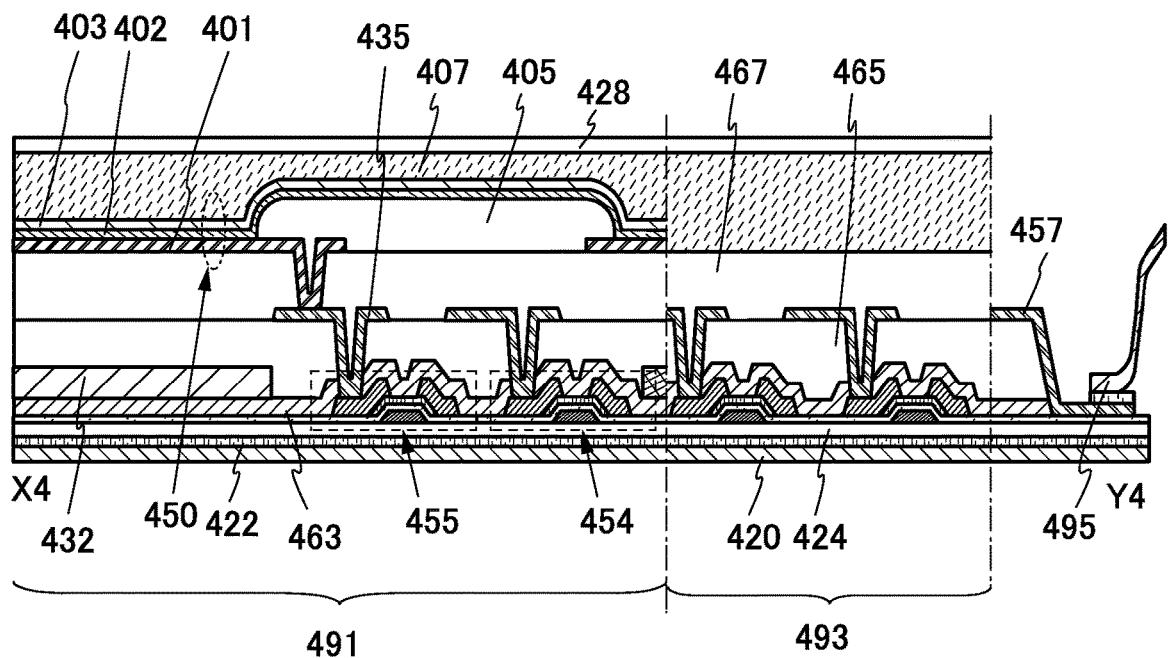

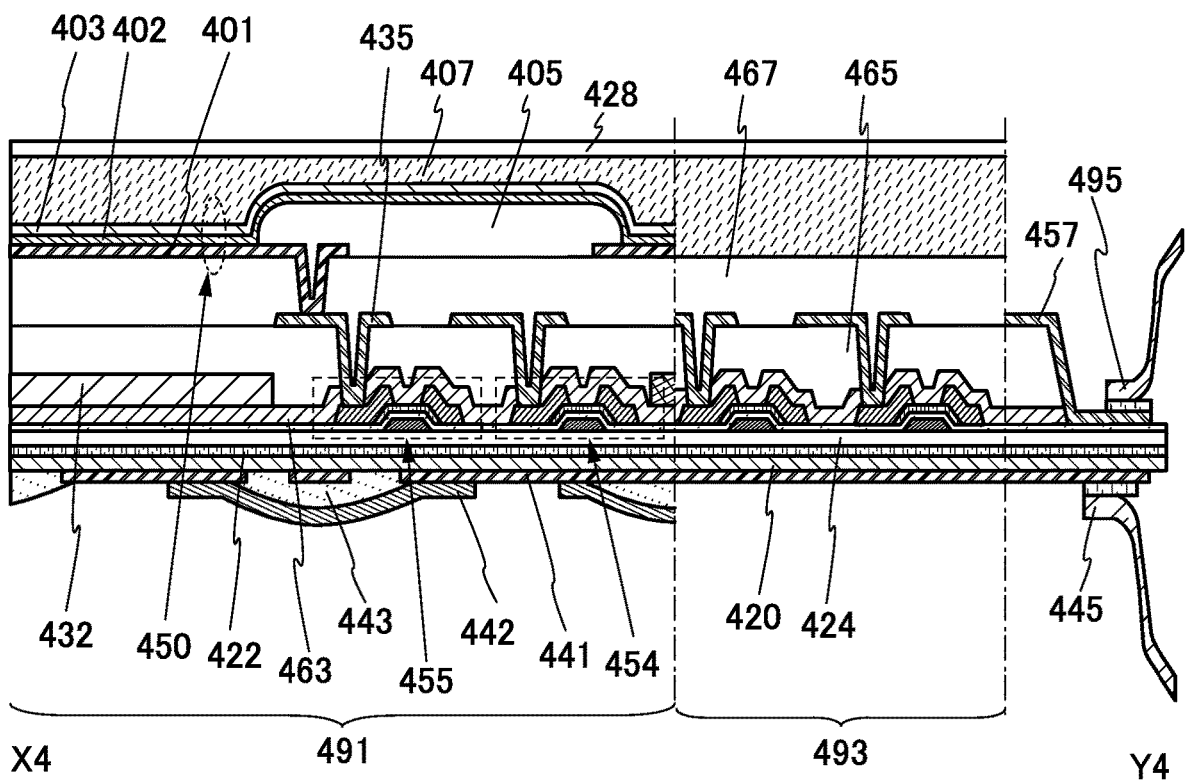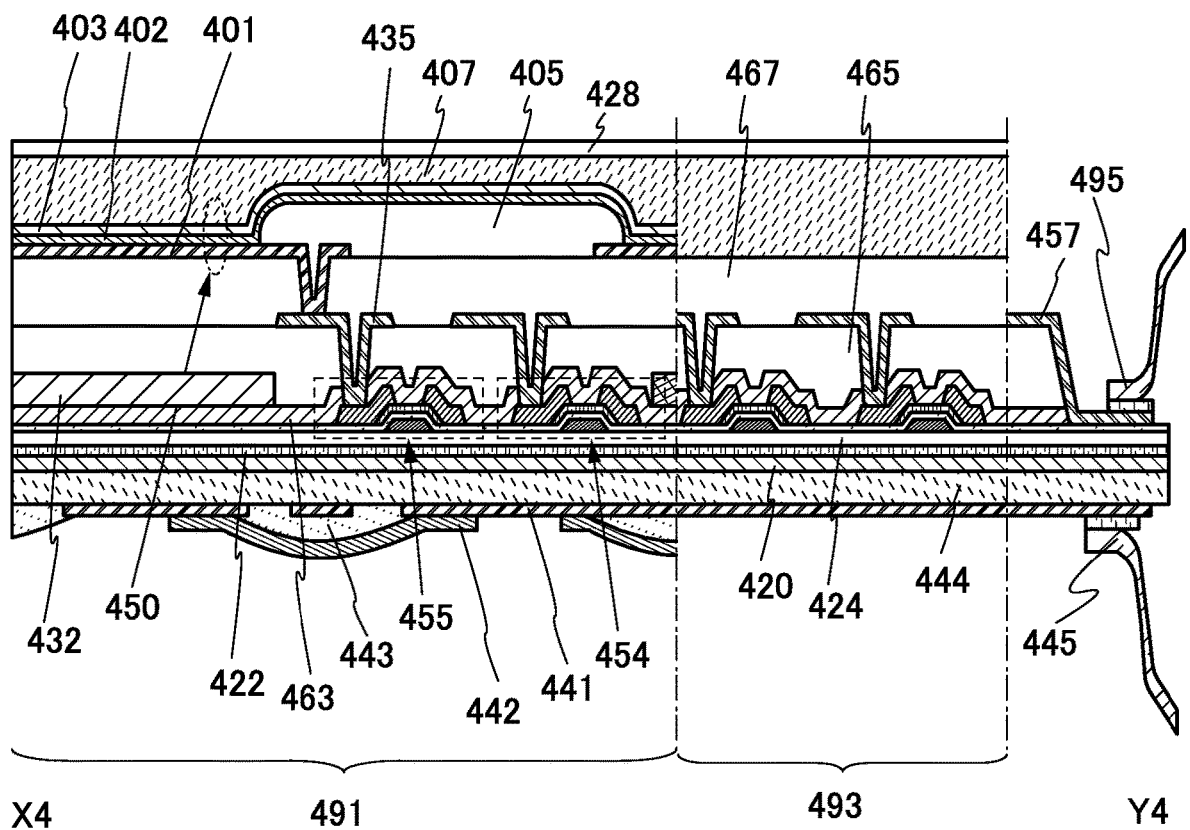

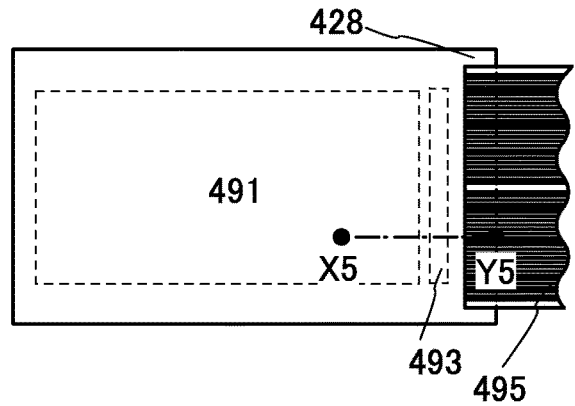
FIG. 13A1
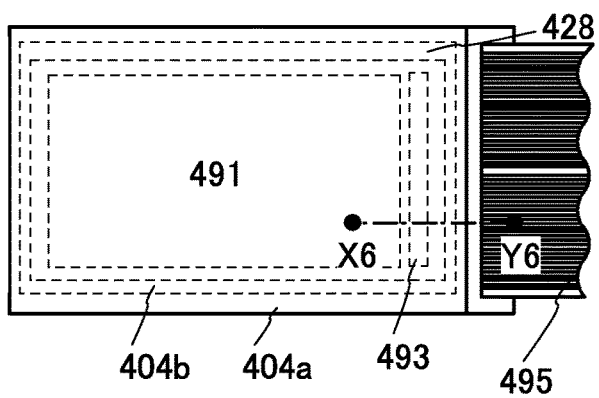
FIG. 13A2
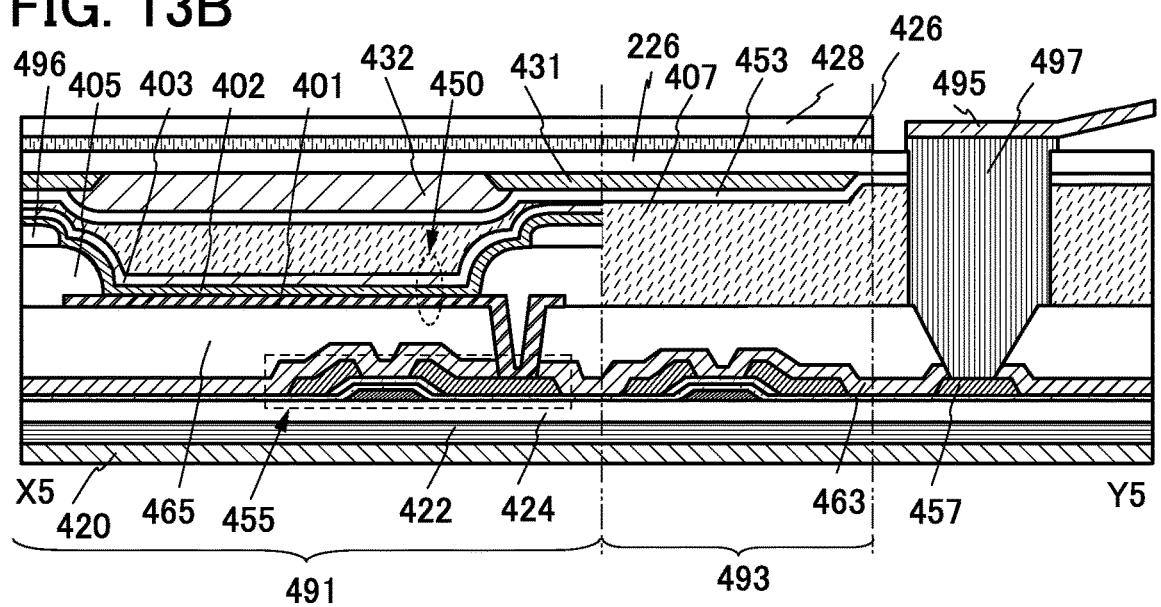
FIG. 13B
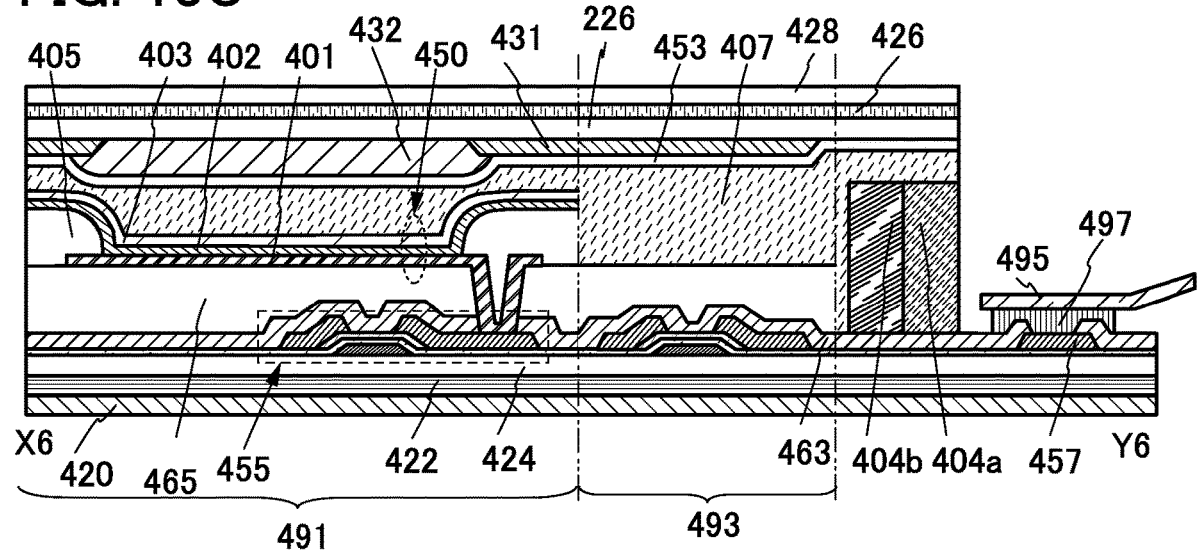
FIG. 13C

500

FIG. 16A
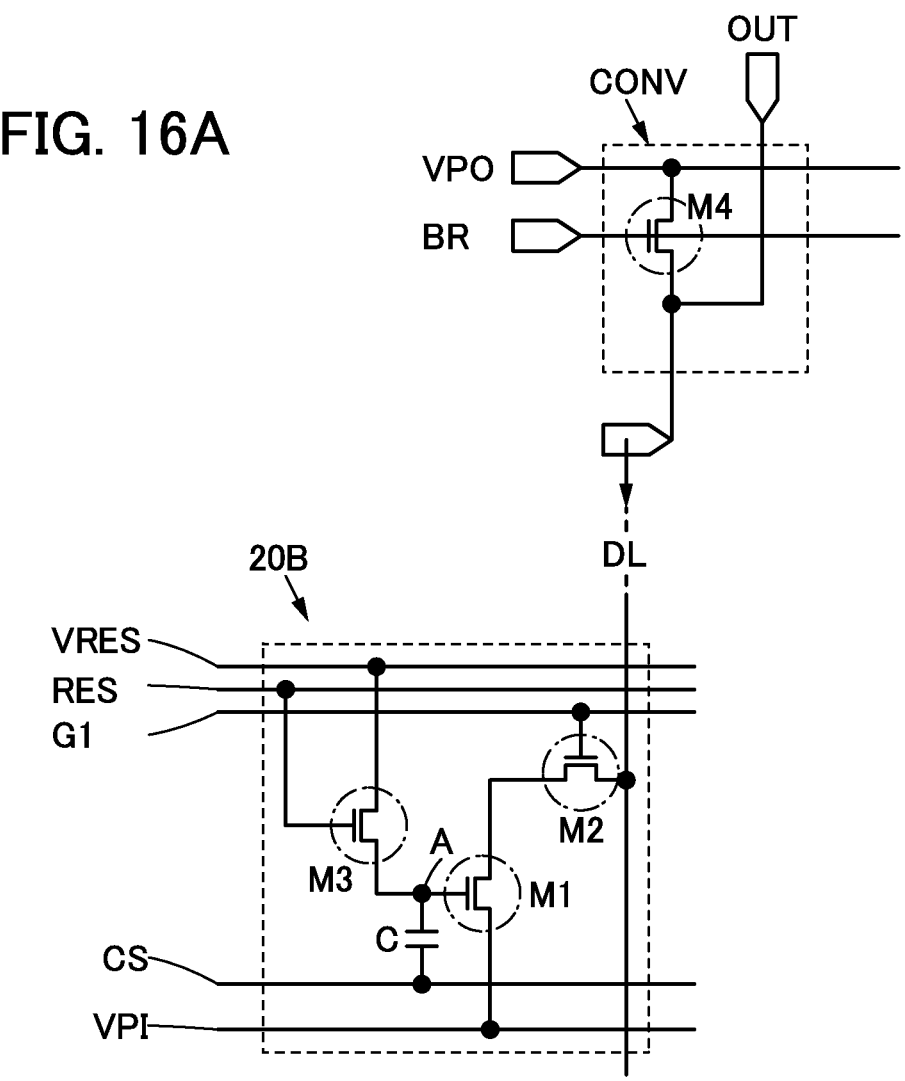
FIG. 16B1
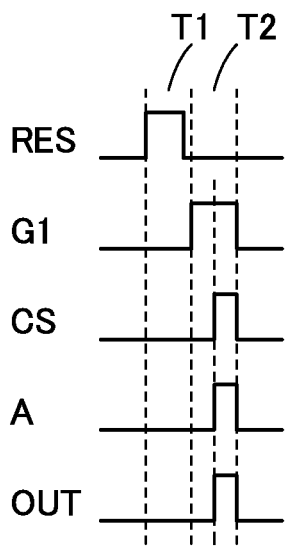
FIG. 16B2
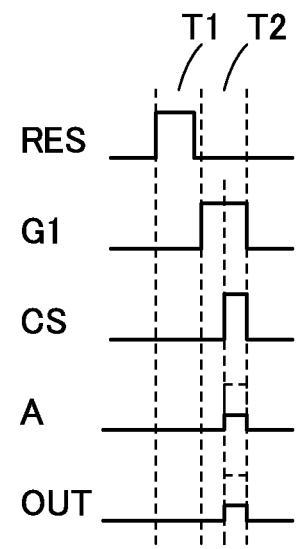

ELECTRONIC DEVICE

TECHNICAL FIELD

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. One embodiment of the present invention relates to an electronic device and an operation system thereof.

Note that electronic devices in this specification generally mean devices including secondary batteries, and electro-optical devices including secondary batteries, information terminal devices including secondary batteries, and the like are all electronic devices.

BACKGROUND ART

Portable electronic devices and wearable electronic devices are under active development. For example, a thin portable electronic book is disclosed in Patent Document 1.

Portable electronic devices and wearable electronic devices save power as much as possible because they operate using batteries as power sources. Particularly in the case where an electronic device includes a central processing unit (CPU), processing by the CPU, which consumes much power in operation, significantly influences power consumption.

REFERENCE

[Patent Document 1] Japanese Published Patent Application No. S63-15796

DISCLOSURE OF INVENTION

A portable electronic device needs to withstand extended use and thus incorporates high-capacity batteries. In that case, there occurs a problem that the size and weight of the electronic device are large. In view of this problem, a small and thin high-capacity battery that can be incorporated in a portable electronic device is under development. Note that in this specification, "a battery incorporated in an electronic device" means a battery that can be freely detached as a battery pack or the like as well as a battery incorporated so that it cannot be removed to be replaced.

When an electronic device is reduced in size and thickness, a battery is limited by the reduction in the size and thickness. Thus, a circuit, a battery, and the like need to be provided in a smaller space. The capacity of the battery, however, is reduced with decrease in the volume.

Furthermore, a battery generates heat by being charged or discharged and might thermally influence the surroundings.

An object is how to control power consumption and heat generation when an electronic device is downsized and a circuit, a battery, and the like are provided in a smaller space.

An electronic device having a novel structure, specifically, an electronic device having a novel structure that can change in appearance in various ways is provided.

Note that the descriptions of these objects do not disturb the existence of other objects. In one embodiment of the present invention, there is no need to achieve all the objects. Other objects will be apparent from and can be derived from the description of the specification, the drawings, the claims, and the like.

A battery is provided in each component of an electronic device, whereby the electronic device includes a plurality of power sources. An operation system that selectively drives only a component to be used enables power saving in the electronic device including the plurality of power sources.

The electronic device further includes a power management circuit (including a power supply monitor circuit) for managing the plurality of power sources.

A structure disclosed in this specification is an electronic device including a central processing unit, a display portion, a touch input portion, a first receiving portion and a second receiving portion, a first transmitting portion and a second transmitting portion, and a power management circuit. The central processing unit includes a first battery, the first receiving portion, and the first transmitting portion. The first receiving portion has a function of wirelessly charging the first battery. The display portion includes a second battery, the second receiving portion, and the second transmitting portion. The second receiving portion has a function of wirelessly charging the second battery. The touch input portion is electrically connected to the second battery. The power management circuit has a function of wirelessly transmitting power of one of the first battery and the second battery to the other so that the battery is charged.

Another structure is an electronic device including a central processing unit, a display portion, a touch input portion, a first receiving portion and a second receiving portion, a first transmitting portion and a second transmitting portion, and a power management circuit. The central processing unit includes a first battery, the first receiving portion, and the first transmitting portion. The first receiving portion has a function of wirelessly charging the first battery. The display portion includes a second battery, the second receiving portion, and the second transmitting portion. The second receiving portion has a function of wirelessly charging the second battery. The touch input portion includes a third battery, a third receiving portion, and a third transmitting portion. The power management circuit has a function of wirelessly transmitting power of any one of the first battery, the second battery, and the third battery to any one of the other batteries so that the battery is charged.

Note that a circuit is connected to each battery so that the battery can be wirelessly charged. At least each battery is electrically connected to the corresponding wireless receiving portion through the corresponding regulator.

A regulator is a kind of electronic circuit and refers to a circuit that controls output voltage or current such that it is kept constant. Regulators are classified into a linear regulator and a switching regulator according to the degree of power load. Note that a switching regulator is also called a DC-DC converter.

The batteries may each be further provided with a transmitting portion that can transmit power of one battery to any other battery so that the battery is charged. The power management circuit that manages the amount of power of each battery acquires data on the amount of remaining power of the battery regularly or constantly and adjusts power as appropriate.

In a device such as a mobile phone or an information terminal (e.g., a smartphone) provided with one power source (battery), all the functions are stopped when the power source is turned off. When the power source is on, a slight amount of power is consumed even if there is a functional circuit that is not in use because the device is in a standby state. If there is a functional circuit that is not in use, the electrical connection between the functional circuit not in use and the battery may be interrupted to save the power.

As the touch input portion, a capacitive touch sensor can be used, for example. Examples of capacitive touch sensors include a surface capacitive touch sensor and a projected capacitive touch sensor. Examples of projected capacitive touch sensors include a self capacitive touch sensor and a mutual capacitive touch sensor, which differ mainly in the driving method. The use of a mutual capacitive type is preferable because multiple points can be sensed simultaneously. Note that a variety of sensors (e.g., an optical sensor using a photoelectric conversion element, a pressure sensor using a pressure element) that can sense the approach or the contact of a sensing target such as a finger may be used. Input operation of the touch input portion in this specification is not necessarily performed by touching the display portion with a finger or the like. The touch input portion in this specification includes, in its category, a device for which input operation can be performed without contact and by bringing a finger close to the display portion.

As the touch input portion, an active touch sensor including a capacitor and a transistor using an oxide semiconductor layer (also referred to as an OS transistor) may be used. In particular, the use of an OS transistor in an active touch sensor enables the potential of a node to be maintained for a long time, reducing the frequency of refresh operations.

An operation system that appropriately selects the battery for a component to be used among the plurality of batteries in the electronic device and determines the battery to be used and reduces power consumption of the battery not to be used. Consequently, the length of time when the information terminal can be used per charge can be increased.

Furthermore, the power management circuit may perform control such that power is supplied to the battery connected to a function that is desired to be used from any other battery connected to a function that is not used. An operation system that appropriately selects the battery for a component to be used from among the plurality of batteries in the electronic device and adjusts the amount of power in each battery can extend the length of time when the function to be used can be used. When the power management circuit secures any of the batteries as an emergency power supply by the power management circuit, the electronic device can be used in emergency. For a mobile phone or the like, for example, an image is displayed on the display portion when the power supply is turned on; accordingly, if there is not enough power to display an image on the display portion, a phone call cannot be made in some cases. In the case where the electronic device has a plurality of batteries one of which is secured as an emergency power supply by the power management circuit and the emergency power supply is available only for a communication function while power supply to the display portion is stopped, a phone call can be made without displaying an image on the display portion.

Furthermore, in the case where a single large-sized battery is used for an electronic device having a curved surface or complex shape, the placement of the battery is limited, and the large-sized battery may degrade the design. In addition, if small-sized batteries are dotted about, the risk of explosion and the like can be suppressed; therefore, the safety is higher than the case where a large-sized battery is used.

Specifically, an electronic device including two batteries and a display portion that can be called a flexible display and has a plurality of foldable portions can be proposed as a novel device. The novel device is an electronic device including a central processing unit, a display portion, a touch input portion, and a power management circuit. The display portion is bendable and includes a first region, a second region, and a third region. The first region overlaps with the central processing unit. The second region and a first battery partly overlap with each other in the state where the display portion is unfolded. The third region and a second battery partly overlap with each other in the state where the display portion is unfolded. The first battery has a region not overlapping with the second battery in the state where the display portion is bent.

This novel device can be small by bending the display portion into an S shape. The novel device can be thin when the first battery is provided so as not to overlap with the second battery in the state where the display portion is bent (also called the state where the display portion is folded). In that case, the size of the first battery is larger than that of the second battery.

In the case where the user carries around and drops an electronic device having only a single large-sized battery, breakage of the battery makes all the functions of the electronic device unavailable. In the case where a plurality of small-sized batteries are included, even if one of them is broken, some of the functions are still available as long as at least one of the small-sized batteries can be used. In this manner, in an electronic device including a plurality of small-sized batteries, each of which is used for a different component, some of its functions are available even if some of its functions are broken. Thus, an electronic device that hardly becomes out of order can be obtained.

Furthermore, even when one of the small-sized batteries is broken or its amount of power becomes zero, another battery can be used as a substitute, owing to the power management circuit, which makes it possible for the electronic device to be used continuously. Furthermore, even when the amount of power of one of the small-sized batteries becomes zero, power can be supplied from a transmitting portion connected to another battery by wireless charging, owing to the power management circuit. In this manner, the electronic device can be used for a long period. In other words, an electronic device including a power management circuit that enables mutual supply of power among a plurality of batteries can be obtained.

A battery is a device that deteriorates as the number of charges increases. Owing to the power management circuit adjusting the number of charges or selecting batteries to be used, the usage period of batteries can be extended. In addition, by monitoring the degree of deterioration of batteries by the power management circuit and appropriately selecting batteries to be used depending on the degree of deterioration by the power management circuit, the usage period of the electronic device can be extended.

It is preferred that at least one of the plurality of small-sized batteries provided in the electronic device be a secondary battery that can be wirelessly charged.

As the secondary battery, one or more kinds selected from the following can be used: a lithium-ion secondary battery such as a lithium polymer battery, a lithium-ion capacitor, an electric double layer capacitor, and a redox capacitor. The electronic device includes an antenna that wirelessly receives power and a control means that supplies the received power to a functional circuit.

The antenna included in the electronic device constitutes a communication module that realizes a wireless charging function. The communication module may use a charging method corresponding to a standard such as Qi or Powermat. At the time of charge, a plurality of batteries may be charged at a time. The antenna included in the electronic device may constitute a communication module that realizes a near field wireless communication function.

In the case where a plurality of kinds of sensors are included in an electronic device, since a battery is provided for each component to be used, the user can selectively attach the sensor the user wants to use or detach the sensor. For example, if a control circuit that can control sensors such as a pulse sensor, a temperature sensor, a positional information sensor (e.g., a GPS), an acceleration sensor, and an angular velocity sensor, and a connection portion (a connection socket) to connect the sensor and the control circuit are provided in an electronic device, which is used while being worn on the arm, the user can select the sensor depending on the function the user wants to use, and the sensor may be connected to the electronic device. In that case, each of the sensors has a small-sized battery and a regulator, and the larger number of functions are used, the larger number of small-sized batteries are connected. Thus, an electronic device having a plurality of small-sized batteries is obtained.

If a transistor using an oxide semiconductor layer is used for a regulator, reduction in power consumption can be achieved since the off-state current is small. In particular, a regulator (DC-DC converter) including a control circuit using OS transistors can operate at a temperature of 150° C. or higher. Thus, such a DC-DC converter of an embodiment is preferably used for an electronic device that is likely to operate at high temperatures.

An oxide semiconductor used for the oxide semiconductor layer to be a channel formation region of the OS transistor preferably contains at least indium (In) or zinc (Zn). In particular, In and Zn are preferably contained. A stabilizer for strongly bonding oxygen is preferably contained in addition to In and Zn. As a stabilizer, at least one of gallium (Ga), tin (Sn), zirconium (Zr), hafnium (Hf), and aluminum (Al) may be contained.

As another stabilizer, one or more kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As the oxide semiconductor layer used for the OS transistor, for example, any of the following oxides can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf-Al—Zn-based oxide.

For example, an In-Ga-Zn-based oxide with an atomic ratio of In:Ga:Zn=1:1:1, In:Ga:Zn=3:1:2, or In:Ga:Zn=2:1:3, or an oxide with an atomic ratio close to the above atomic ratios can be used.

If an oxide semiconductor film used for a channel formation region contains a large amount of hydrogen, the hydrogen and the oxide semiconductor are bonded to each other, so that part of the hydrogen serves as a donor and causes generation of an electron that is a carrier. As a result, the threshold voltage of the transistor shifts in the negative direction. It is therefore preferred that after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Therefore, it is preferred that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment, and treatment for making the oxygen content of an oxide semiconductor film be in excess of that in the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film that is extremely close to an i-type oxide semiconductor film. Note that "substantially intrinsic" means that the oxide semiconductor film contains extremely few (close to zero) carriers derived from a donor and has a carrier density of lower than or equal to $1\times10^{17}/cm^3$, lower than or equal to $1\times10^{16}/cm^3$, lower than or equal to $1\times10^{15}/cm^3$, lower than or equal to $1\times10^{14}/cm^3$, or lower than or equal to $1\times10^{13}/cm^3$.

Thus, the transistor including an i-type or substantially i-type oxide semiconductor film can have extremely favorable off-state current characteristics. For example, the off-state drain current of the transistor including the oxide semiconductor film can be $1\times10^{-18}$ A or less, preferably $1\times10^{-21}$ A or less, more preferably $1\times10^{-24}$ A or less at room temperature (approximately 25° C.), or $1\times10^{-15}$ A or less, preferably $1\times10^{-18}$ A or less, more preferably $1\times10^{-21}$ A or less at 85° C. The off state of a transistor refers to a state where a gate voltage is much lower than the threshold voltage in an n-channel transistor. Specifically, the transistor is off when the gate voltage is lower than the threshold voltage by 1 V or more, 2 V or more, or 3 V or more.

An oxide semiconductor that is formed may include a non-single crystal, for example. An oxide semiconductor may include CAAC, for example. Note that an oxide semiconductor including CAAC is referred to as a c-axis aligned crystalline oxide semiconductor (CAAC-OS). The CAAC-OS film is one of oxide semiconductor films having a plurality of c-axis aligned crystal parts. With a transmission electron microscope (TEM), a combined analysis image (also referred to as a high-resolution TEM image) of a bright-field image and a diffraction pattern of the CAAC-OS film is observed. Consequently, a plurality of crystal parts are observed clearly. However, in the high-resolution TEM image, a boundary between crystal parts, that is, a grain boundary is not clearly observed. Thus, in the CAAC-OS film, a reduction in electron mobility due to the grain boundary is less likely to occur. According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film. On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts. In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly also includes the case where the angle is greater than or equal to 85° and less than or equal to 95°.

An electronic device with a plurality of power sources, in which a battery is provided for each of components to be used, also has a characteristic operation system. For example, the operation system includes a first battery, a second battery, a third battery, and a control portion that manages the first to third batteries, and can wirelessly charge the first to third batteries at a time. Furthermore, the operation system includes at least a plurality of power sources (e.g., secondary batteries) and a control portion such as a CPU, and the control portion manages power of the plurality of power sources. The number of control portion of the electronic device is not limited to one, and may be the same as the number of the plurality of power sources.

Furthermore, an operation system of an electronic device with a plurality of power sources includes a first battery, a second battery, a third battery, and a power management circuit that manages the first to third batteries, and the first battery wirelessly supplies power to the second battery or the third battery. The power management circuit monitors the amount of power of each battery, and can wirelessly charge one battery by supplying power from another battery automatically or by operation of a user as appropriate.

The electronic device is provided with a battery for each of the components to be used, and the operation system selectively drives only the component to be used, whereby power consumption can be reduced. Thus, an electronic device having a novel structure can be provided. Note that the description of these effects does not preclude the existence of other effects. One embodiment of the present invention does not necessarily have all the effects listed above. Other effects will be apparent from and can be derived from the description of the specification, the drawings, the claims, and the like.

BRIEF DESCRIPTION OF DRAWINGS

In the accompanying drawings:

FIGS. 1A to 1G illustrate an electronic device of one embodiment of the present invention that is unfolded: FIG. 1A is a top view; FIG. 1B is a left side view; FIG. 1C is a front view; FIG. 1D is a right side view; FIG. 1E is a back view; FIG. 1F is a bottom view; and FIG. 1G is a cross-sectional view;

FIGS. 3A to 3F illustrate an electronic device of one embodiment of the present invention;

FIGS. 11A1, 11A2, 11B, and 11C are plan views and cross-sectional views illustrating embodiments of the present invention;

FIGS. 12A and 12B are cross-sectional views illustrating one embodiment of the present invention;

FIGS. 13A1, 13A2, 13B, and 13C are plan views and cross-sectional views illustrating embodiments of the present invention;

FIGS. 16A, 16B1, and 16B2 illustrate the configuration and driving methods of a sensing circuit 19 and a converter CONV of one embodiment of the present invention;

BEST MODE FOR CARRYING OUT THE INVENTION

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to the description of the embodiments.

Embodiment 1

In this embodiment, examples of electronic devices each provided with a display portion including a plurality of bendable portions will be described as novel devices that are highly convenient or reliable with reference to FIGS. 1A to 1G, FIGS. 2A to 2C, FIGS. 3A to 3F, FIG. 4, FIGS. 5A to 5C, FIG. 6, FIGS. 17A to 17C, and FIGS. 18A to 18D. Components of the electronic devices will be described below. Note that these components cannot be clearly distinguished and one component also serves as another component or includes part of another component in some cases.

A user can manually select any of the following two modes for the electronic device of this embodiment: a mode of folding the device to make it small by bending the plurality of bendable portions of the display portion; and a mode of unfolding the display portion.

FIGS. 1A to 1G illustrate the unfolded electronic device. FIG. 1A is a top view. FIG. 1B is a left side view. FIG. 1C is a front view illustrating a surface where the display portion is viewed by a user. FIG. 1D is a right side view. FIG. 1E is a back view. FIG. 1F is a bottom view.

A display portion 116 is provided in such a manner that a main screen is positioned between a first bent region (also referred to as a side-rolled portion 116*a*) and a second bent region (also referred to as a side-rolled portion 116*b*) as illustrated in FIG. 1C.

The ratio of the length of a short side of a main screen of the display portion 116 to the length of a long side thereof is 0.9 times or more and 1.1 times or less the ratio of the length of a short side of a display region to the length of a long side thereof. For example, the ratio of the length of the short side to the length of the long side is approximately 9:16.

Figure 21:
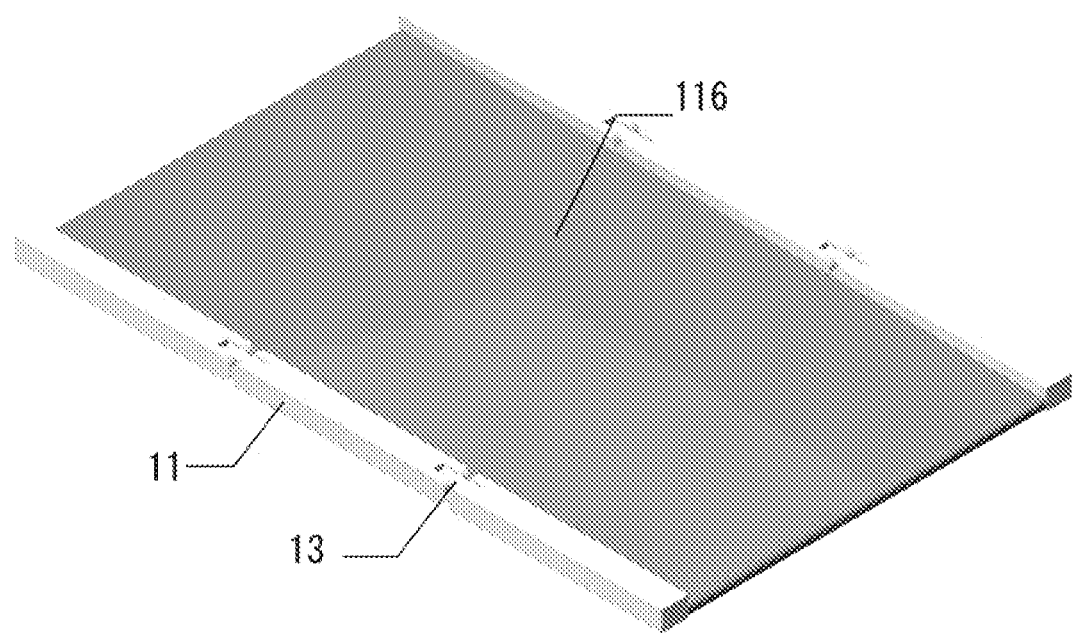
FIG. 21 is a perspective view illustrating an unfolded electronic device of one embodiment of the present invention.
Figure 22:
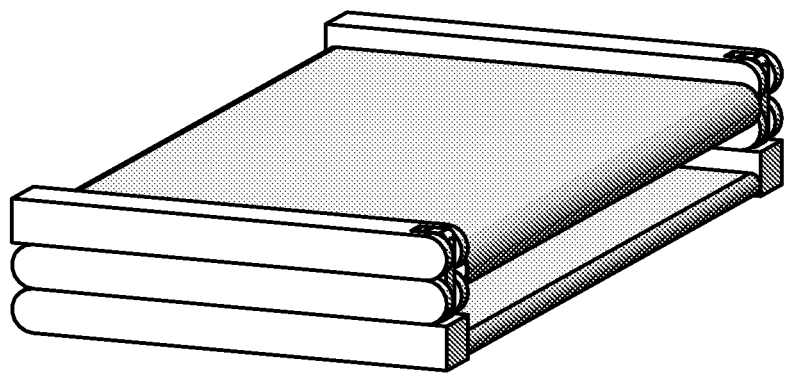
FIG. 22 is a perspective view illustrating a folded electronic device of one embodiment of the present invention.

FIG. 21 is a perspective view illustrating one example of an electronic device. The electronic device includes housings 10 to 12 connected with a plurality of hinges 13. Each gap between the housings overlaps with a bendable portion of the display portion 116, and the display portion 116 can be bent along the portion. FIG. 22 is a perspective view illustrating the electronic device folded to be small.

As illustrated in FIG. 1E, the display portion overlaps with part of side surfaces and part of the back surface of the electronic device, and the overlapping part is a constantly bent display region. The bent region of the display portion can be bent with a radius of curvature of 10 mm or less, preferably 8 mm or less, more preferably 5 mm or less, still more preferably 4 mm or less.

Figure 2A:
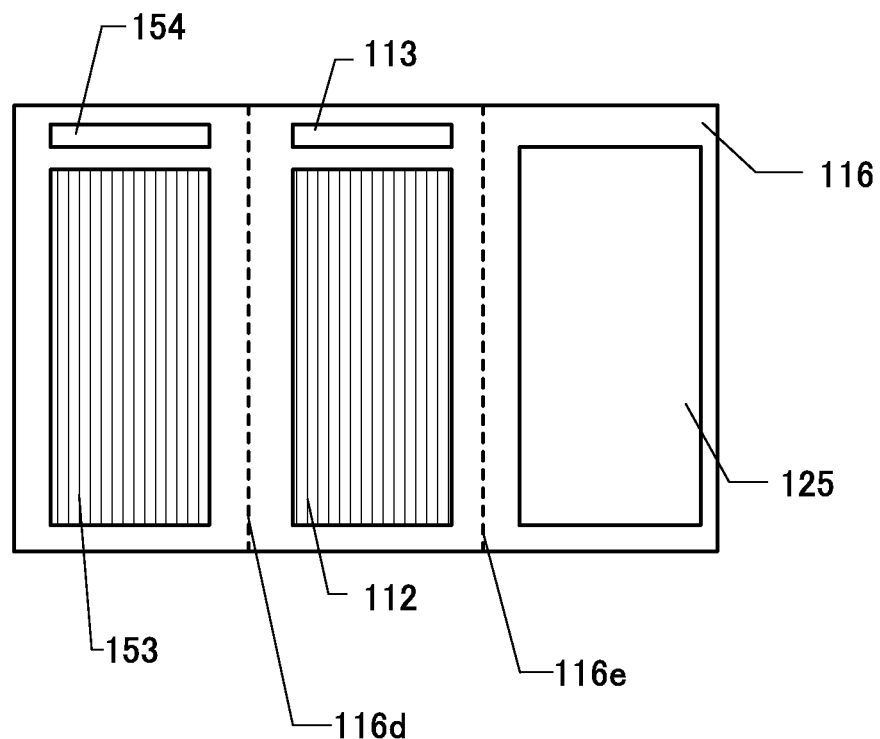
FIGS. 2A to 2C are a plan view and cross-sectional views illustrating one embodiment of the present invention.
Figure 2B:
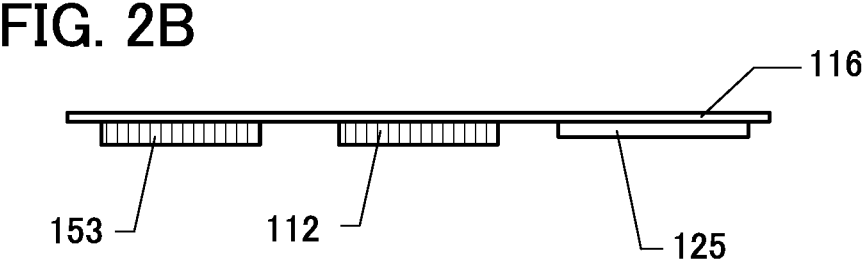
Figure 2C:
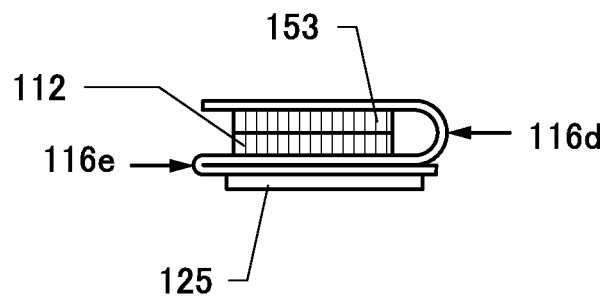
Figure 20A:
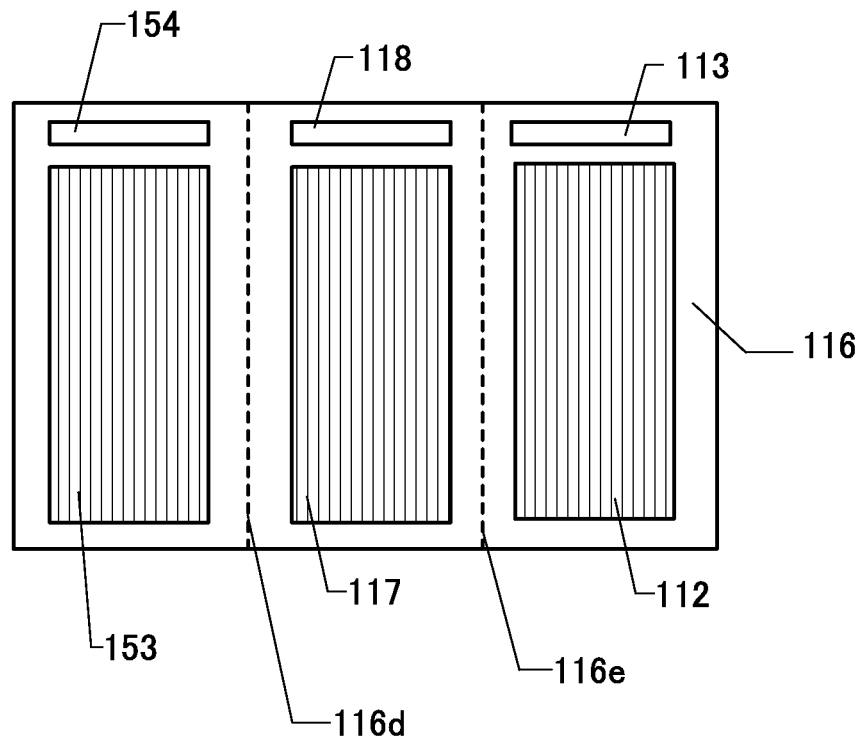
FIGS. 20A to 20C are a plan view and cross-sectional views illustrating one embodiment of the present invention.
Figure 20B:
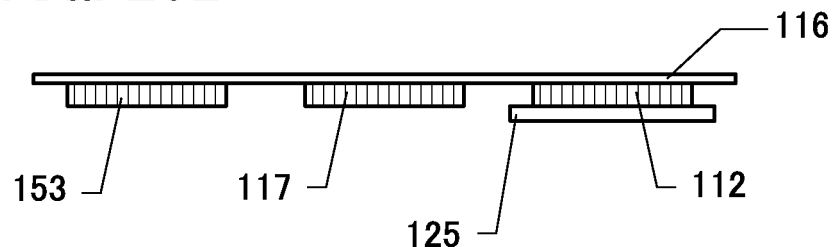
Figure 20C:
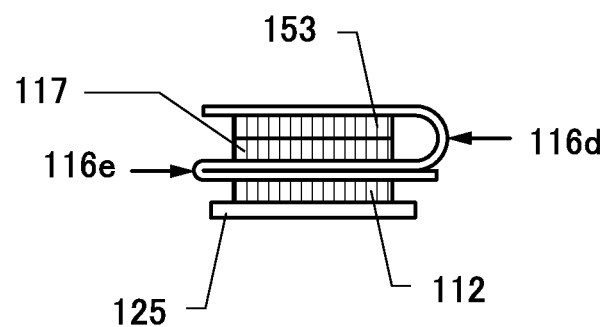

FIGS. 20A to 20C are a modification example of FIGS. 2A to 2C and illustrate three batteries. FIG. 1G is an enlarged cross-sectional view along A-A' in FIG. 1C of the electronic device including three batteries. As illustrated in FIG. 1G, batteries 112, 117, and 153 are provided in the respective housings.

The display panel in the above-described structure, which includes the display portion 116, can be changed in form with a radius of curvature of 1 mm or more, preferably 30 mm or more. A layer including a display element is sandwiched between two films. The bent display panel is sandwiched between two curves of the two films in cross section.

Figure 17A:
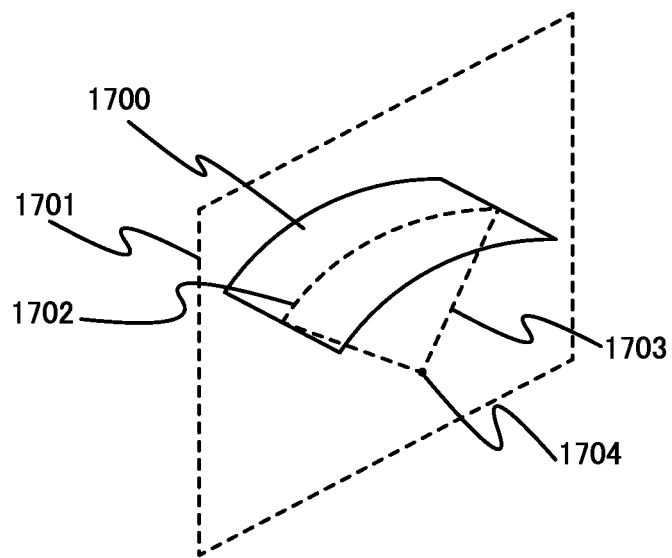
FIG. 17A to 17C illustrate the radius of curvature of a surface.
Figure 17B:
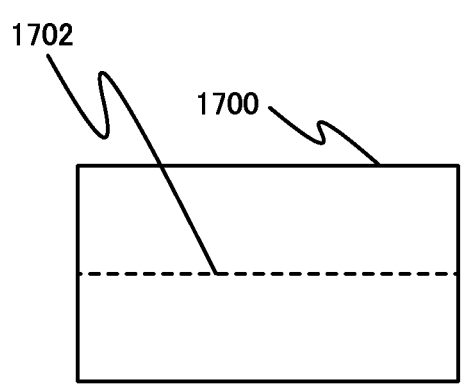
Figure 17C:
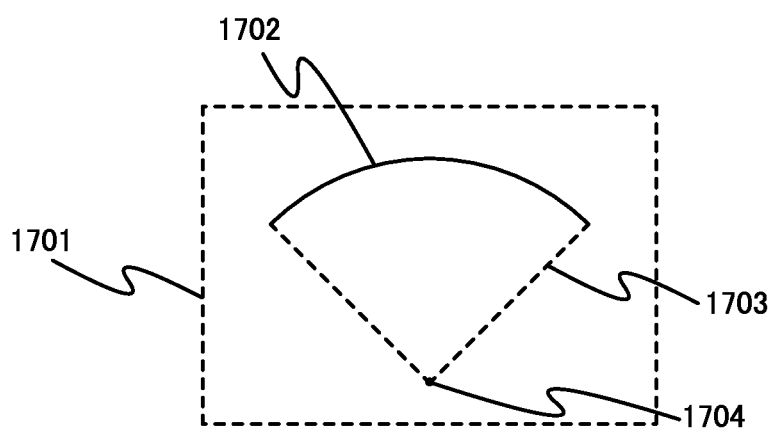

A description is given of the radius of curvature of a surface with reference to FIGS. 17A to 17C. In FIG. 17A, on a plane 1701 along which a curved surface 1700 is cut, part of a curve 1702 forming the curved surface 1700, is approximate to an arc of a circle, and the radius of the circle is referred to as a radius of curvature 1703 and the center of the circle is referred to as a center of curvature 1704. FIG. 17B is a top view of the curved surface 1700. FIG. 17C is a cross-sectional view of the curved surface 1700 taken along the plane 1701. When a curved surface is cut along a plane, the radius of curvature of a curve, which is a form of the curved surface, depends on along which plane the curved surface is cut. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 18A:
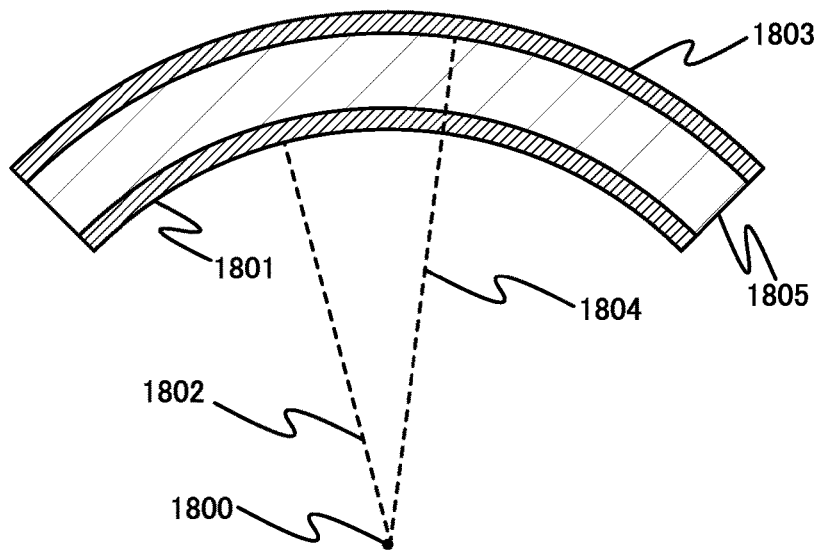
FIGS. 18A to 18D illustrate the center of curvature.
Figure 18B:
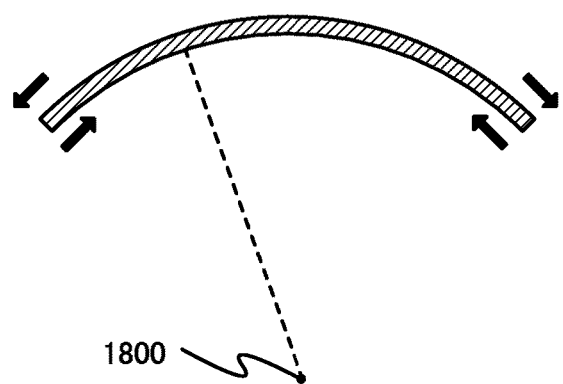

In the case of bending a display panel in which a layer 1805 including a display element is sandwiched between two films, a radius of curvature 1802 of a film 1801 close to a center of curvature 1800 of the display panel is smaller than a radius of curvature 1804 of a film 1803 far from the center of curvature 1800 (FIG. 18A). When the display panel is bent and has an arc-shaped cross section, compressive stress is applied to a surface of the film on the side closer to the center of curvature 1800 and tensile stress is applied to a surface of the film on the side farther from the center of curvature 1800 (FIG. 18B).

Figure 18C:
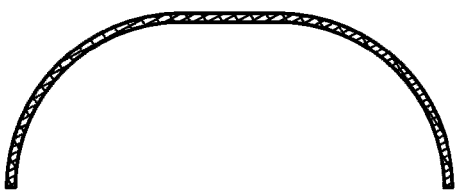
Figure 18D:

Note that the cross-sectional shape of the display panel is not limited to a simple arc shape, and the cross section can be partly arc-shaped; for example, a shape illustrated in FIG. 18C, a wavy shape illustrated in FIG. 18D, or an S shape can be used. When the curved surface of the display panel has a shape with a plurality of centers of curvature, the display panel can change its form such that a curved surface with the smallest radius of curvature among radii of curvature with respect to the plurality of centers of curvature, which is a surface of the film on the side closer to the center of curvature, has a curvature radius greater than or equal to 4 mm, preferably greater than or equal to 30 mm.

FIG. 2A is a schematic view illustrating the arrangement of the batteries and the display portion 116 of the back surface, which is not a display surface. A bendable portion 116*e* of the display portion that is indicated by a dotted line in FIG. 2A is located between the battery 112 and a system portion 125. A bendable portion 116*d* of the display portion that is indicated by a dotted line in FIG. 2A is located between the batteries 112 and 153. Note that the bendable portions of the display portion are shown by the straight lines in FIG. 2A. Fold lines are not necessarily formed, and the straight line schematically indicates a region that can have the smallest radius of curvature 1.

The battery 112 is electrically connected to a regulator 113, and the regulator 113 is electrically connected to the system portion 125 including a CPU. The regulator 113 may be connected to a receiving circuit or a transmitting circuit. FIGS. 2A and 2B illustrate an example where the batteries have substantially the same size; however, one embodiment of the present invention is not particularly limited to this example. For example, the thickness of the battery 112 electrically connected to a CPU with large power consumption may be larger than those of the other batteries so that the capacity of the battery 112 is increased.

The battery 153 is electrically connected to the regulator 154. The regulator 154 is electrically connected to a touch input portion and a display portion. The regulator 154 may be connected to a receiving circuit or a transmitting circuit.

FIG. 2B is a cross-sectional view of the electronic device in FIG. 2A and illustrates the positional relation of the system portion 125 including a CPU and each portion of the electronic device that is unfolded.

FIG. 2C illustrates the positional relation of the system portion 125 including a CPU and each portion of the electronic device that is bent. The bendable portions 116d and 116e of the display portion do not overlap with the batteries and are bent so that the electronic device is small.

FIGS. 3A to 3F illustrate the electronic device that is folded to be small. FIG. 22 is a perspective view of the electronic device. FIG. 3A is a top view of the electronic device. FIG. 3B is a left side view. FIG. 3C is a front view illustrating a surface where the display portion is viewed by a user. FIG. 3D is a right side view. FIG. 3E is a back view. FIG. 3F is a bottom view.

Also in the case where the electronic device is folded to be small, a main screen is positioned between a first bent region (also referred to as the side-rolled portion 116a) and the bendable region (also referred to as a side-rolled portion 116c) as illustrated in FIG. 3C.

The ratio of the length of a short side of the main screen of the display portion 116 to the length of a long side thereof is 0.9 times or more and 1.1 times or less the ratio of the length of a short side of the display region to the length of a long side thereof. For example, the ratio of the length of the short side to the length of the long side is approximately 9:16.

With such a structure, the second image having approximately the same ratio of the vertical length to the horizontal length as the first image that can be displayed so as to fit the first region of the folded display portion can be displayed so as to fit the display region of the unfolded display portion. Thus, the novel data processing device can be highly convenient or reliable.

Figure 4:
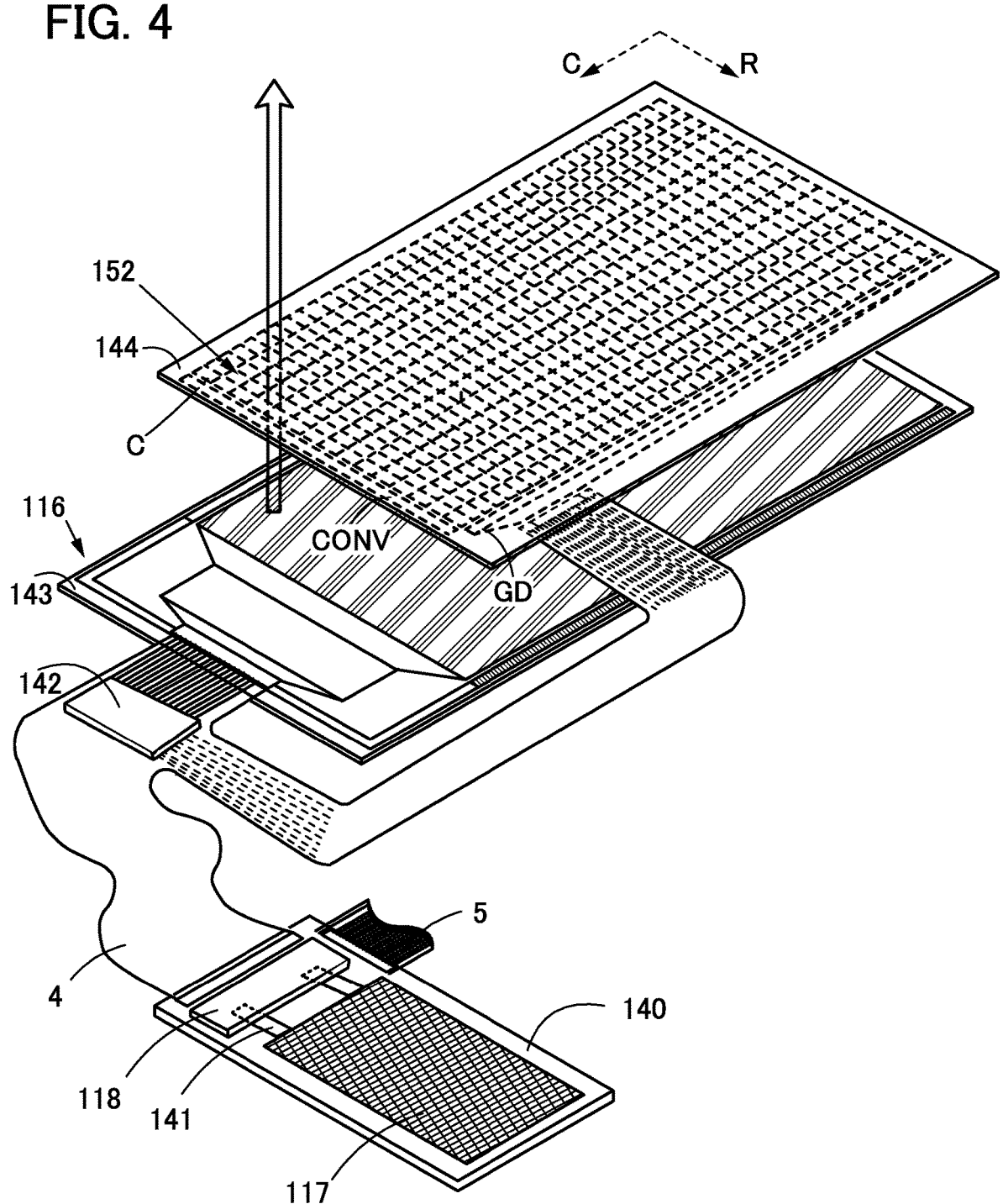
FIG. 4 is a perspective view illustrating part of the structure of an electronic device of one embodiment of the present invention.

FIG. 4 illustrates an example where a touch input portion and a display portion are electrically connected to one battery 117 with one FPC 4.

The display portion 116 includes two films, and a light-emitting element, part of a display driver circuit, a touch sensor 152, and part of a sensor driver circuit are provided between the two films. A separating layer is provided over a glass substrate, and a transistor and a light-emitting element are formed thereover. After that, the glass substrate is removed and a first flexible film 143 is bonded. In addition, a separating layer is provided over a glass substrate, and a transistor and the touch sensor 152 are formed thereover. After that, the glass substrate is removed and a second flexible film 144 is bonded. In the structure of FIG. 4, the second flexible film 144 is aligned with and bonded to the first flexible film 143, and the second flexible film 144 and the first flexible film 143 function as sealants of the light-emitting element.

On the circuit board 140, a lead electrode 141 of the battery 117 and the regulator 118 are electrically connected to each other, and the FPC 4 is connected to a connector on the circuit board 140. A layered lithium-ion secondary battery is used as the battery 117. The FPC 4 has branches and three terminals. A first terminal is connected to the connector on the circuit board 140. A second terminal is connected to a terminal of a touch panel. A third terminal is connected to a terminal of the display portion. Although an example where one FPC is used is described here, two or more FPCs may be used for connection.

Part of a driver circuit 142 is mounted on the FPC 4 and includes part of the sensor driver circuit and part of the driver circuit of the display portion. A circuit partly shared by a touch sensor driver circuit and the driver circuit of the display portion may be used. A video signal or the like to the display portion is supplied from a circuit connected to an end of an FPC 5, or may be supplied by wireless communication using a receiving circuit provided at the end of the FPC 5. An input signal of the touch sensor is supplied to the circuit connected to the end of the FPC 5, or may be supplied to a CPU or the like by wireless communication using a transmitting circuit provided at the end of the FPC 5.

Figure 5A:
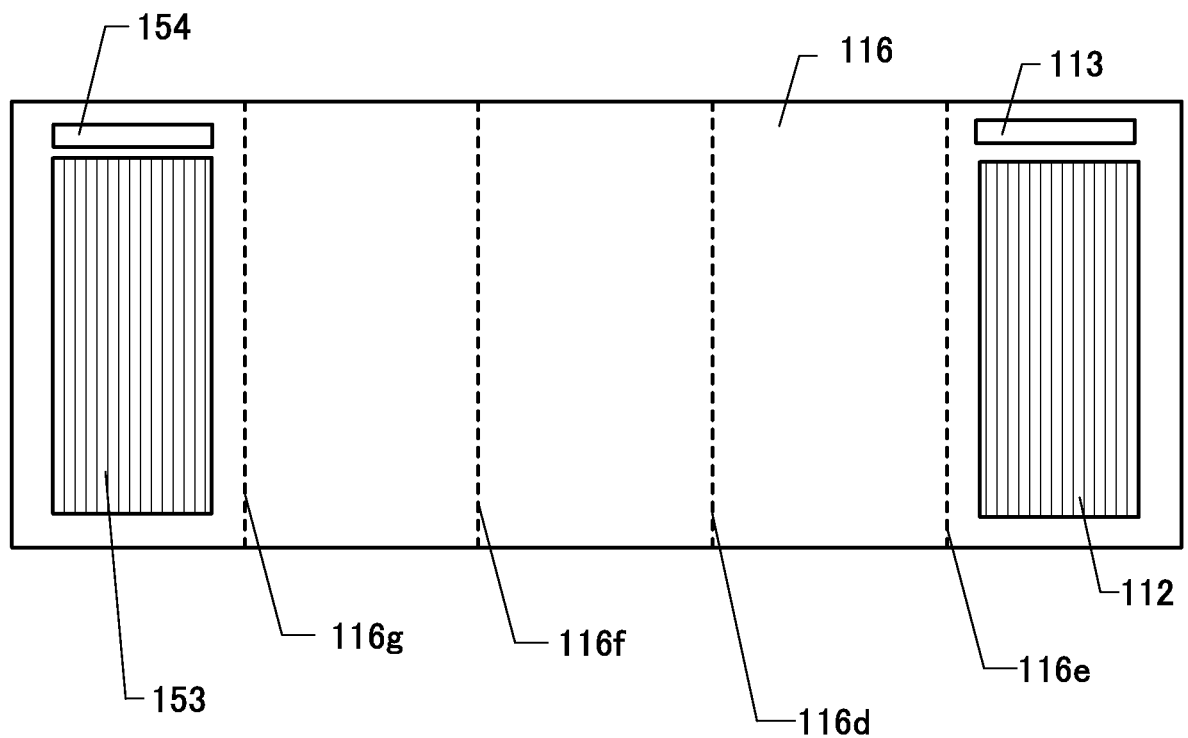
FIGS. 5A to 5C are a plan view and cross-sectional views illustrating one embodiment of the present invention.
Figure 5B:
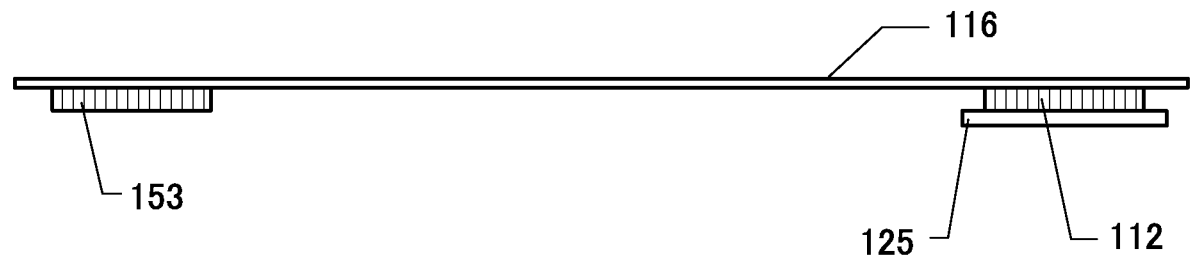
Figure 5C:
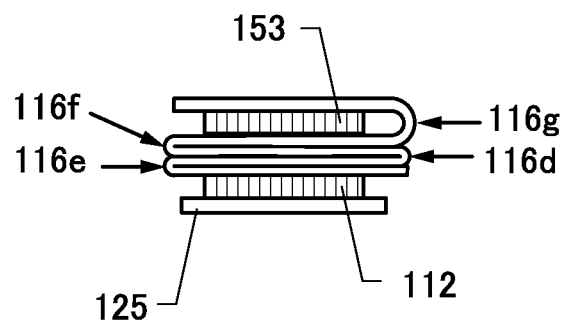

One embodiment of the present invention is not limited to the electronic device that can be bent along two portions of the display portion as in FIGS. 2A to 2C, and an electronic device of one embodiment of the present invention may be bent along three or more portions of the display portion. FIGS. 5A to 5C illustrate an example of an electronic device that can be bent along four portions. Further providing bendable portions 116g and 116f of the display portion can increase the display area of the display portion. FIG. 5B is a cross-sectional view of the electronic device in FIG. 5A and illustrates the positional relation of the system portion 125 including a CPU and each portion of the electronic device that is unfolded. FIG. 5C illustrates the positional relation of the system portion 125 including a CPU and each portion of the electronic device that is bent. The bendable portions 116d, 116e, 116f, and 116g of the display portion do not overlap with batteries and are bent so that the electronic device is small. It can be said that a user can easily hold with both hands the electronic device illustrated in FIGS. 5A to 5C that is unfolded because the batteries are arranged at respective end portions of the display portion.

Figure 6:
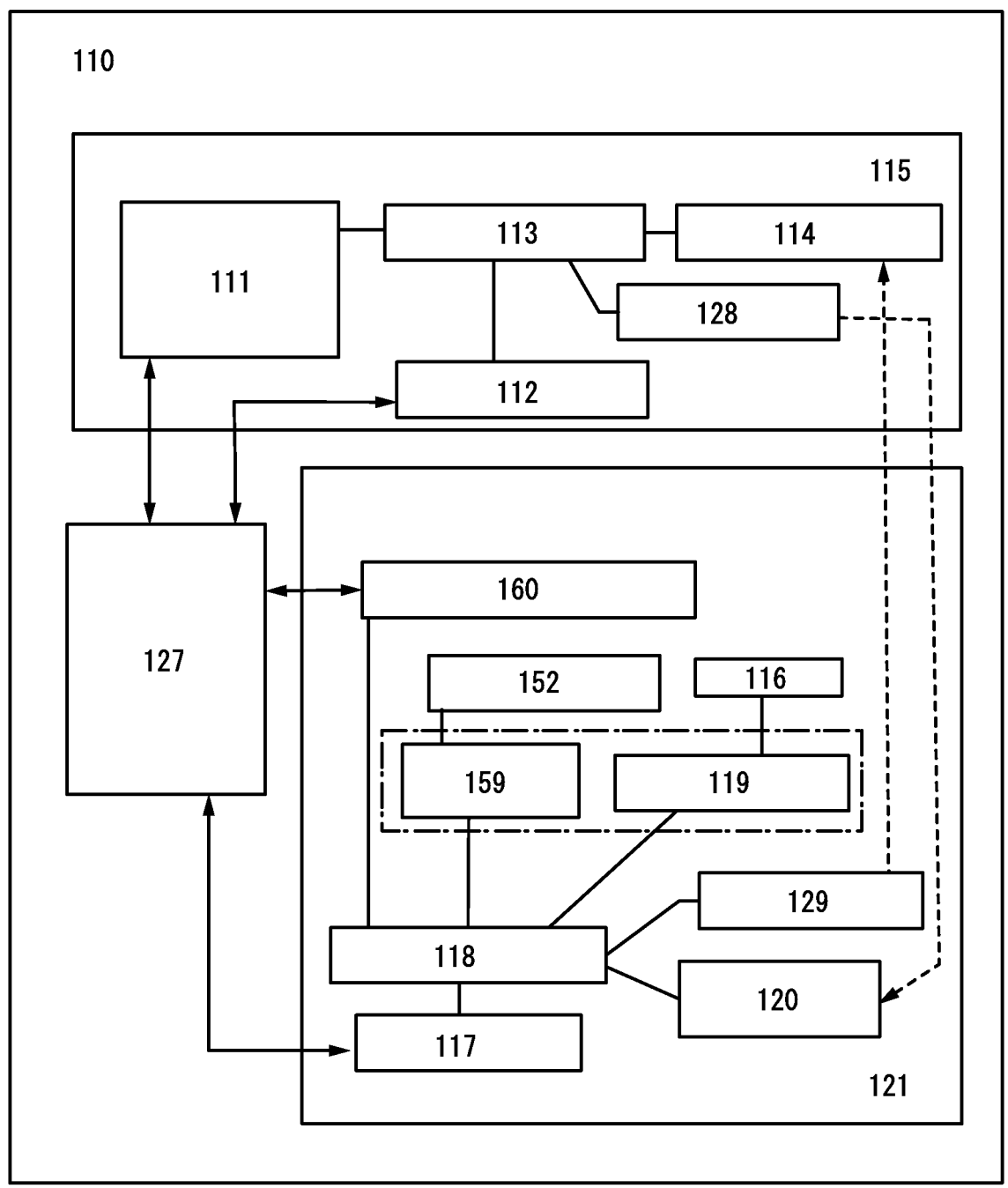
FIG. 6 is a block diagram of an electronic device of one embodiment of the present invention.

FIG. 6 is a block diagram of the device 110. The device 110 in FIG. 6 is an electronic device that includes the two batteries in FIGS. 2A to 2C and can be small by bending a display portion.

The device 110 of this embodiment includes a control module 115, a display module 121, and a power management circuit 127. The control module 115 is a controller that controls the whole device 110, communication, and display of data on the display portion 116.

The control module 115 includes a CPU 111, the battery 112, the regulator 113, a wireless receiving portion 114, and a wireless transmitting portion 128.

The display module 121 includes the display portion 116, a display driver circuit 119, the battery 117, the regulator 118, the touch sensor 152, a sensor driver circuit 159, a fold position sensor 160, a wireless receiving portion 120, and a wireless transmitting portion 129.

The device 110 can be bent along a plurality of portions of the display portion 116. Display of an image on a display region hidden by bending the device 110 is not performed, whereby power consumption can be reduced. An "image" in this specification includes information that can be perceived visually, such as characters and symbols. The fold position sensor 160 can determine the position where the display portion is folded and supply fold position data. For example, in the case where a fold position is determined in advance, a sensor is provided at that position. In the case where there are a plurality of positions where the device 110 can be bent, a plurality of sensors are arranged in a line or a matrix, so that the coordinates of the bend position can be identified. For example, the fold position sensor 160 can be provided along the periphery of the display region. The fold position sensor 160 can be composed of, for example, a switch, a MEMS pressure sensor, a pressure sensor, or the like.

Specifically, a mechanical contact switch, a magnetic switch, or the like may be provided on the display portion to be opened and closed when the display portion is unfolded or folded.

Alternatively, a plurality of pressure sensors may be provided on the display portion. Specifically, a film-like piezoelectric element can be attached to the display portion. A rise of pressure with the bending operation is sensed with the pressure sensor, whereby the fold position can be found.

As the piezoelectric element, for example, an organic piezoelectric film can be used. Specifically, a film-like piezoelectric element including a piezoelectric film containing polyamino acid, a piezoelectric film containing polyvinylidene fluoride, a piezoelectric film containing polyester, a piezoelectric film containing a chiral polymer, or the like can be used.

Note that the piezoelectric element can serve as both an element for the fold position sensor 160 and an element for a pressure-sensing touch panel.

The fold position sensor 160 allows one display region to be used as two regions separated by a folded portion, and an image to be displayed on one of the display regions can be selected. In addition, one or a plurality of images can be selected to be displayed depending on how the display region is folded. To divide one display region into two regions along a folded portion, the display region of the display portion 116 is preferably driven separately by the display driver circuit 119.

Furthermore, the fold position sensor 160 can allow a touch input region to be used as two regions separated by a folded portion, and one of the touch input regions can be disabled. The touch input region refers to a region in which sensing by the touch sensor can be performed and that has a size substantially the same as that of the display region. To use one touch input region as two regions separated by a folded portion, the touch input region of the touch sensor 152 is preferably driven separately by the sensor driver circuit 159.

The device 110 can be bent along a plurality of portions of the display portion 116 and does not perform display of an image on the display region hidden by bending the device 110, so that power consumption can be reduced. In addition, the touch sensor of the region where display is not performed is disabled, so that a malfunction can be prevented.

In this embodiment, a counter substrate (sealing substrate) of the display portion 116 has a touch panel function. Specifically, a display panel where a film substrate provided with a transistor using an oxide semiconductor layer and an organic EL element and a sealing substrate provided with a touch sensor including a transistor using an oxide semiconductor layer are bonded to each other is used. In this embodiment, the sealing substrate is also preferably formed using a flexible material so that part of the display portion can be bent.

As illustrated in an example in FIG. 6, at least part of the sensor driver circuit 159 and at least part of the display driver circuit 119 may be included in one IC chip to reduce the number of mounted components.

Each regulator generates and supplies power or a signal needed for each functional circuit from the battery connected to the regulator. In charging of the battery, the regulator can prevent overcharge or the like. Note that in FIG. 6, an example where the wireless receiving portion and the wireless transmitting portion are connected to one regulator is illustrated; however, the wireless receiving portion and the wireless transmitting portion may be connected to separate regulators.

In the device 110, the power management circuit 127 enables mutual supply of power between the batteries of the control module 115 and the display module 121. Furthermore, the power management circuit 127 can monitor the amount of power in the batteries 112 and 117 and execute, automatically or by operation by a user, wireless supply of power from one of the batteries to the other battery so that the other battery is charged, as appropriate. Alternatively, the power management circuit 127 can monitor the amount of power in the batteries 112 and 117 and execute, automatically or by operation by a user, wireless supply of power from one of a plurality of batteries to one of the other batteries so that the battery is charged, as appropriate.

In addition, in the device 110, the modules can be individually turned on or off. An operation system that selectively drives only the module to be used allows power saving of the device 110.

After the display module 121 and the control module 115 are turned on to display a still image on the display portion 116, the still image can keep being displayed while only the display module 121 is on even in the case where the control module 115 is turned off while the still image is displayed. Note that in the case where a transistor of the display portion 116 includes an oxide semiconductor layer, which allows a low off-state current (e.g., an oxide material containing In, Ga, and Zn), or in the case where a memory is included in each pixel, a still image can keep being displayed for a certain period of time even when power supply from the battery 117 is stopped after the still image is displayed.

Although an example where the display module 121 and the control module 115 each include the wireless transmitting portion and the wireless receiving portion is described in this embodiment, one embodiment of the present invention is not particularly limited to this example. The batteries of the display module 121 and the control module 115 may be connected in series or in parallel. In that case, the electronic device includes at least a receiving circuit for charging the battery without contact (including an antenna for wireless charging) that is electrically connected to any one of the batteries through the regulator.

Figure 23:
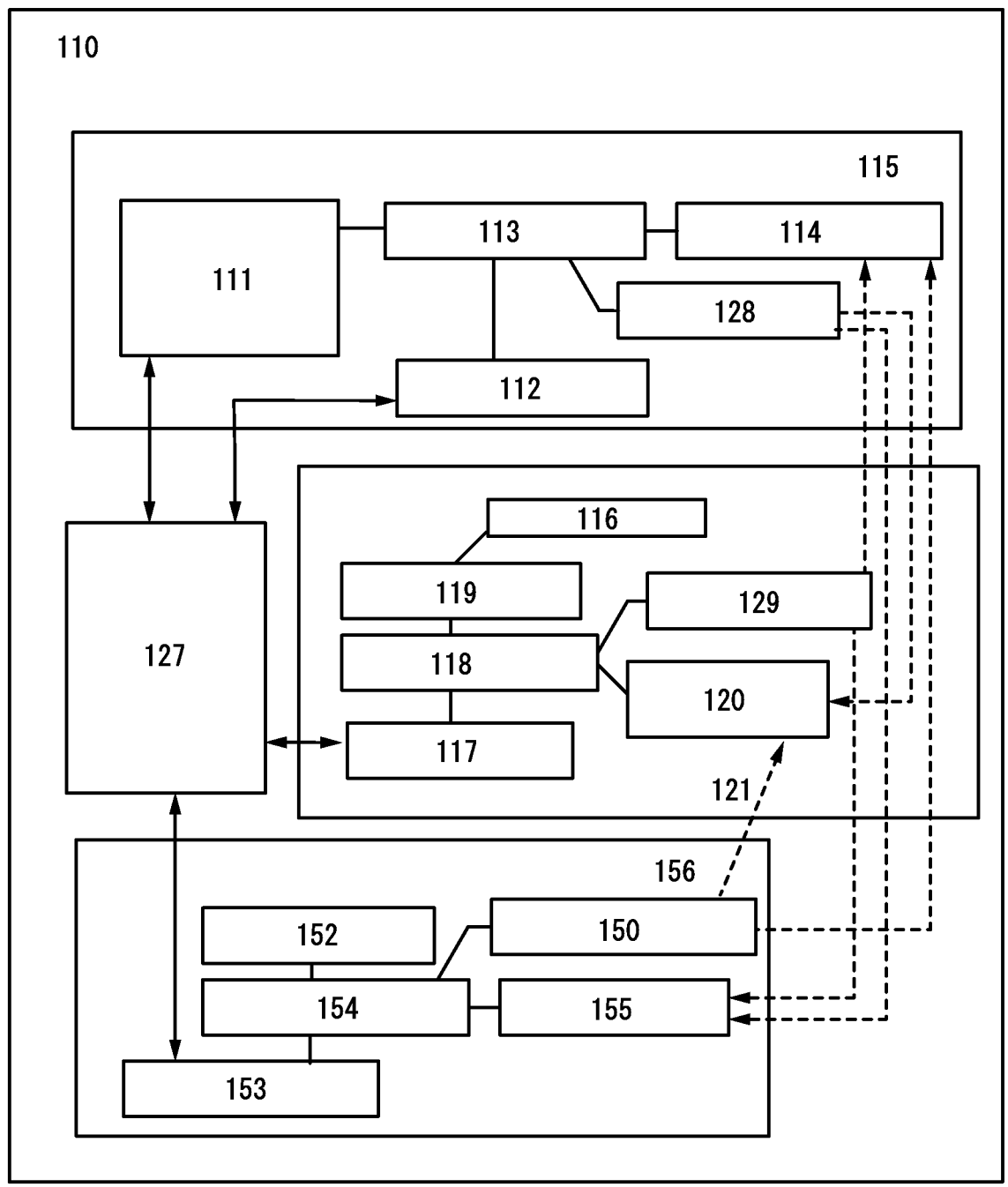
FIG. 23 is a block diagram of an electronic device of one embodiment of the present invention.

FIG. 23 is a block diagram of the device 110 that is partly different from that in FIG. 6. The device 110 in FIG. 23 is an electronic device that includes at least the three batteries illustrated in FIGS. 20A to 20C and can be made small by bending a display portion.

The device 110 of this embodiment includes the control module 115, the display module 121, the touch input portion 156, and the power management circuit 127. The control module 115 is a controller that controls the whole device 110, communication, and display of data on the display portion 116.

The control module 115 includes the CPU 111, the battery 112, the regulator 113, the wireless receiving portion 114, and the wireless transmitting portion 128.

The display module 121 includes the display portion 116, the display driver circuit 119, the battery 117, the regulator 118, the wireless receiving portion 120, and the wireless transmitting portion 129.

The touch input portion 156 includes the touch sensor 152, the battery 153, the regulator 154, the wireless receiving portion 155, and the wireless transmitting portion 150.

In this embodiment, a counter substrate (sealing substrate) of the display portion 116 has a touch panel function. Specifically, a display panel where a film substrate provided with a transistor using an oxide semiconductor layer and an organic EL element and a sealing substrate provided with a touch sensor including a transistor using an oxide semiconductor layer are bonded to each other is used. In this embodiment, the sealing substrate is also preferably formed using a flexible material so that part of the display portion can be bent. In this embodiment, an FPC that supplies power to the organic EL element and an FPC that supplies power to the touch sensor are separately provided and connected to different batteries.

A photosensor may be provided in each pixel of the display panel 116 to make an optical touch panel. As the touch input portion 156, a resistive touch panel or a capacitive touch panel may be positioned so as to overlap with the display portion 116.

Each regulator generates and supplies power or a signal needed for each functional circuit from the battery connected to the regulator. In charging the battery, the regulator can prevent overcharge or the like. Note that in FIG. 23, an example where the wireless receiving portion and the wireless transmitting portion are connected to one regulator is illustrated; however, the wireless receiving portion and the wireless transmitting portion may be connected to separate regulators.

In the device 110, the power management circuit 127 enables mutual supply of power among the batteries of the control module 115, the display module 121, and the touch input portion 156. Furthermore, the power management circuit 127 can monitor the amount of power in the batteries 112, 117, and 153 and execute, automatically or by operation by a user, wireless supply of power from one of the batteries to any of the other batteries so that the battery is charged, as appropriate. Alternatively, the power management circuit 127 can monitor the amount of power in the batteries 112, 117, and 153 and execute, automatically or by operation by a user, wireless supply of power from one of a plurality of batteries to one of the other batteries so that the battery is charged, as appropriate.

In addition, in the device 110, the modules can be individually turned on or off. An operation system that selectively drives only the module to be used allows low power consumption of the device 110.

For example, in the case where a user does not use display and desires to turn off a display screen without using display, power supply to the display portion 116 is stopped so that the battery 117 is not used, and the touch input portion 156 and the control module 115 are turned on. When display is desired to be performed on a screen again, the display screen can be turned on by touching the screen.

After the display module 121 and the control module 115 are turned on to display a still image on the display portion 116, the still image can keep being displayed while only the display module 121 is on even in the case where the control module 115 is turned off while the still image is displayed.

Note that in the case where a transistor of the display portion 116 includes an oxide semiconductor layer, which allows a low off-state current (e.g., an oxide material containing In, Ga, and Zn), or in the case where a memory is included in each pixel, a still image can keep being displayed for a certain period of time even when power supply from the battery 117 is stopped after the still image is displayed.

Although an example where the display module 121, the control module 115, and the touch input portion 156 include separate batteries is described in this embodiment, the number of batteries is not particularly limited to three, and the electronic device may include a functional module and thus four or more batteries, including a battery of the functional module.

Although an example where the display module 121, the control module 115, and the touch input portion 156 each include the wireless transmitting portion and the wireless receiving portion is described in this embodiment, one embodiment of the present invention is not particularly limited this example. The batteries of the display module 121, the control module 115, and the touch input portion 156 may be connected in series or in parallel. In that case, the electronic device includes at least a receiving circuit for charging the battery without contact (including an antenna for wireless charging) that is electrically connected to any one of the batteries through the regulator.

Note that the electronic device can be a data terminal device when provided with a communication module as a communication function. Furthermore, the electronic device may include a communication module having a near field wireless communication function that allows telephone calls or the like. In that case, the communication module may also include a battery. The electronic device may have any other function and include, for example, a sensor (a sensor having a function of measuring force, displacement, position, speed, acceleration, angular velocity, rotational speed, distance, light, liquid, magnetism, temperature, chemical substance, sound, time, hardness, electric field, current, voltage, power, radiation, flow rate, humidity, gradient, oscillation, odor, or infrared rays), a microphone, or the like.

The electronic device may further be provided with a slot for insertion of a SIM card, a connector portion for connecting a USB device such as a USB memory.

As described above, the electronic device includes a plurality of batteries that are provided in corresponding units (modules or functions) in the electronic device and managed by the power management circuit 127. In the electronic device including the plurality of batteries, an operation system that selectively drives only the module to be used allows power saving. The power management circuit 127 can monitor the amount of power in the batteries and execute, automatically or by operation by a user, wireless supply of power from one of the batteries to any of the other batteries so that the battery is charged, as appropriate. An operation system that appropriately selects the battery for a component to be used from the plurality of batteries in the electronic device and adjusts the amount of power in each battery can extend time when the function to be used can be used.

The batteries each include a communication module having a non-contact charging function and can be controlled to be charged at the same time. In addition, the batteries each include a transmitting and receiving portion and can adjust the amount of power with the power management circuit; thus, power can be mutually supplied among the batteries.

Embodiment 2

In this embodiment, an example that is partly different from Embodiment 1 will be described with reference to FIGS. 7A to 7C. Note that the same reference numerals are used for the same portions as those in FIGS. 2A to 2C, and description of the portions with the same reference numerals is omitted here.

Figure 7A:
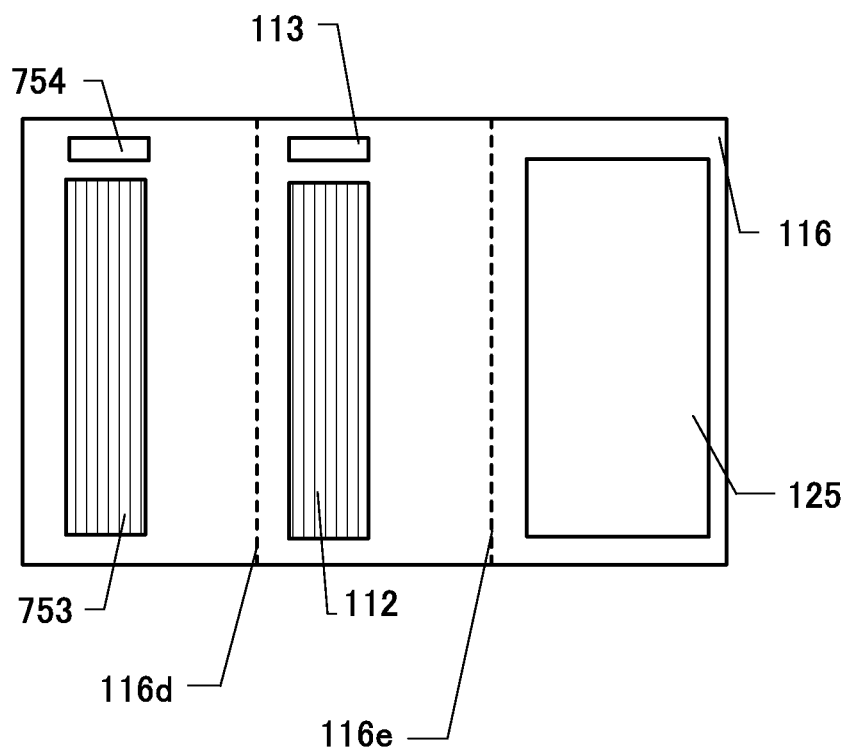
FIGS. 7A to 7C are a plan view and cross-sectional views illustrating one embodiment of the present invention.

An example where two batteries with substantially the same size are used is described in Embodiment 1, whereas FIG. 7A illustrates an example where batteries have a different size and arrangement from the batteries in Embodiment 1. A display region of the display portion 116 has a size of approximately 5.9 inches.

FIG. 7A is a schematic view illustrating the arrangement of the batteries and the display portion 116 of the back surface, which is not a display surface. The bendable portion 116d of the display portion indicated by a dotted line in FIG. 7A is located between the battery 112 and a battery 753.

The battery 112 is electrically connected to the regulator 113, and the regulator 113 is electrically connected to the system portion 125 including a CPU. The regulator 113 may be connected to a receiving circuit or a transmitting circuit.

The battery 753 is electrically connected to a regulator 754. The regulator 754 is electrically connected to a touch input portion and a driver circuit of the display portion 116. The regulator 754 may be connected to a receiving circuit or a transmitting circuit.

Figure 7B:
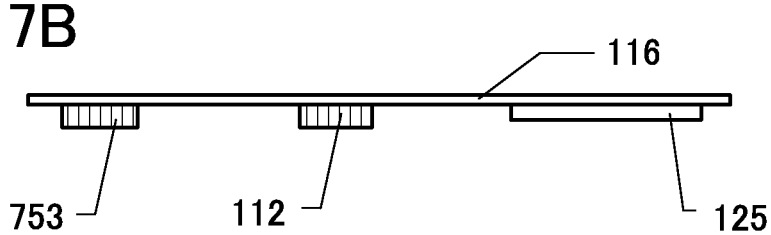

FIG. 7B is a cross-sectional view of the electronic device in FIG. 7A and illustrates the positional relation of the system portion 125 including a CPU and each portion of the electronic device that is unfolded.

Figure 7C:
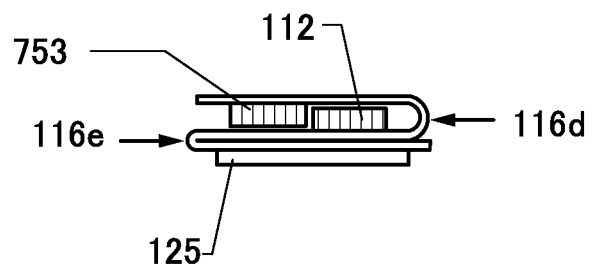

FIG. 7C illustrates the positional relation of the system portion 125 including a CPU and each portion of the electronic device that is bent. The battery 112 is positioned so as not to overlap with the battery 753 when the electronic device is bent. By thus being made small, the electronic device can have a smaller thickness than the electronic device of Embodiment 1 that is made small. The bendable portions 116d and 116e of the display portion do not overlap with the batteries and are bent so that the electronic device is small.

Figure 24A:
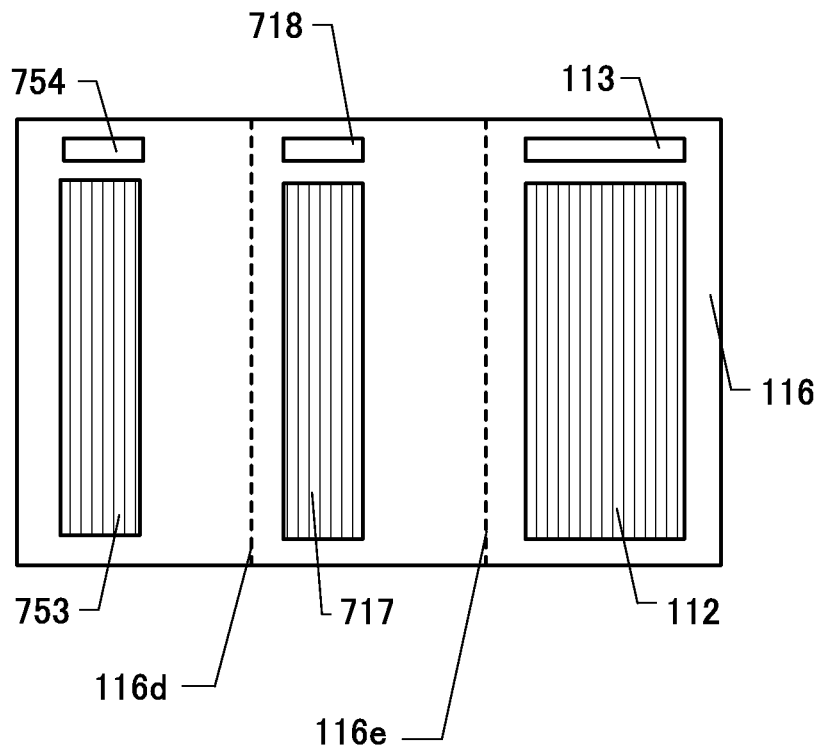
FIGS. 24A to 24C are a plan view and cross-sectional views illustrating one embodiment of the present invention.

In the case where three batteries are provided in the electronic device, the sizes thereof are not necessarily substantially the same. FIG. 24A illustrates an example where two batteries have a different size and arrangement. A display region of the display portion 116 has a size of approximately 5.9 inches.

FIG. 24A is a schematic view illustrating the arrangement of the batteries and the display portion 116 of the back surface, which is not a display surface. The bendable portion 116e of the display portion indicated by a dotted line in FIG. 24A is located between the battery 112 and a battery 717. The bendable portion 116d of the display portion indicated by a dotted line in FIG. 24A is located between the batteries 717 and 753.

The battery 112 is electrically connected to the regulator 113, and the regulator 113 is electrically connected to the system portion 125 including a CPU. The regulator 113 may be connected to a receiving circuit or a transmitting circuit.

The battery 717 is electrically connected to a regulator 718. The regulator 718 is electrically connected to a driver circuit of the display portion 116. The regulator 718 may be connected to a receiving circuit or a transmitting circuit.

The battery 753 is electrically connected to a regulator 754. The regulator 754 is electrically connected to a touch input portion. The regulator 754 may be connected to a receiving circuit or a transmitting circuit.

Figure 24B:
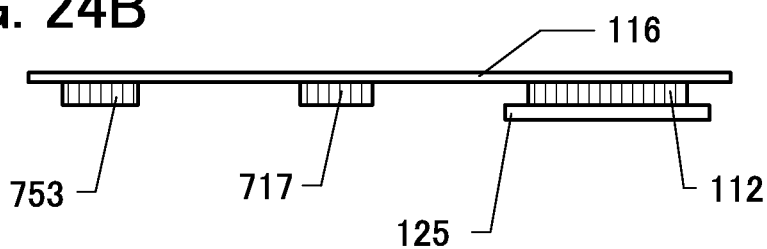

FIG. 24B is a cross-sectional view of the electronic device in FIG. 24A and illustrates the positional relation of the system portion 125 including a CPU and each portion of the electronic device that is unfolded.

Figure 24C:
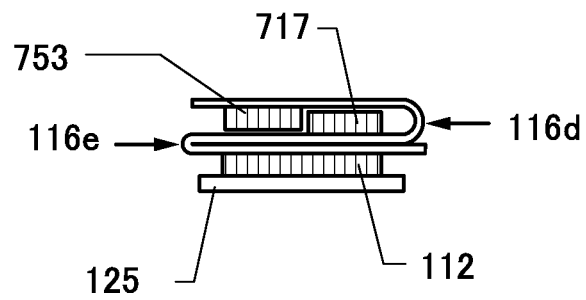

FIG. 24C illustrates the positional relation of the system portion 125 including a CPU and each portion of the electronic device that is bent. When the electronic device is bent, the battery 112 overlaps with the batteries 717 and 753 but the battery 717 does not overlap with the battery 753. By thus being made small, the electronic device can have a smaller thickness than the electronic device of Embodiment 1 that is made small. The bendable portions 116d and 116e of the display portion do not overlap with the batteries and are bent so that the electronic device is small.

This embodiment can be freely combined with any of the other embodiments.

Embodiment 3

In Embodiment 1, the display portion using the first flexible film 143 and the second flexible film 144 is described, whereas in this embodiment, a flexible display panel is fabricated using a separation method. In this embodiment, an example of fabricating the flexible display panel using a separation layer will be described below.

Figure 8A:
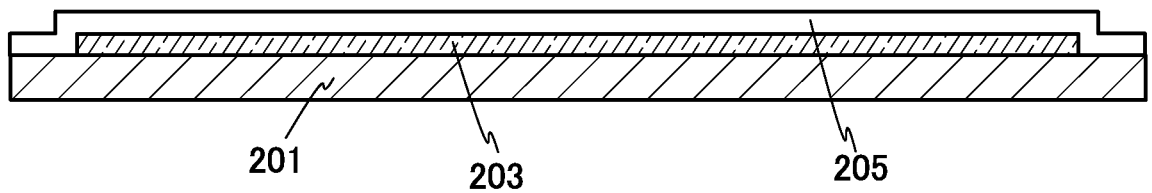
FIGS. 8A to 8D are cross-sectional process views of one embodiment of the present invention.
Figure 8B:
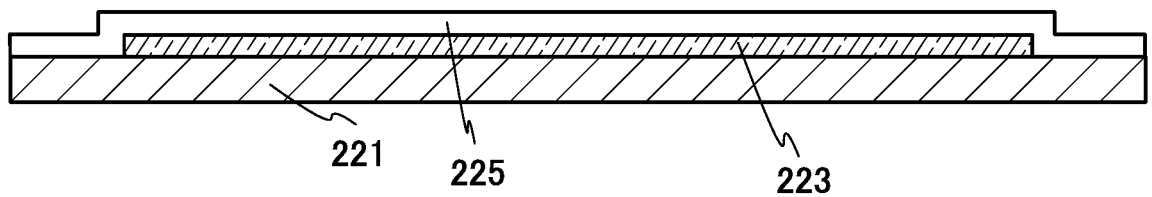

First, a separation layer 203 is formed over a formation substrate 201, and a layer 205 to be separated (hereinafter referred to as a layer 205) is formed over the separation layer 203 (FIG. 8A). In addition, a separation layer 223 is formed over a formation substrate 221, and a layer 225 to be separated (hereinafter referred to as a layer 225) is formed over the separation layer 223 (FIG. 8B).

For example, when a tungsten film is used as the separation layer, a tungsten oxide film can be formed between a layer to be separated and the tungsten film by $N_2O$ plasma treatment. Forming the tungsten oxide film by $N_2O$ plasma treatment enables separation of the layer to be separated with a weak force. When the separation is caused at the interface between the tungsten film and the tungsten oxide film, the tungsten oxide film is left on the side of the layer to be separated in some cases. The left tungsten oxide film might adversely affect the properties of a transistor. Thus, a step of removing the left tungsten oxide film is preferably performed after the step of separating the separation layer and the layer to be separated.

In one embodiment of the present invention, a tungsten film with a thickness of greater than or equal to 0.1 nm and less than 200 nm is formed over the substrate.

Figure 8C:
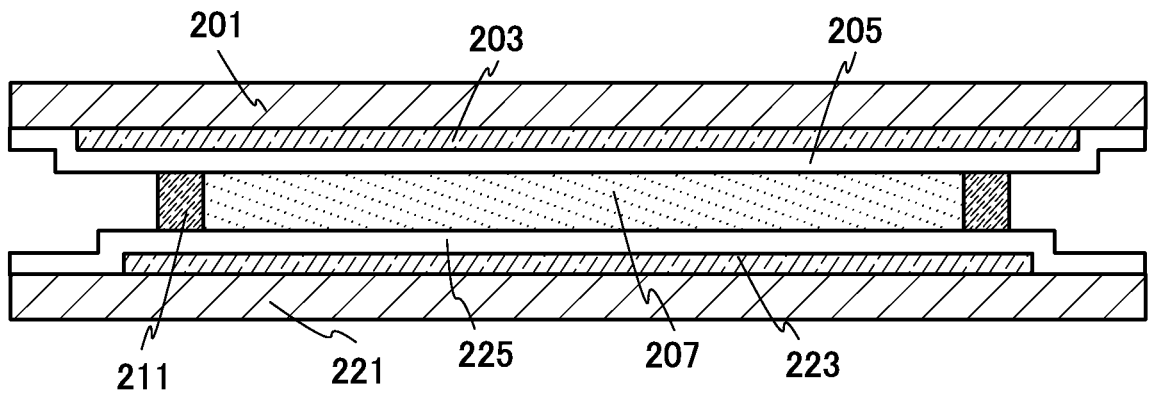

Next, the formation substrate 201 and the formation substrate 221 are attached to each other by using a bonding layer 207 and a frame-like bonding layer 211 so that the surfaces over which the layers to be separated are formed face each other, and then, the bonding layer 207 and the frame-like bonding layer 211 are cured (FIG. 8C). Here, the frame-like bonding layer 211 and the bonding layer 207 in a region surrounded by the frame-like bonding layer 211 are provided over the layer 225 and after that, the formation substrate 201 and the formation substrate 221 face each other and are attached to each other.

Note that the formation substrate 201 and the formation substrate 221 are preferably attached to each other in a reduced-pressure atmosphere.

Figure 8D:
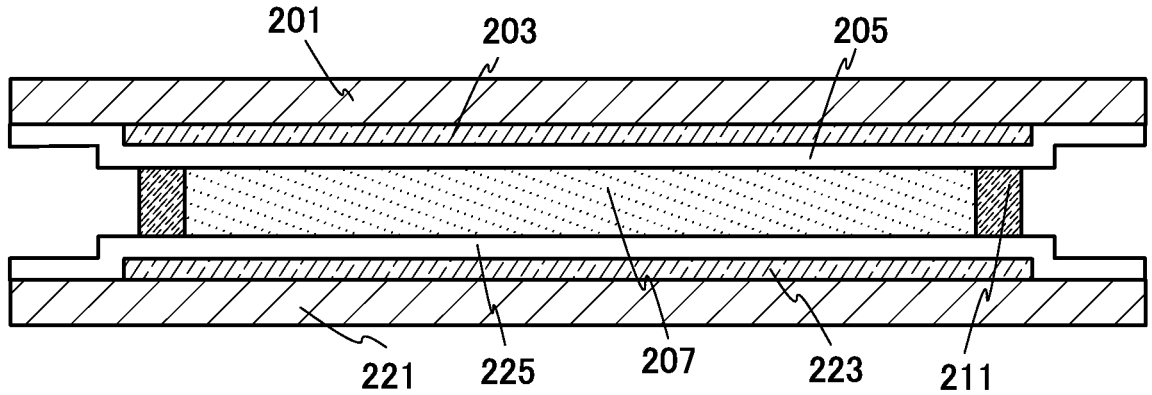

Note that although FIG. 8C illustrates the case where the separation layer 203 and the separation layer 223 are different in size, separation layers having the same size as illustrated in FIG. 8D may be used.

The bonding layer 207 is provided to overlap with the separation layer 203, the layer 205, the layer 225, and the separation layer 223. Then, edges of the bonding layer 207 are preferably positioned inside an area between at least edges of either the separation layer 203 or the separation layer 223 (the separation layer which is desirably separated first). Accordingly, strong adhesion between the formation substrate 201 and the formation substrate 221 can be suppressed; thus, a decrease in yield of a subsequent separating process can be suppressed.

Figure 9A:
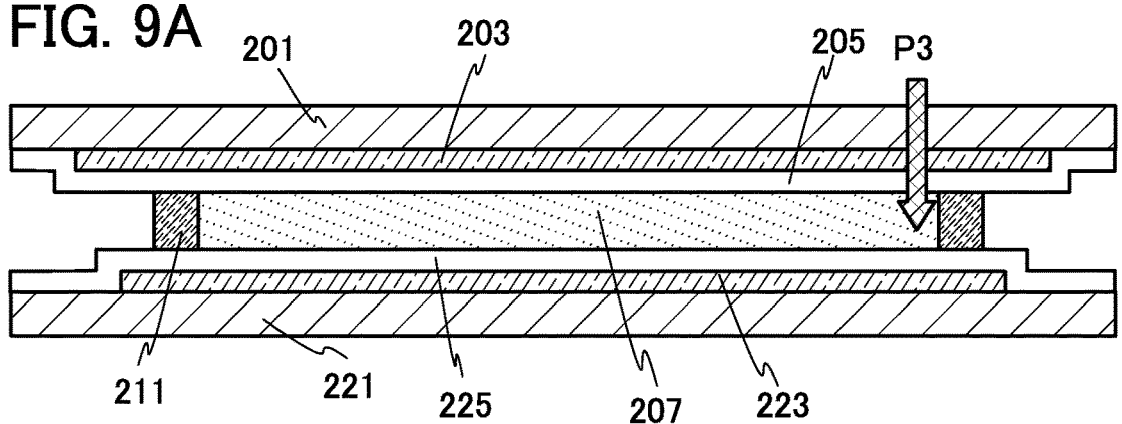
FIGS. 9A to 9D are cross-sectional process views of one embodiment of the present invention.
Figure 9B:
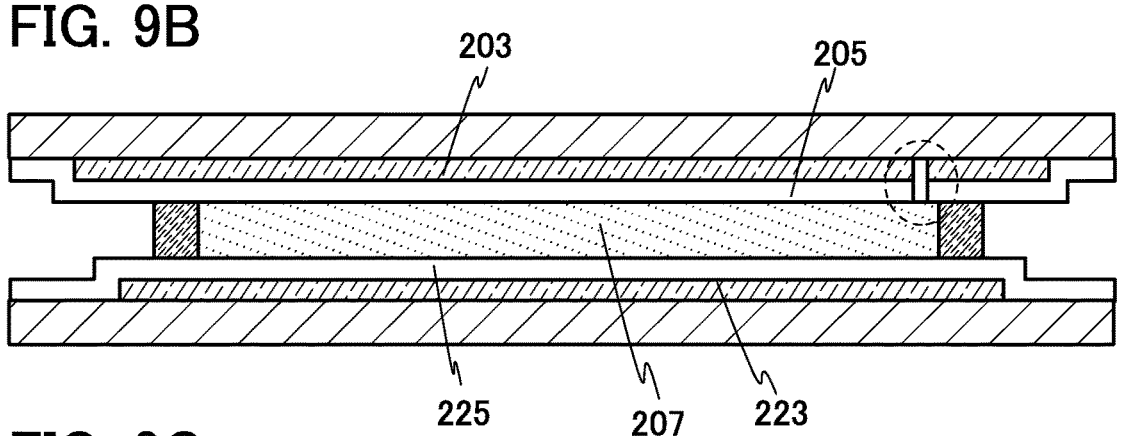

Next, a separation trigger is formed by laser irradiation (FIGS. 9A and 9B).

Either the formation substrate 201 or the formation substrate 221 may be separated first. In the case where the separation layers differ in size, a substrate over which a larger separation layer is formed may be separated first or a substrate over which a smaller separation layer is formed may be separated first. In the case where an element such as a semiconductor element, a light-emitting element, or a display element is formed only over one of the substrates, the substrate on the side where the element is formed may be separated first or the other substrate may be separated first. Here, the formation substrate 201 is separated first.

A region where the bonding layer 207 in a cured state or the frame-like bonding layer 211 in a cured state, the layer 205, and the separation layer 203 overlap with one another is irradiated with laser light. Here, the bonding layer 207 is in a cured state and the frame-like bonding layer 211 is not in a cured state, and the bonding layer 207 in a cured state is irradiated with laser light (see an arrow P3 in FIG. 9A).

Part of the layer 205 is removed; thus, the separation trigger can be formed (see a region surrounded by a dashed line in FIG. 9B). At this time, not only a part of the layer 205 but also the separation layer 203 or the bonding layer 207 may be partly removed.

It is preferred that laser light irradiation be performed from the side of the substrate provided with the separation layer that is desirably separated. In the case where a region where the separation layer 203 and the separation layer 223 overlap with each other is irradiated with laser light, the formation substrate 201 and the separation layer 203 can be selectively separated by cracking only the layer 205 of the layers 205 and 225 (see a region surrounded by a dotted line in FIG. 9B).

When a separation trigger is formed in both the layer 205 on the separation layer 203 side and the layer 225 on the separation layer 223 side in the case where the region where the separation layer 203 and the separation layer 223 overlap with each other is irradiated with laser light, it might be difficult to selectively separate one of the formation substrates. Therefore, laser light irradiation conditions are restricted so that only one of the layers to be separated is cracked, in some cases.

Figure 9C:
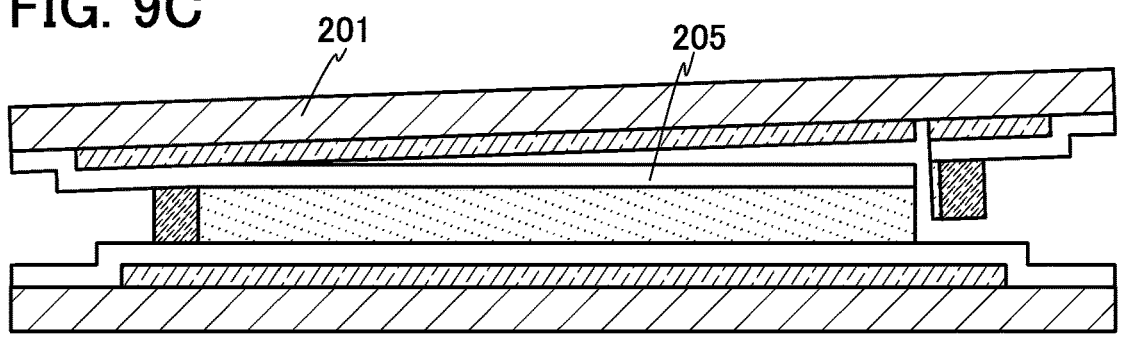
Figure 9D:
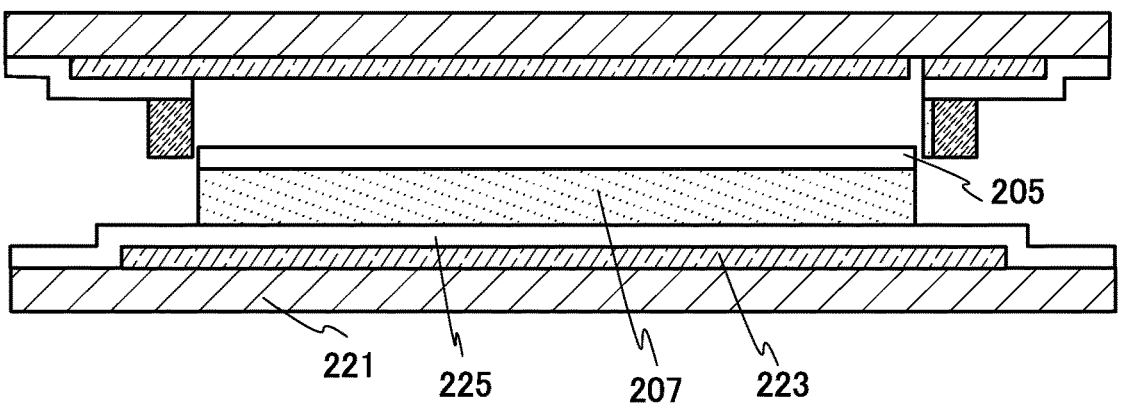

Then, the layer 205 and the formation substrate 201 are separated from each other from the formed separation trigger (FIGS. 9C and 9D). Consequently, the layer 205 can be transferred from the formation substrate 201 to the formation substrate 221.

Figure 10A:
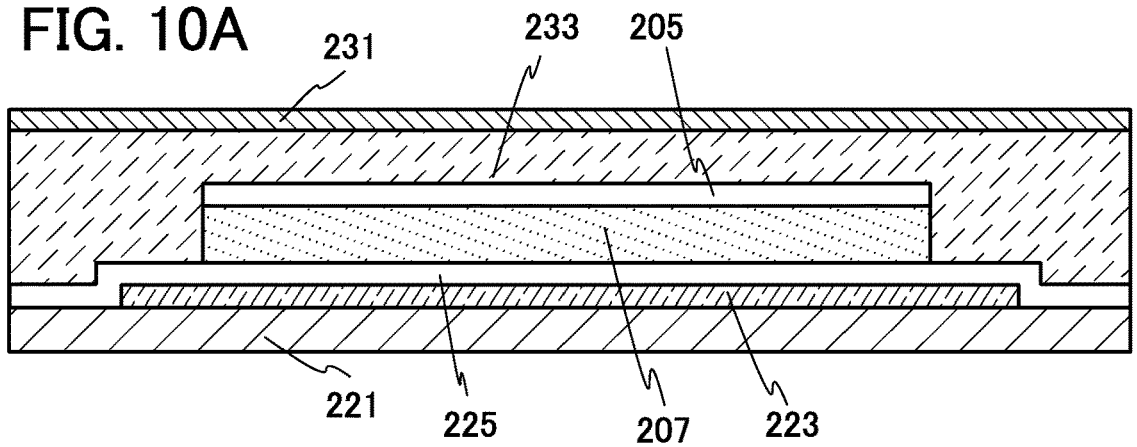
FIGS. 10A to 10D are cross-sectional process views of one embodiment of the present invention.

The layer 205 that is separated from the formation substrate 201 in the step in FIG. 9D is attached to a substrate 231 with a bonding layer 233, and the bonding layer 233 is cured (FIG. 10A).

Figure 10B:
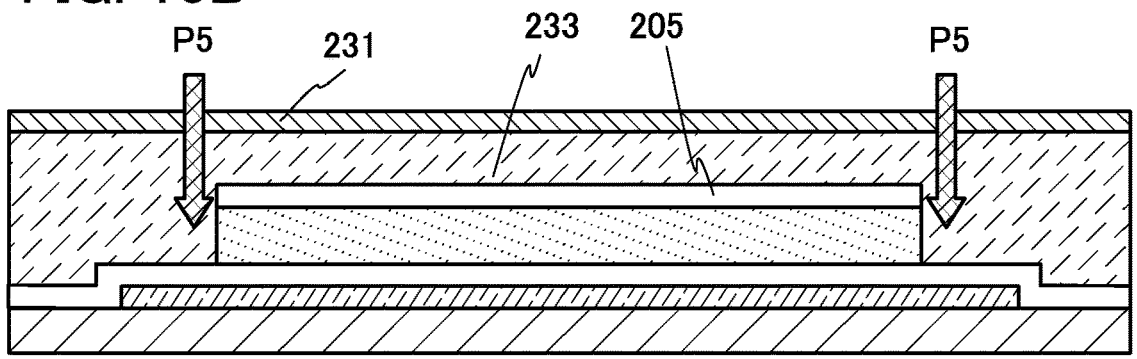
Figure 10C:
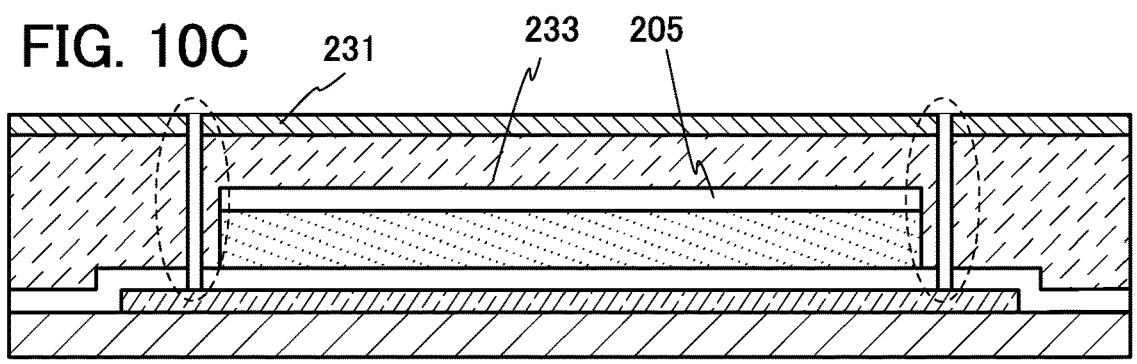

Next, a separation trigger is formed by a sharp knife such as a cutter (FIGS. 10B and 10C).

In the case where the substrate 231 on the side where the separation layer 223 is not provided can be cut by a knife or the like, a cut may be made in the substrate 231, the bonding layer 233, and the layer 225 (see arrows P5 in FIG. 10B). Consequently, part of the layer 225 can be removed; thus, the separation trigger can be formed (see a region surrounded by a dashed line in FIG. 10C).

For example, in the case where there is a region in which the formation substrate 221 and the substrate 231 are attached to each other using the bonding layer 233 without overlapping with the separation layer 223, there is a portion in which the separation is not performed in a subsequent separating process depending on a degree of adhesion between the formation substrate 221 and the substrate 231, so that yield of the subsequent separating process might be decreased. Therefore, a cut is preferably made in a frame shape in a region where the bonding layer 233 in a cured state and the separation layer 223 overlap with each other to form a separation trigger in a form of a solid line. This can improve the yield of the separating process.

Figure 10D:
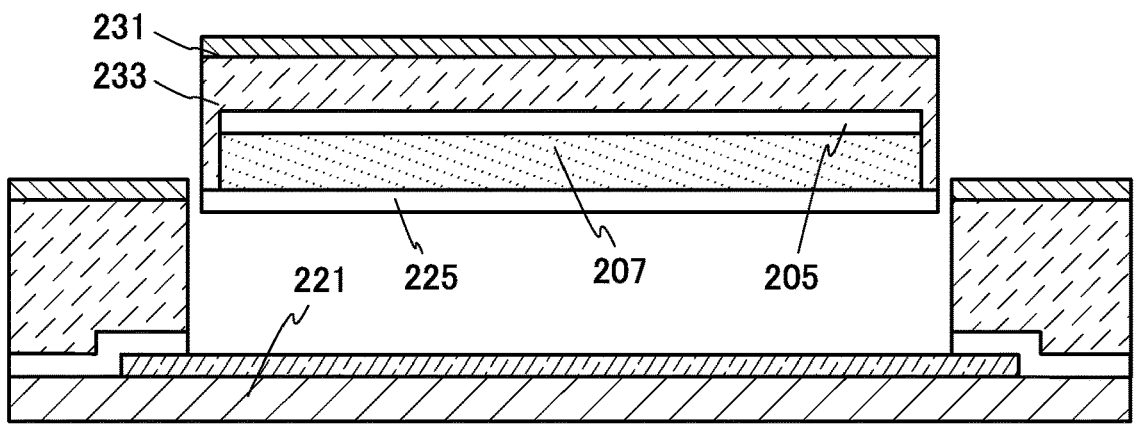

Then, the layer 225 and the formation substrate 221 are separated from each other from the formed separation trigger (FIG. 10D), so that the layer 225 can be transferred from the formation substrate 221 to the substrate 231.

The formation substrate 221 and the layer 225 may be separated from each other by filling the interface between the separation layer 223 and the layer 225 with a liquid such as water. A portion between the separation layer 223 and the layer 225 absorbs a liquid through a capillarity action, facilitating separation. Furthermore, an adverse effect on the functional element included in the layer 225 due to static electricity caused at separation (e.g., a phenomenon in which a semiconductor element is damaged by static electricity) can be suppressed. Note that a liquid may be sprayed in an atomized form or in a vaporized form. Examples of liquid include pure water, an organic solvent, a neutral solution, an alkali solution, an acid solution, and an aqueous solution in which a salt is dissolved.

In the separating method of one embodiment of the present invention described above, separation is performed in such a manner that a separation trigger is formed by a sharp knife or the like and then the interface between the separation layer and the layer to be separated is made in a separable state. This can improve the yield of the separating process.

In addition, bonding of a substrate included in a device that is desired to be fabricated can be performed after the following procedure: a pair of formation substrates each provided with a layer to be separated are attached to each other and then separation is performed. Therefore, formation substrates having low flexibility can be attached to each other when the layers to be separated are attached to each other, whereby alignment accuracy at the time of attachment can be improved compared to the case where flexible substrates are attached to each other.

An example of a flexible light-emitting device that can be fabricated using the separating method described above will be described below.

FIGS. 11A1 to 11C, FIGS. 12A and 12B, and FIGS. 13A1 to 13C illustrate examples of flexible light-emitting devices each including an organic EL element as a light-emitting element. The flexible light-emitting device of this embodiment can be bent in any direction with, for example, a radius of curvature of 1 mm to 150 mm inclusive. The number of bend portions may be one or more than one; for example, the light-emitting device can be bent in two or three.

For example, a light-emitting device of one embodiment of the present invention includes a first flexible substrate, a second flexible substrate, a light-emitting element between the first flexible substrate and the second flexible substrate, a first insulating layer between the first flexible substrate and the light-emitting element, and a first bonding layer between the second flexible substrate and the light-emitting element. The light-emitting element includes a layer containing a light-emitting organic compound between a pair of electrodes. The water vapor permeability of the first insulating layer is less than $1 \times 10^{-5}$ g/m²·day.

The light-emitting device preferably further includes a second insulating layer between the second flexible substrate and the first bonding layer. The water vapor permeability of the second insulating layer is preferably less than $1 \times 10^{-5}$ g/m²·day. The light-emitting device preferably further includes a second bonding layer that surrounds the first bonding layer like a frame.

Note that the light-emitting device in this specification includes, in its category, a display device using a light-emitting element. The category of the light-emitting device includes a module in which a light-emitting element is provided with a connector such as an anisotropic conductive film or a tape carrier package (TCP); a module in which a printed wiring board is provided at the end of a TCP; and a module in which an integrated circuit (IC) is directly mounted on a light-emitting element by a chip on glass (COG) method. Moreover, lighting equipment and the like may be included in the category of the light-emitting device.

Structural Example 1

FIG. 11A1 is a plan view of a light-emitting device, and FIG. 11B is a cross-sectional view along dashed-dotted line X3-Y3 in FIG. 11A1. The light-emitting device illustrated in FIG. 11B is a top-emission light-emitting device fabricated using a side-by-side method. In this embodiment, the light-emitting device can express one color with light-emitting units of three colors of red (R), green (G), and blue (B) or with light-emitting units of four colors of red (R), green (G), blue (B), and white (W), for example; however, colors other than R, G, and B, such as yellow, cyan, and magenta, may be used as color elements.

The light-emitting device illustrated in FIG. 11A1 includes a light-emitting portion 491, a driver circuit portion 493, and a flexible printed circuit (FPC) 495. An organic EL element and a transistor included in the light-emitting portion 491 and the driver circuit portion 493 are sealed by a flexible substrate 420, a flexible substrate 428, a frame-like bonding layer 404, and a bonding layer 407. FIG. 11B illustrates an example where the conductive layer 457 and the connector 497 are connected to each other through an opening portion of the frame-like bonding layer 404.

The light-emitting device illustrated in FIG. 11B includes the flexible substrate 420, a bonding layer 422, an insulating layer 424, a transistor 455, an insulating layer 463, an insulating layer 465, an insulating layer 405, an organic EL element 450 (a first electrode 401, an EL layer 402, and a second electrode 403), the frame-like bonding layer 404, the bonding layer 407, the flexible substrate 428, and the conductive layer 457. The flexible substrate 428, the bonding layer 407, and the second electrode 403 transmit visible light.

In the light-emitting portion 491 of the light-emitting device in FIG. 11B, the transistor 455 and the organic EL element 450 are provided over the flexible substrate 420 with the bonding layer 422 and the insulating layer 424 provided therebetween. The organic EL element 450 includes the first electrode 401 over the insulating layer 465, the EL layer 402 over the first electrode 401, and the second electrode 403 over the EL layer 402. The first electrode 401 is electrically connected to a source electrode or a drain electrode of the transistor 455. The first electrode 401 preferably reflects visible light. The end portion of the first electrode 401 is covered with the insulating layer 405.

The driver circuit portion 493 includes a plurality of transistors. FIG. 11B illustrates one of the transistors in the driver circuit portion 493.

The conductive layer 457 is electrically connected to an external input terminal through which a signal (e.g., a video signal, a clock signal, a start signal, and a reset signal) or a potential from the outside is transmitted to the driver circuit portion 493. Here, the FPC 495 is provided as the external input terminal.

To prevent an increase in the number of fabricating steps, the conductive layer 457 is preferably formed using the same material and the same step(s) as those of the electrode or the wiring in the light-emitting portion or the driver circuit portion. Here, the example is described in which the conductive layer 457 is formed using the same material and the same step(s) as those of the electrodes of the transistor.

The insulating layer 463 has an effect of inhibiting diffusion of impurities into a semiconductor included in the transistor. As the insulating layer 465, an insulating layer having a planarization function is preferably selected in order to reduce surface unevenness due to the transistor.

The frame-shaped bonding layer 404 preferably has a more excellent gas barrier property than the bonding layer 407, in which case moisture and oxygen from the outside can be prevented from entering the light-emitting device. Thus, the light-emitting device can be highly reliable.

In Structural Example 1, light emission of the organic EL element 450 is extracted from the light-emitting device through the bonding layer 407. For this reason, the bonding layer 407 preferably has a more excellent light-transmitting property than the frame-like bonding layer 404. Furthermore, the bonding layer 407 preferably has a higher refractive index than the frame-like bonding layer 404. In addition, it is preferred that the volume of the bonding layer 407 be less reduced by curing than that of the frame-like bonding layer 404.

The light-emitting device described in Structural Example 1 can be fabricated with high yield using the separating method described above. According to the separating method, the insulating layer 424 and the transistors are formed over the formation substrate, as the layer to be separated, whereby the insulating layer 424 and the transistors can be formed at high temperature. The use of the insulating layer 424 and the transistors formed at high temperature enables the light-emitting device to have high reliability. Note that the organic EL element 450 or the like may also be formed as the layer to be separated.

Structural Example 2

FIG. 11A2 is a plan view of the light-emitting device, and FIG. 11C is a cross-sectional view along dashed-dotted line X4-Y4 in FIG. 11A2. The light-emitting device illustrated in FIG. 11C is a bottom-emission light-emitting device using a color filter method.

The light-emitting device illustrated in FIG. 11C includes the flexible substrate 420, the bonding layer 422, the insulating layer 424, a transistor 454, the transistor 455, the insulating layer 463, the coloring layer 432, the insulating layer 465, a conductive layer 435, an insulating layer 467, the insulating layer 405, the organic EL element 450 (the first electrode 401, the EL layer 402, and the second electrode 403), the bonding layer 407, the flexible substrate 428, and the conductive layer 457. The flexible substrate 420, the bonding layer 422, the insulating layer 424, the insulating layer 463, the insulating layer 465, the insulating layer 467, and the first electrode 401 transmit visible light.

In the light-emitting portion 491 of the light-emitting device illustrated in FIG. 11C, the switching transistor 454, the current control transistor 455, and the organic EL element 450 are provided over the flexible substrate 420 with the bonding layer 422 and the insulating layer 424 provided therebetween. The organic EL element 450 includes the first electrode 401 over the insulating layer 467, the EL layer 402 over the first electrode 401, and the second electrode 403 over the EL layer 402. The first electrode 401 is electrically connected to the source electrode or the drain electrode of the transistor 455 through the conductive layer 435. The end portion of the first electrode 401 is covered with the insulating layer 405. It is preferred that the second electrode 403 reflect visible light. Moreover, the light-emitting device includes the coloring layer 432 over the insulating layer 463 so as to overlap with the organic EL element 450.

The driver circuit portion 493 includes a plurality of transistors. FIG. 11C illustrates two of the transistors in the driver circuit portion 493.

The conductive layer 457 is electrically connected to an external input terminal through which a signal or a potential from the outside is transmitted to the driver circuit portion 493. Here, the example in which the FPC 495 is provided as the external input terminal is described. Moreover, here, the example in which the conductive layer 457 is formed using the same material and the same step(s) as those of the conductive layer 435 is described.

The insulating layer 463 has an effect of suppressing diffusion of impurities into a semiconductor included in the transistor. As the insulating layer 465 and the insulating layer 467, an insulating layer having a planarization function is preferably selected in order to reduce surface unevenness due to the transistors and the wirings.

Note that a touch sensor may be provided so as to overlap with the flexible substrate 420 as illustrated in FIG. 12A. The touch sensor includes a conductive layer 441, a conductive layer 442, and an insulating layer 443. As illustrated in FIG. 12B, a flexible substrate 444 may be provided between the flexible substrate 420 and the touch sensor. Note that the touch sensor may be provided between the flexible substrate 420 and the flexible substrate 444. An FPC 445 for the touch sensor may further be provided.

The light-emitting device described in Structural Example 2 can be fabricated with high yield using the separating method described above. According to the separating method, the insulating layer 424 and the transistors are formed over the formation substrate, as the layer to be separated, whereby the insulating layer 424 and the transistors can be formed at high temperature. The use of the insulating layer 424 and the transistors formed at high temperature enables the light-emitting device to have high reliability. Note that the organic EL element 450 or the like may also be formed as the layer to be separated.

Structural Example 3

FIG. 13A1 is a plan view of a light-emitting device, and FIG. 13B is a cross-sectional view along dashed-dotted line X5-Y5 in FIG. 13A1. The light-emitting device illustrated in FIG. 13A1 is a top-emission light-emitting device using a color filter method.

The light-emitting device illustrated in FIG. 13B includes the flexible substrate 420, the bonding layer 422, the insulating layer 424, the transistor 455, the insulating layer 463, the insulating layer 465, the insulating layer 405, a spacer 496, the organic EL element 450 (the first electrode 401, the EL layer 402, and the second electrode 403), the bonding layer 407, an overcoat 453, a light-blocking layer 431, the coloring layer 432, an insulating layer 226, a bonding layer 426, the flexible substrate 428, and the conductive layer 457. The flexible substrate 428, the bonding layer 426, the insulating layer 226, the bonding layer 407, the overcoat 453, and the second electrode 403 transmit visible light.

In the light-emitting portion 491 of the light-emitting device in FIG. 13B, the transistor 455 and the organic EL element 450 are provided over the flexible substrate 420 with the bonding layer 422 and the insulating layer 424 provided therebetween. The organic EL element 450 includes the first electrode 401 over the insulating layer 465, the EL layer 402 over the first electrode 401, and the second electrode 403 over the EL layer 402. The first electrode 401 is electrically connected to a source electrode or a drain electrode of the transistor 455. The end portion of the first electrode 401 is covered with the insulating layer 405. The first electrode 401 preferably reflects visible light. The spacer 496 is provided over the insulating layer 405. The spacer 496 allows adjustment of the distance between the flexible substrate 420 and the flexible substrate 428.

Moreover, the light-emitting device includes the coloring layer 432 overlapping with the organic EL element 450 with the bonding layer 407 provided therebetween, and the light-blocking layer 431 overlapping with the insulating layer 405 with the bonding layer 407 provided therebetween.

The driver circuit portion 493 includes a plurality of transistors. FIG. 13B illustrates one of the transistors in the driver circuit portion 493.

The conductive layer 457 is electrically connected to an external input terminal through which a signal or a potential from the outside is transmitted to the driver circuit portion 493. Here, the example in which the FPC 495 is provided as the external input terminal is described. Moreover, here, the example in which the conductive layer 457 is formed using the same material and the same step(s) as those of the electrodes of the transistor 455 is described.

In the light-emitting device illustrated in FIG. 13B, the connector 497 is located over the insulating layer 226. The connector 497 is connected to the conductive layer 457 through an opening formed in the flexible substrate 428, the bonding layer 426, the insulating layer 226, the bonding layer 407, the insulating layer 465, and the insulating layer 463. Moreover, the connector 497 is connected to the FPC 495. The FPC 495 and the conductive layer 457 are electrically connected to each other through the connector 497. In the case where the conductive layer 457 and the flexible substrate 428 overlap with each other, the conductive layer 457, the connector 497, and the FPC 495 are electrically connected to one another by forming an opening in the flexible substrate 428 (or using a flexible substrate having an opening).

The insulating layer 424 preferably has an excellent gas barrier property, in which case moisture and oxygen from the flexible substrate 420 side can be prevented from entering the light-emitting device. Similarly, the insulating layer 226 preferably has an excellent gas barrier property, in which case moisture and oxygen from the flexible substrate 428 side can be prevented from entering the light-emitting device.

The light-emitting device described in Structural Example 3 can be fabricated with high yield using the separating method described above. According to the separating method, the insulating layer 424, the transistors, the organic EL element 450, and the like are formed over the formation substrate, as a layer to be separated. Then, the insulating layer 226, the coloring layer 432, the light-blocking layer 431, and the like are formed over another formation substrate, as a layer to be separated. After the two formation substrates are bonded to each other, the layers to be separated and the formation substrates are separated from each other. Then, the layers to be separated and the flexible substrates are bonded to each other with a bonding layer, so that the light-emitting device described in Structural Example 3 can be fabricated.

According to the separating method of one embodiment of the present invention, an insulating layer and transistors can be formed over a formation substrate at high temperature. The use of the insulating layer 424, the insulating layer 226, and the transistors formed at high temperature enables the light-emitting device to have high reliability. The insulating layers with an excellent gas barrier property (insulating layers 226 and 424) formed at high temperature can be provided over and below the organic EL element 450. This can prevent impurities such as moisture from entering the organic EL element 450.

Structural Example 4

FIG. 13A2 is a plan view of a light-emitting device, and FIG. 13C is a cross-sectional view along dashed-dotted line X6-Y6 in FIG. 13A2. The light-emitting device illustrated in FIG. 13A2 is a top-emission light-emitting device using a color filter method.

The light-emitting device illustrated in FIG. 13C includes the flexible substrate 420, the bonding layer 422, the insulating layer 424, the transistor 455, the insulating layer 463, the insulating layer 465, the insulating layer 405, the organic EL element 450 (the first electrode 401, the EL layer 402, and the second electrode 403), a frame-like bonding layer 404a, a frame-like bonding layer 404b, the bonding layer 407, the overcoat 453, the light-blocking layer 431, the coloring layer 432, the insulating layer 226, the bonding layer 426, the flexible substrate 428, and the conductive layer 457. The flexible substrate 428, the bonding layer 426, the insulating layer 226, the bonding layer 407, the overcoat 453, and the second electrode 403 transmit visible light.

In the light-emitting portion 491 of the light-emitting device in FIG. 13C, the transistor 455 and the organic EL element 450 are provided over the flexible substrate 420 with the bonding layer 422 and the insulating layer 424 provided therebetween. The organic EL element 450 includes the first electrode 401 over the insulating layer 465, the EL layer 402 over the first electrode 401, and the second electrode 403 over the EL layer 402. The first electrode 401 is electrically connected to a source electrode or a drain electrode of the transistor 455. The end portion of the first electrode 401 is covered with the insulating layer 405. The first electrode 401 preferably reflects visible light. Moreover, the light-emitting device includes the coloring layer 432 overlapping with the organic EL element 450 with the bonding layer 407 provided therebetween, and the light-blocking layer 431 overlapping with the insulating layer 405 with the first bonding layer 407 provided therebetween.

The driver circuit portion 493 includes a plurality of transistors. FIG. 13C illustrates one of the transistors in the driver circuit portion 493. An example where the driver circuit portion 493 is positioned in a region surrounded by the frame-like bonding layers 404a and 404b is described in this embodiment; however, the driver circuit portion 493 may be positioned outside one or both of the frame-like bonding layers 404a and 404b.

The conductive layer 457 is electrically connected to an external input terminal through which a signal or a potential from the outside is transmitted to the driver circuit portion 493. Here, the example in which the FPC 495 is provided as the external input terminal is described. Moreover, here, an example in which the conductive layer 457 is formed using the same material and the same step(s) as those of the electrodes of the transistor 455 is described. The connector 497 over the insulating layer 226 is connected to the conductive layer 457. Moreover, the connector 497 is connected to the FPC 495. The FPC 495 and the conductive layer 457 are electrically connected to each other through the connector 497.

The conductive layer 457 is preferably positioned outside the frame-like bonding layer 404a because the entry of impurities such as moisture into the organic EL element 450 can be prevented even in the case where moisture and the like easily enter from a connection portion between the FPC 495 and the connector 497 and a connection portion between the connector 497 and the conductive layer 457.

The light-emitting device illustrated in FIG. 13C is different from that in FIG. 13B in that the insulating layer 465 is covered at a side surface of the light-emitting device. In the case of using an organic insulating material or the like having an inferior gas barrier property as a material of the insulating layer 465, the insulating layer 465 is preferably covered at the side surface of the light-emitting device. In addition, the frame-like bonding layer having an excellent gas barrier property is preferably positioned at the side surface of the light-emitting device to increase the reliability of the light-emitting device. Note that the insulating layer 465 is not necessarily covered at an end portion of the light-emitting device depending on a material or the like for the insulating layer 465, as illustrated in FIG. 13B.

The frame-shaped bonding layer 404a and the frame-shaped bonding layer 404b each preferably have a more excellent gas barrier property than the bonding layer 407, in which case moisture and oxygen from the side surface of the light-emitting device can be prevented from entering the light-emitting device. Thus, the light-emitting device can be highly reliable.

For example, the frame-like bonding layer 404a has the lowest water vapor permeability among the bonding layer 407, the frame-like bonding layer 404a, and the frame-like bonding layer 404b. Particularly when the frame-like bonding layer 404b includes a desiccating agent or the like that adsorbs moisture, entry of moisture is suppressed by the frame-like bonding layer 404a and moisture that passes through the frame-like bonding layer 404a is adsorbed by the frame-like bonding layer 404b, whereby entry of moisture into the bonding layer 407, and furthermore, the organic EL element 450 can be suppressed.

In Structural Example 4, light emission of the organic EL element 450 is extracted from the light-emitting device through the bonding layer 407. For this reason, the bonding layer 407 preferably has a more excellent light-transmitting property than the frame-like bonding layers 404a and 404b. Furthermore, the bonding layer 407 preferably has a higher refractive index than the frame-like bonding layers 404a and 404b. In addition, it is preferred that the volume of the bonding layer 407 be less reduced by curing than those of the frame-like bonding layers 404a and 404b.

The light-emitting device described in Structural Example 4 can be fabricated with high yield using the separating method described above. According to the separating method, the insulating layer 424, the transistors, the organic EL element 450, and the like are formed over the formation substrate, as a layer to be separated. Then, the insulating layer 226, the coloring layer 432, the light-blocking layer 431, and the like are formed over another formation substrate, as a layer to be separated. After the two formation substrates are bonded to each other, the layers to be separated and the formation substrates are separated from each other. Then, the layers to be separated and the flexible substrates are bonded to each other with a bonding layer, so that the light-emitting device described in Structural Example 4 can be fabricated.

According to the separating method described above, an insulating layer and transistors can be formed over a formation substrate at high temperature. The use of the insulating layer 424, the insulating layer 226, and the transistors formed at high temperature enables the light-emitting device to have high reliability. The insulating layers with an excellent gas barrier property (insulating layers 226 and 424) formed at high temperature can be provided over and below the organic EL element 450. This can prevent impurities such as moisture from entering the organic EL element 450.

As described above, in Structural Example 4, the insulating layer 424, the insulating layer 226, and the frame-like bonding layers 404a and 404b can suppress entry of impurities such as moisture from the front surface (display surface), the back surface (the surface opposite to the display surface), and side surfaces of the light-emitting device into the organic EL element 450. This increases the reliability of the light-emitting device.

Note that although an organic EL element is used as the display element here, one embodiment of the present invention is not limited thereto.

Note that in one embodiment of the present invention, an active matrix method in which an active element (non-linear element) is included in a pixel or a passive matrix method in which an active element is not included in a pixel can be used.

This embodiment can be freely combined with any of the other embodiments.

Embodiment 4

In this embodiment, structures of an input/output device of embodiments of the present invention will be described with reference to FIGS. 14A to 14C and FIGS. 15A to 15C.

Figure 14A:
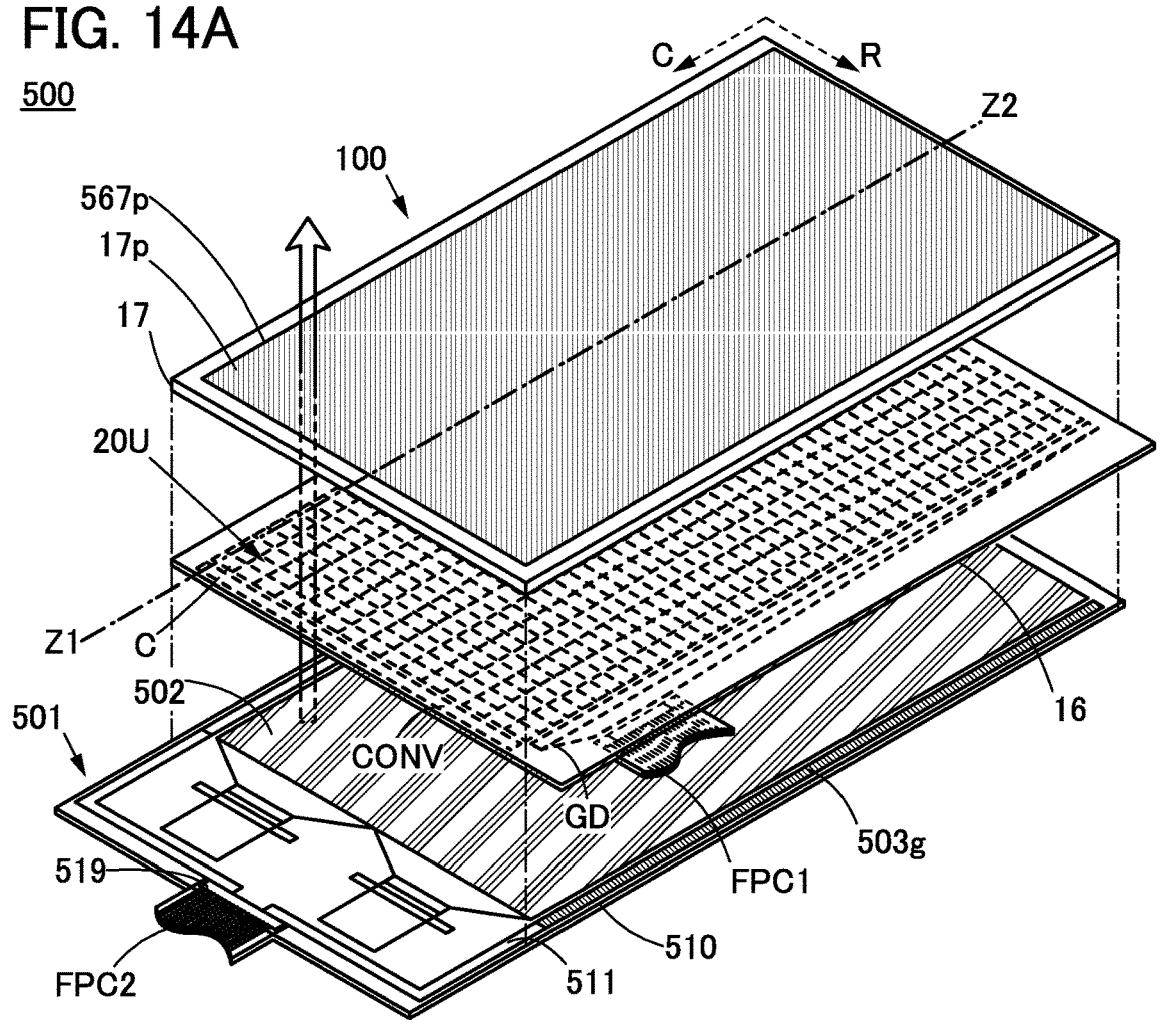
FIGS. 14A to 14C are projection views and a perspective view illustrating the structure of an input/output device of one embodiment of the present invention.
Figure 14B:
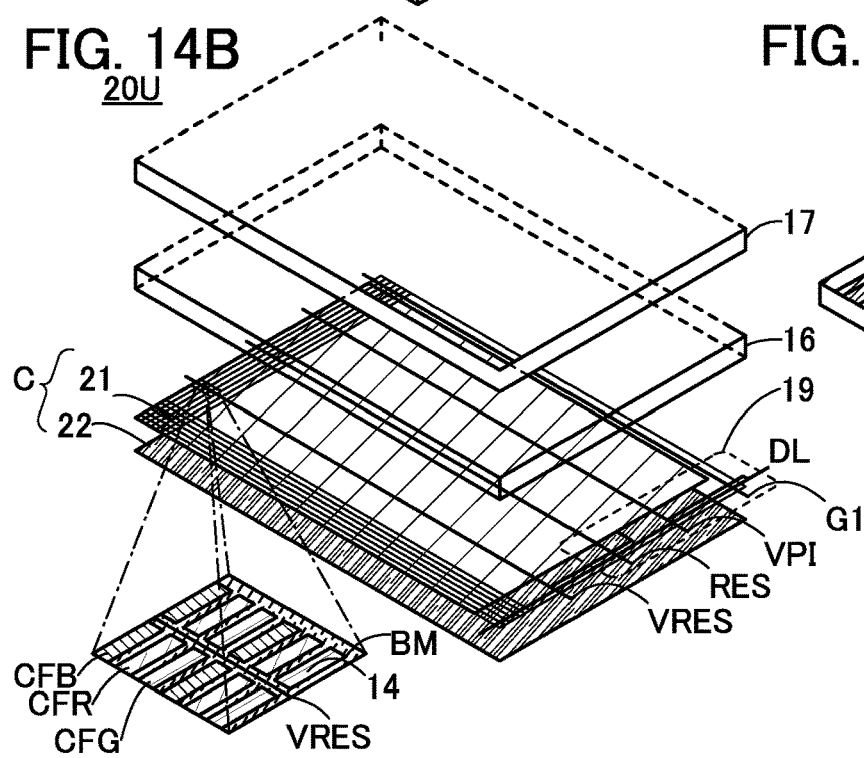
Figure 14C:
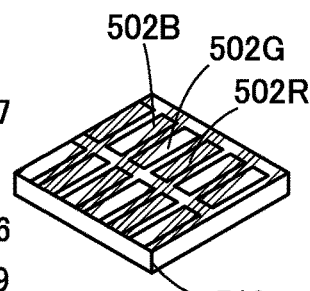

FIGS. 14A to 14C are projection views illustrating the structure of the input/output device of one embodiment of the present invention.

FIG. 14A is the projection view illustrating an input/output device 500 of one embodiment of the present invention. FIG. 14B is the projection view illustrating the structure of a sensing unit 20U included in the input/output device 500.

Figure 15A:
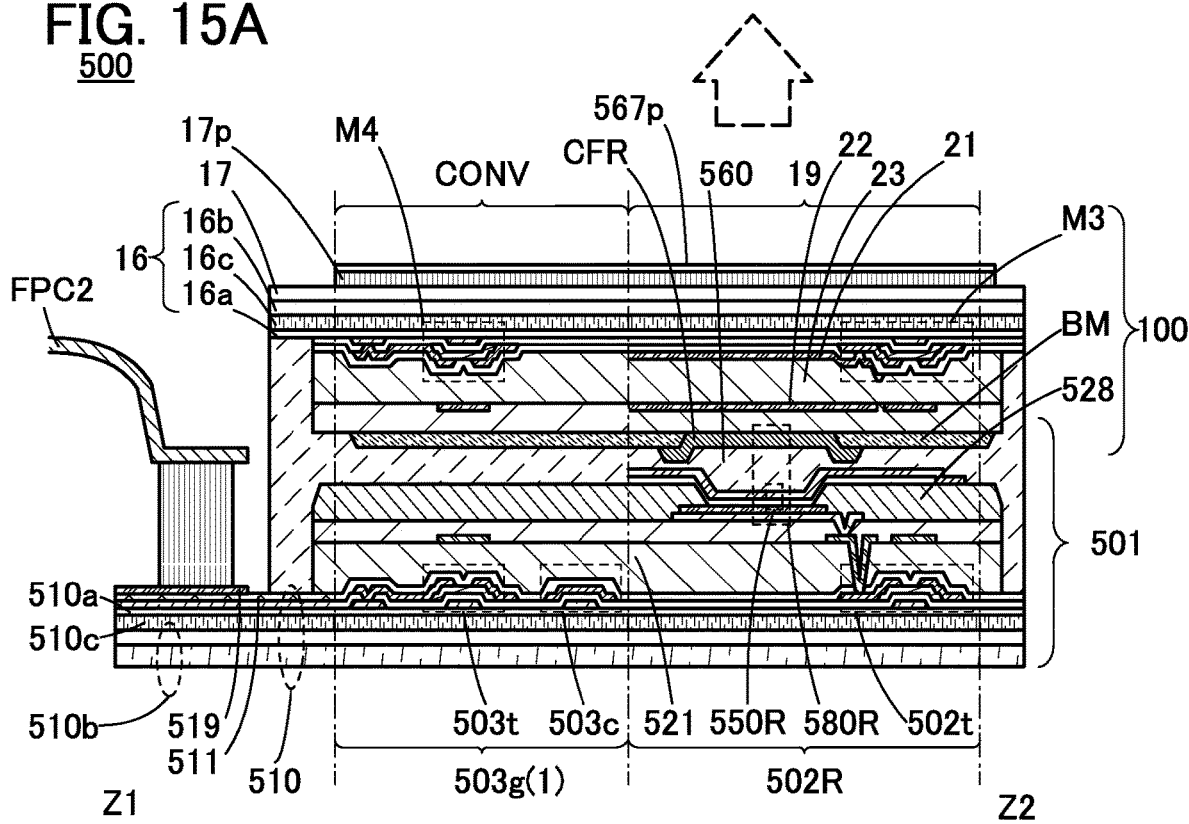
FIGS. 15A to 15C are cross-sectional views illustrating the structure of an input/output device of one embodiment of the present invention.
Figure 15B:
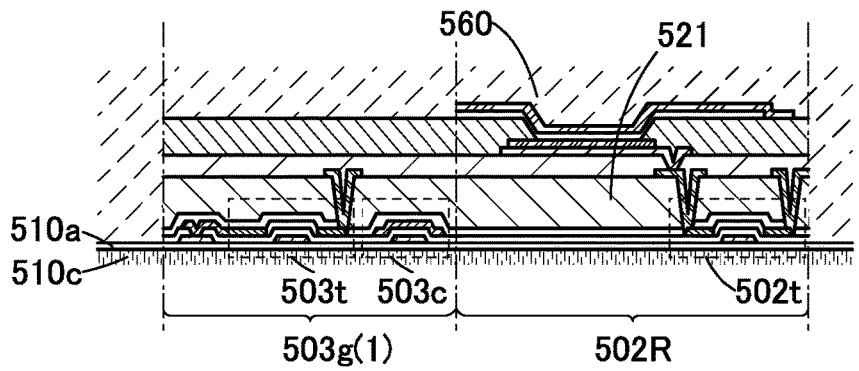
Figure 15C:
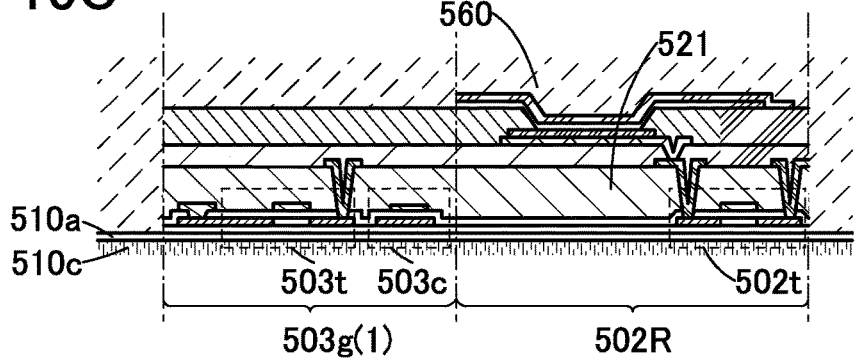

FIGS. 15A to 15C are cross-sectional views illustrating structures of the input/output device 500 of one embodiment of the present invention.

FIG. 15A is the cross-sectional view along Z1-Z2 of the input/output device 500 of one embodiment of the present invention that is illustrated in FIGS. 14A to 14C.

Note that the input/output device 500 can also be referred to as a touch panel.

Structural Example 1 of Input/Output Device

The input/output device 500 described in this embodiment includes a flexible input device 100 and a display portion 501 (see FIGS. 14A to 14C). The flexible input device 100 is provided with a plurality of sensing units 20U arranged in a matrix and including window portions 14 that transmit visible light; a scan line G1 electrically connected to the plurality of sensing units 20U arranged in the row direction (shown by an arrow R in FIG. 14A); a signal line DL electrically connected to the plurality of sensing units 20U arranged in the column direction (shown by an arrow C in FIG. 14A); and a first flexible base 16 supporting the sensing units 20U, the scan line G1, and the signal line DL. The display portion 501 is provided with a plurality of pixels 502 overlapping with the window portions 14 and arranged in a matrix; and a second flexible base 510 supporting the pixels 502.

The sensing unit 20U includes a sensing element C overlapping with the window portions 14 and a sensing circuit 19 electrically connected to the sensing element C (see FIG. 14B).

The sensing element C includes an insulating layer 23 and a first electrode 21 and a second electrode 22 between which the insulating layer 23 is sandwiched (see FIG. 15A).

The sensing circuit 19 is supplied with a selection signal, and supplies a sensing signal DATA in accordance with a change in the capacity of the sensing element C.

The scan line G1 can supply a selection signal. The signal line DL can supply the sensing signal DATA. The sensing circuit 19 is provided so as to overlap with a gap between the window portions 14.

The input/output device 500 described in this embodiment further includes a coloring layer between the sensing units 20U and the pixels 502 overlapping with the window portions 14 of the sensing units 20U.

The input/output device 500 described in this embodiment includes the flexible input device 100 provided with the plurality of sensing units 20U including the window portions 14 that transmit visible light and the flexible display portion 501 provided with the plurality of pixels 502 overlapping with the window portions 14. In addition, the coloring layer is provided between the window portions 14 and the pixels 502.

With such a structure, the input/output device can supply a sensing signal depending on a change in capacity and the positional data of the sensing unit that supplies the sensing signal, can display image data associated with the positional data of the sensing unit, and can be bent. Thus, the novel input/output device can be highly convenient or reliable.

The input/output device 500 may be provided with an FPC 1 that is supplied with a signal supplied from the input device 100 and/or an FPC 2 that supplies a signal containing image data to the display portion 501.

The input/output device 500 may also be provided with a protective layer 17p that protects the input/output device 500 from suffering flaws and/or an antireflective layer 567p that reduces the intensity of external light the input/output device 500 reflects.

The input/output device 500 also includes a scan line driver circuit 503g that supplies a selection signal to the scan line of the display portion 501 and a terminal 519 electrically connected to the FPC 2 and a wiring 511 that supplies a signal.

Individual components included in the input/output device 500 will be described below. Note that these components cannot be clearly distinguished and one component also serves as another component or include part of another component in some cases.

For example, the input device 100 provided with the coloring layer overlapping with the plurality of window portions 14 also serves as a color filter.

For example, the input/output device 500 where the input device 100 overlaps with the display portion 501 serves as the input device 100 and the display portion 501.

<<Overall Structure>>

The input/output device 500 includes the input device 100 and the display portion 501 (see FIG. 14A).

<<Input Device 100>>

The input device 100 is provided with the plurality of sensing units 20U and the flexible base 16 supporting the sensing units. For example, the plurality of sensing units 20U are arranged in a matrix of 40 rows and 15 columns over the flexible base 16.

<<Window Portion 14, Coloring Layer, and Light-Blocking Layer BM>>

The window portion 14 can transmit visible light.

The coloring layer that transmits light of a predetermined color is provided so as to overlap with the window portions 14. For example, a coloring layer CFB that transmits blue light, a coloring layer CFG that transmits green light, or a coloring layer CFR that transmits red light is provided (see FIG. 14B).

Note that besides the coloring layer that transmits blue light, the coloring layer that transmits green light, and/or the coloring layer that transmits red light, a coloring layer that transmits light of any of a variety of colors such as white and yellow can also be provided.

A metal material, pigment, dye, or the like can be used for the coloring layer.

The light-blocking layer BM is provided so as to surround the window portions 14. The light-blocking layer BM transmits light less easily than the window portions 14.

Carbon black, a metal oxide, a composite oxide containing a solid solution of a plurality of metal oxides, or the like can be used for the light-blocking layer BM.

The scan line G1, the signal line DL, a wiring VPI, a wiring RES, a wiring VRES, and the sensing circuit 19 are provided so as to overlap with the light-blocking layer BM.

Note that a light-transmitting overcoat layer can be provided so as to cover the coloring layer and the light-blocking layer BM.

<<Sensing Element C>>

The sensing element C includes the first electrode 21, the second electrode 22, and the insulating layer 23 between the first electrode 21 and the second electrode 22 (see FIG. 15A).

The first electrode 21 is formed in, for example, an island shape so as to be separated from other regions. A layer that can be formed in the same process as the first electrode 21 is particularly preferably provided in the proximity of the first electrode 21 so that the first electrode 21 is not recognized by a user of the input/output device 500. It is more preferred that the number of the window portions 14 provided in a gap between the first electrode 21 and the layer provided in the proximity of the first electrode 21 be as small as possible. It is particularly preferred that the window portions 14 not be provided in the gap.

The second electrode 22 is provided so as to overlap with the first electrode 21, and the insulating layer 23 is provided between the first electrode 21 and the second electrode 22.

For example, when a sensing target (specifically, a finger or the like) having a dielectric constant different from that of the air approaches the first electrode 21 or the second electrode 22 of the sensing element C placed in the air, the capacitance of the sensing element C is changed. Thus, the sensing element C can be used as a proximity sensor.

For example, the capacitance of the sensing element C that can change its form varies with the change in the form of the sensing element C.

Specifically, when a sensing target such as a finger touches the sensing element C and a gap between the first electrode 21 and the second electrode 22 becomes small, the capacitance of the sensing element C increases. Thus, the sensing element C can be used as a contact sensor.

Alternatively, when the sensing element C is folded, the gap between the first electrode 21 and the second electrode 22 becomes small. Consequently, the capacitance of the sensing element C increases. Thus, the sensing element C can be used as a folding sensor.

The first electrode 21 and the second electrode 22 are formed using a conductive material.

For example, an inorganic conductive material, an organic conductive material, metal, conductive ceramics, or the like can be used for the first electrode 21 and the second electrode 22.

Specifically, a metal element selected from aluminum, chromium, copper, tantalum, titanium, molybdenum, tungsten, nickel, silver, and manganese; an alloy containing any of the above-described metal elements; an alloy containing any of the above-described metal elements in combination; or the like can be used.

Alternatively, a conductive oxide such as indium oxide, indium tin oxide, indium zinc oxide, zinc oxide, or zinc oxide to which gallium is added can be used.

Alternatively, graphene or graphite can be used. A film containing graphene can be formed, for example, by reducing a film containing graphene oxide. As a reducing method, a method using heat, a method using a reducing agent, or the like can be employed.

Alternatively, a conductive macromolecule can be used.

<<Sensing Circuit 19>>

The sensing circuit 19 includes, for example, transistors M1 to M3. The sensing circuit 19 also includes wirings that supply power supply potentials and signals, such as the wiring VPI, a wiring CS, the scan line G1, the wiring RES, the wiring VRES, and the signal line DL. Note that the specific configuration of the sensing circuit 19 will be described in detail in Embodiment 5.

Note that the sensing circuit 19 may be provided so as not to overlap with the window portions 14. For example, the wirings are provided so as not to overlap with the window portions 14, whereby an object on one side of the sensing unit 20U can be easily viewed from the other side.

The transistors M1 to M3 can be formed in the same process, for example.

The transistor M1 includes a semiconductor layer. For example, a Group 14 element, a compound semiconductor, or an oxide semiconductor can be used for the semiconductor layer. Specifically, a silicon-containing semiconductor, a gallium arsenide-containing semiconductor, an indium-containing oxide semiconductor, or the like can be used.

Note that the structure of the transistor including a semiconductor layer using an oxide semiconductor will be described in detail in Embodiment 5.

A conductive material can be used for the wirings.

For example, an inorganic conductive material, an organic conductive material, metal, conductive ceramics, or the like can be used for the wirings. Specifically, the materials that can be used for the first electrode 21 and the second electrode 22 can be used.

A metal material such as aluminum, gold, platinum, silver, nickel, titanium, tungsten, chromium, molybdenum, iron, cobalt, copper, or palladium or an alloy material containing any of the metal materials can be used for the scan line G1, the signal line DL, the wiring VPI, the wiring RES, and the wiring VRES.

Films formed over the base 16 may be processed into the sensing circuit 19.

Alternatively, the sensing circuit 19 formed on any other base may be transferred to the base 16.

Note that a manufacturing method of a sensing circuit will be described in detail in Embodiment 5.

<<Base 16>>

As a material of the base 16, an organic material, an inorganic material, or a composite material of an organic material and an inorganic material can be used.

The base 16 can be formed using a material with a thickness in the range from 5 μm to 2500 μm, preferably from 5 μm to 680 μm, more preferably from 5 μm to 170 μm, more preferably from 5 μm to 45 μm, more preferably from 5 μm to 45 μm, more preferably from 8 μm to 25 μm.

Materials with which passage of impurities is inhibited can be favorably used in the base 16. For example, materials with a vapor permeability of lower than or equal to $10^{-5}$ g/m²·day, preferably lower than or equal to $10^{-6}$ g/m²·day can be favorably used.

The base 16 can be favorably formed using a material whose coefficient of linear expansion is substantially equal to that of the second base 510. For example, the coefficient of linear expansion of the material is preferably lower than or equal to $1\times10^{-3}$/K, more preferably lower than or equal to $5\times10^{-5}$/K, and still more preferably lower than or equal to $1\times10^{-5}$/K.

Examples of the material of the base 16 include organic materials such as a resin, a resin film, and a plastic film.

Examples of the material of the base 16 include inorganic materials such as a metal plate and a thin glass plate with a thickness of more than or equal to 10 μm and less than or equal to 50 μm.

Examples of the material of the base 16 include composite materials such as resin films to which a metal plate, a thin glass plate, or a film of an inorganic material is attached using a resin layer.

Examples of the material of the base 16 include composite materials such as resins or resin films into which a fibrous or particulate metal, glass, or inorganic material is dispersed.

For example, a thermosetting resin or an ultraviolet curable resin can be used for a resin layer.

Specifically, a resin film or resin plate of polyester, polyolefin, polyamide, polyimide, polycarbonate, an acrylic resin, or the like can be used.

Alternatively, as glass, non-alkali glass, soda-lime glass, potash glass, crystal glass, or the like can be used.

Alternatively, a metal oxide film, a metal nitride film, a metal oxynitride film, or the like can be used. For example, silicon oxide, silicon nitride, silicon oxynitride, an alumina film, or the like can be used.

Alternatively, SUS, aluminum, or the like provided with an opening can be used.

Alternatively, a resin such as an acrylic resin, a urethane resin, an epoxy resin, or a resin having a siloxane bond can be used.

For example, a stack in which a flexible base 16b, a barrier film 16a that prevents diffusion of impurities, and a resin layer 16c that bonds the barrier film 16a to the base 16b are stacked can be favorably used for the base 16 (see FIG. 15A).

A film including a layered material in which a 600-nm silicon oxynitride film and a 200-nm silicon nitride film are stacked can be specifically used as the barrier film 16a.

Alternatively, a film including a layered material of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film stacked in this order can be used as the barrier film 16a.

Specifically, a resin film, resin plate, or a stack of polyester, polyolefin, polyamide, polyimide, polycarbonate, an acrylic resin, or the like can be used as the base 16b.

For example, materials that contain polyester, polyolefin, polyamide (e.g., nylon and aramid), polyimide, polycarbonate, or a resin having an acrylic bond, an urethane bond, an epoxy bond, or a siloxane bond can be used for the resin layer 16c.

<<Protective Base 17, Protective Layer 17p>>

A flexible protective base 17 and/or the protective layer 17p can be provided. The flexible protective base 17 or the protective layer 17p protects the input device 100 from suffering flaws.

For example, a resin film, resin plate, stack, or the like of polyester, polyolefin, polyamide, polyimide, polycarbonate, an acrylic resin, or the like can be used as the protective base 17.

For example, a hard coat layer or a ceramic coat layer can be used as the protective layer 17p. Specifically, a layer containing a UV curable resin or aluminum oxide may be formed so as to overlap with the second electrode 22.

<<Display Portion 501>>

The display portion 501 includes the plurality of pixels 502 arranged in a matrix (see FIG. 14C).

For example, the pixel 502 includes a sub-pixel 502B, a sub-pixel 502G, and a sub-pixel 502R. Each sub-pixel includes a display element and a pixel circuit that drives the display element.

Note that the sub-pixel 502B in the pixel 502 is positioned so as to overlap with the coloring layer CFB, the sub-pixel 502G is positioned so as to overlap with the coloring layer CFG, and the sub-pixel 502R is positioned so as to overlap with the coloring layer CFR.

In this embodiment, an example of using an organic electroluminescent element that emits white light as a display element will be described; however, the display element is not limited to such an element.

For example, organic electroluminescent elements that emit light of different colors may be included in sub-pixels so that the light of different colors can be emitted from the respective sub-pixels.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (metal insulator metal), a TFD (thin film diode), or the like can also be used. Since such an element has a small number of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

<<Second Base 510>>

A flexible material can be used for the second base 510. For example, a material that can be used for the base 16 can be used for the second base 510.

A stack in which a flexible base 510b, a barrier film 510a that prevents diffusion of impurities, and a resin layer 510c that bonds the barrier film 510a to the base 510b are stacked can be favorably used for the second base 510, for example (see FIG. 15A).

<<Sealant 560>>

The sealant 560 bonds the base 16 and the second base 510 together. The sealant 560 has a refractive index higher than that of the air. In the case of extracting light to the sealant 560 side, the sealant 560 has a function of optical adhesion.

The pixel circuits and the light-emitting elements (e.g., a light-emitting element 550R) are provided between the second base 510 and the base 16.

<<Pixel Structure>>

The sub-pixel 502R includes a light-emitting module 580R.

The sub-pixel 502R includes the first light-emitting element 550R and the pixel circuit that can supply power to the first light-emitting element 550R and includes a transistor 502t. The light-emitting module 580R includes the light-emitting element 550R and an optical element (e.g., the coloring layer CFR).

The first light-emitting element 550R includes a lower electrode, an upper electrode, and a layer containing a light-emitting organic compound between the lower electrode and the upper electrode.

The light-emitting module 580R includes the coloring layer CFR on the light extraction side. The coloring layer transmits light with a particular wavelength and is, for example, a layer that selectively transmits red, green, or blue light. Note that other sub-pixels may be provided so as to overlap with the window portions, which are not provided with the coloring layers, so that light from the light-emitting element can be emitted without passing through the coloring layers.

In the case where the sealant 560 is provided on the light extraction side, the sealant 560 is in contact with the light-emitting element 550R and the coloring layer CFR.

The coloring layer CFR is positioned in a region overlapping with the light-emitting element 550R. Accordingly, part of light emitted from the light-emitting element 550R passes through the coloring layer CFR and is emitted to the outside of the light-emitting module 580R as indicated by an arrow in FIG. 15A.

The light-blocking layer BM is located so as to surround the coloring layer (e.g., the coloring layer CFR).

<<Structure of Pixel Circuit>>

An insulating film 521 covering the transistor 502t included in the pixel circuit is provided. Note that the insulating film 521 can be used as a layer for planarizing unevenness due to the pixel circuit. A layered film including a layer that can prevent diffusion of impurities can be used as the insulating film 521. This can prevent the reliability of the transistor 502t or the like from being lowered by diffusion of impurities.

The lower electrode is provided over the insulating film 521, and a partition wall 528 is provided over the insulating film 521 so as to overlap with an end portion of the lower electrode.

The lower electrode is included in the light-emitting element (e.g., the light-emitting element 550R); the layer containing a light-emitting organic compound is provided between the upper electrode and the lower electrode. The pixel circuit supplies power to the light-emitting element.

Furthermore, a spacer that adjusts a gap between the base 16 and the second base 510 is provided over the partition wall 528.

<<Configuration of Scan Line Driver Circuit>>

A scan line driver circuit 503g(1) includes a transistor 503t and a capacitor 503c. Note that transistors used in the pixel circuit and transistors used in the driver circuit can be formed in the same process and over the same substrate.

<<Converter CONV>>

Any of various circuits that can convert the sensing signal DATA supplied from the sensing unit 20U and supply a signal obtained by the conversion to the FPC 1 can be used for a converter CONV (see FIG. 14A and FIG. 15A).

For example, a transistor M4 can be used in the converter CONV.

<<Other Components>>

The display portion 501 includes an anti-reflective layer 567p positioned in a region overlapping with pixels. As the anti-reflective layer 567p, a circular polarizing plate can be used, for example.

The display portion 501 includes the wirings 511 through which signals are supplied. The wirings 511 are provided with the terminal 519. Note that the FPC 2 through which a signal such as an image signal or a synchronization signal can be supplied is electrically connected to the terminal 519.

Note that a printed wiring board (PWB) may be attached to the FPC 2.

The display portion 501 includes wirings such as scan lines, signal lines, and power supply lines. Any of various conductive films can be used for the wirings.

Specifically, a metal element selected from aluminum, chromium, copper, tantalum, titanium, molybdenum, tungsten, nickel, yttrium, zirconium, silver, and manganese; an alloy containing any of the above-described metal elements; an alloy containing any of the above-described metal elements in combination; or the like can be used. In particular, one or more elements selected from aluminum, chromium, copper, tantalum, titanium, molybdenum, and tungsten are preferably contained. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a layered structure in which a film of an element selected from titanium, tantalum, tungsten, molybdenum, chromium, neodymium, and scandium, an alloy film containing some of these elements, or a nitride film of any of these elements is stacked over an aluminum film can be used.

Alternatively, a light-transmitting conductive material containing indium oxide, tin oxide, or zinc oxide may be used.

Modification Example of Display Portion

Any of various kinds of transistors can be used in the display portion 501.

A structure of the case of using bottom-gate transistors in the display portion 501 is illustrated in FIGS. 15A and 15B.

For example, a semiconductor layer containing an oxide semiconductor, amorphous silicon, or the like can be used in the transistor 502*t* and the transistor 503*t* illustrated in FIG. 15A.

For example, a semiconductor layer containing polycrystalline silicon that is obtained by crystallization process such as laser annealing can be used in the transistor 502*t* and the transistor 503*t* illustrated in FIG. 15B.

A structure of the case of using top-gate transistors in the display portion 501 is illustrated in FIG. 15C.

For example, a semiconductor layer containing polycrystalline silicon, a single crystal silicon film that is transferred from a single crystal silicon substrate, or the like can be used in the transistor 502*t* and the transistor 503*t* illustrated in FIG. 15C.

This embodiment can be combined with any of the other embodiments in this specification as appropriate.

Embodiment 5

In this embodiment, the configuration and a driving method of a sensing circuit that can be used for the sensing unit in the input/output device of embodiments of the present invention will be described with reference to FIGS. 16A, 16B1, and 16B2.

FIGS. 16A, 16B1, and 16B2 illustrate the configuration and driving methods of the sensing circuit 19 and the converter CONV of one embodiment of the present invention.

FIG. 16A is a circuit diagram illustrating the configuration of the sensing circuit 19 and the converter CONV of one embodiment of the present invention. FIGS. 16B1 and 16B2 are timing charts illustrating the driving methods.

The sensing circuit 19 of one embodiment of the present invention includes the first transistor M1 whose gate is electrically connected to the first electrode 21 of the sensing element C and whose first electrode is electrically connected to the wiring VPI that can supply a ground potential, for example (see FIG. 16A).

The sensing circuit 19 may further include the second transistor M2 whose gate is electrically connected to the scan line G1 that can supply a selection signal, whose first electrode is electrically connected to a second electrode of the first transistor M1, and whose second electrode is electrically connected to the signal line DL that can supply the sensing signal DATA, for example.

The sensing circuit 19 may further include the third transistor M3 whose gate is electrically connected to the wiring RES that can supply a reset signal, whose first electrode is electrically connected to the first electrode 21 of the sensing element C, and whose second electrode is electrically connected to, for example, the wiring VRES that can supply a ground potential.

The capacitance of the sensing element C varies, for example, when an object gets closer to the first electrode 21 or the second electrode 22 or when a gap between the first electrode 21 and the second electrode 22 is changed. Thus, a sensor 20B can supply the sensing signal DATA in accordance with a change in the capacitance of the sensing element C.

The sensor 20B is provided with the wiring CS that can supply a control signal for controlling the potential of the second electrode 22 of the sensing element C.

Note that a portion where the first electrode 21 of the sensing element C, the gate of the first transistor M1, and the first electrode of the third transistor are electrically connected is referred to as a node A.

The wiring VRES and the wiring VPI can supply, for example, a ground potential. A wiring VPO and a wiring BR can supply, for example, a high power supply potential.

The wiring RES can supply a reset signal. The scan line G1 can supply a selection signal. The wiring CS can supply a control signal for controlling the potential of the second electrode 22 of the sensing element C.

The signal line DL can supply the sensing signal DATA. A terminal OUT can supply a signal obtained by conversion based on the sensing signal DATA.

Note that any of various circuits that can convert the sensing signal DATA and supply a signal obtained by the conversion to the terminal OUT can be used for the converter CONV. The converter CONV may be electrically connected to the sensing circuit 19 to form a source follower circuit, a current mirror circuit, or the like, for example.

Specifically, a source follower circuit can be formed using the converter CONV including the transistor M4 (see FIG. 16A). Note that the transistor M4 may be formed in the same process as the first to third transistors M1 to M3.

The transistors M1 to M3 each include a semiconductor layer. For example, a Group 4 element, a compound semiconductor, or an oxide semiconductor can be used for the semiconductor layer. Specifically, a silicon-containing semiconductor, a gallium arsenide-containing semiconductor, an indium-containing oxide semiconductor, or the like can be used.

Note that the structure of a transistor using an oxide semiconductor for a semiconductor layer will be described in detail in Embodiment 5.

Driving Method of Sensing Circuit 19

The driving method of the sensing circuit 19 will be described.

<<First Step>>

In a first step, after the third transistor is turned on, a reset signal for turning off the third transistor is supplied to the gate of the third transistor, so that the potential of the first electrode of the sensing element C is set to a predetermined potential (see Period T1 in FIG. 16B1).

Specifically, the wiring RES is made to supply a reset signal. The third transistor supplied with the reset signal renders the potential of the node A a ground potential, for example (see FIG. 16A).

<<Second Step>>

In a second step, a selection signal for turning on the second transistor M2 is supplied to the gate of the second transistor M2, so that the second electrode of the first transistor is electrically connected to the signal line DL.

Specifically, the scan line G1 is made to supply a selection signal. The second transistor M2 supplied with the selection signal electrically connects the second electrode of the first transistor and the signal line DL (see Period T2 in FIG. 16B1).

<<Third Step>>

In a third step, a control signal is supplied to the second electrode of the sensing element C, and a control signal and the potential that varies depending on the capacitance of the sensing element C are supplied to the gate of the first transistor M1.

Specifically, a rectangular control signal is supplied to the wiring CS. The sensing element C whose second electrode 22 is supplied with the rectangular control signal increases the potential of the node A in accordance with the capacitance of the sensing element C (see the latter part of Period T2 in FIG. 16B1).

For example, when the sensing element C is placed in the air and an object having a higher dielectric constant than the air is placed in the proximity of the second electrode 22 of the sensing element C, the apparent capacitance of the sensing element C is increased.

Thus, a change in the potential of the node A caused by the rectangular control signal is smaller than that when an object having a higher dielectric constant than the air is not placed in the proximity of the second electrode 22 of the sensing element C (see a solid line in FIG. 16B2).

<<Fourth Step>>

In a fourth step, a signal caused by a change in the potential of the gate of the first transistor M1 is supplied to the signal line DL.

For example, a change in current caused by a change in the potential of the gate of the first transistor M1 is supplied to the signal line DL.

The converter CONV converts a change in current flowing through the signal line DL into a voltage change and supplies the voltage change.

<<Fifth Step>>

In a fifth step, a selection signal for turning off the second transistor is supplied to the gate of the second transistor.

This embodiment can be combined with any of the other embodiments in this specification as appropriate.

Embodiment 6

In this embodiment, an example in which a laminated lithium-ion secondary battery is fabricated with the use of a film as an exterior body will be described. The laminated lithium-ion secondary battery corresponds to the battery 117 illustrated in FIG. 4 of Embodiment 1.

First, a sheet made of a flexible material is prepared. As the sheet, a stacked body, a metal film provided with an adhesive layer (also referred to as a heat-seal layer) or sandwiched between adhesive layers is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene film and a polypropylene film is used as the sheet. This sheet is cut to obtain a film 31 illustrated in FIG. 19A.

Then, the film 31 may be embossed to form unevenness so that the pattern can be visually recognized. Although an example where the sheet is cut and then embossing is performed is described here, the order is not particularly limited; embossing may be performed before cutting the sheet and then the sheet may be cut. Alternatively, the sheet may be cut after thermocompression bonding is performed with the sheet bent.

Note that embossing refers to processing for forming unevenness on a surface of a film by bringing an embossing roll whose surface has unevenness into contact with the film with pressure. The embossing roll is a roll whose surface is patterned. The embossing roll is not necessarily used, and an embossing plate may be used. Furthermore, embossing is not necessarily employed, and any method that allows formation of a relief on part of the film is employed.

In this embodiment, both surfaces of a film 31 are provided with unevenness to have patterns, and the film 31 is folded in half so that two end portions each including two of the four corners overlap with each other, and is sealed on three sides with an adhesive layer.

Figure 19A:
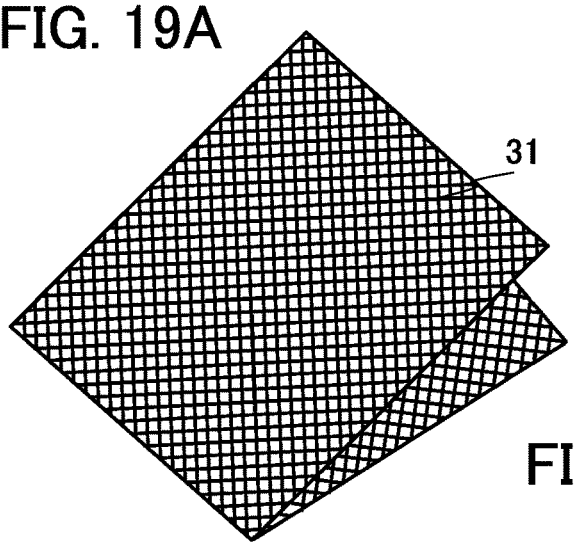
FIGS. 19A to 19F are perspective views, a cross-sectional view, and a schematic view illustrating one embodiment of the present invention.

Then, the film 31 is folded, whereby a state illustrated in FIG. 19A is produced.

Figure 19C:
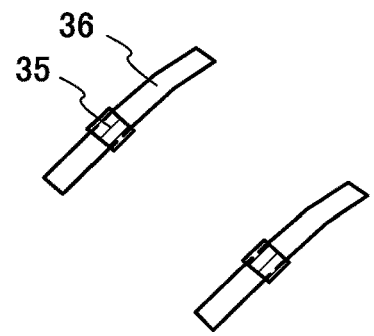
Figure 19B:
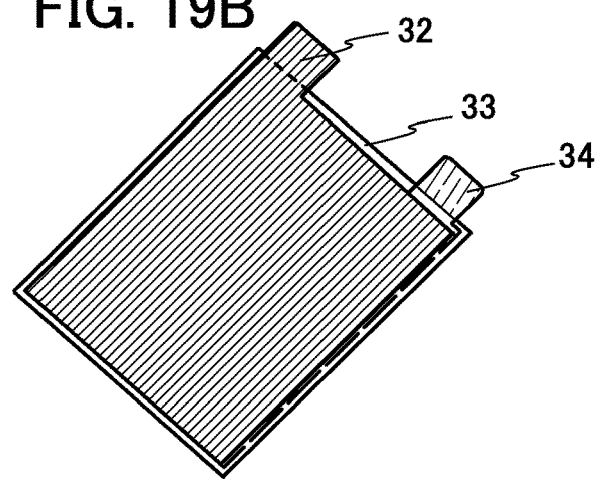

A positive electrode current collector 32, a separator 33, and a negative electrode current collector 34 that are stacked and included in a secondary battery as illustrated in FIG. 19B are prepared. The positive electrode current collector 32 and the negative electrode current collector 34 can each be formed using a highly conductive material that is not alloyed with a carrier ion of, for example, lithium, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 10 μm to 30 μm inclusive. Note that the example where one combination of the positive electrode current collector 32, the separator 33, and the negative electrode current collector 34 that are stacked is packed in an exterior body is illustrated here for simplicity. To increase the capacity of a secondary battery, a plurality of combinations may be stacked and packed in an exterior body. The separator 33 in the secondary battery may be used either by being folded or in a bag-like form in the secondary battery.

In addition, two lead electrodes 36 with sealing layers 35 illustrated in FIG. 19C are prepared. The lead electrodes 36 are each also referred to as a lead terminal and provided in order to lead a positive electrode or a negative electrode of a secondary battery to the outside of an exterior film.

Then, one of the lead electrodes is electrically connected to a protruding portion of the positive electrode current collector 32 by ultrasonic welding or the like. The other lead electrode is electrically connected to a protruding portion of the negative electrode current collector 34 by ultrasonic welding or the like.

Then, two sides of the film 31 are sealed by thermocompression bonding, and one side is left open for introduction of an electrolytic solution. In thermocompression bonding, the sealing layers 35 provided on the lead electrodes are also melted, thereby fixing the lead electrodes and the film 31 to each other. After that, in a reduced-pressure atmosphere or an inert atmosphere, a desired amount of electrolytic solution is introduced to the inside of the film 31 in the form of a bag. Lastly, the outer edge of the film that has not been subjected to thermocompression bonding and is left open is sealed by thermocompression bonding.

Figure 19D:
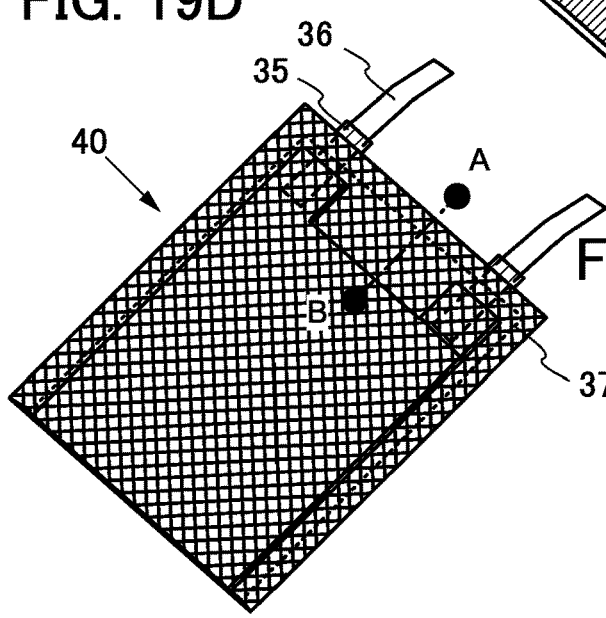

In this manner, a secondary battery 40 illustrated in FIG. 19D can be fabricated.

In the obtained secondary battery 40, the surface of the film 31 serving as an exterior body has a pattern including unevenness. An edge region indicated by a dotted line in FIG. 19D is a thermocompression-bonded region 37. A surface of the thermocompression-bonded region 37 also has a pattern including unevenness. Although the unevenness in the thermocompression-bonded region 37 is smaller than that in a center portion, it can relieve stress applied when the secondary battery is bent. Such a structure as can relieve a strain caused by stress can prevent the secondary battery (e.g., an exterior body) from being damaged when changed in form by being bent, for example, achieving long-time reliability.

Figure 19F:
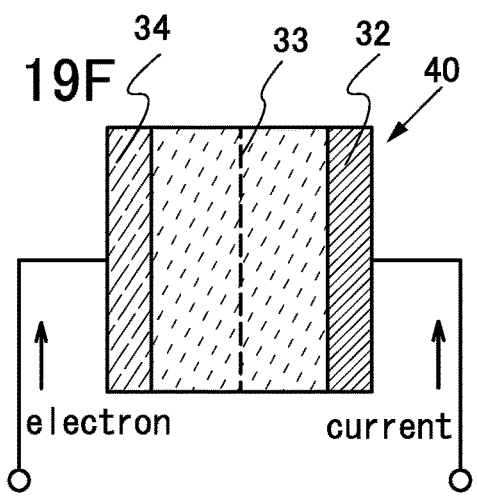
Figure 19E:
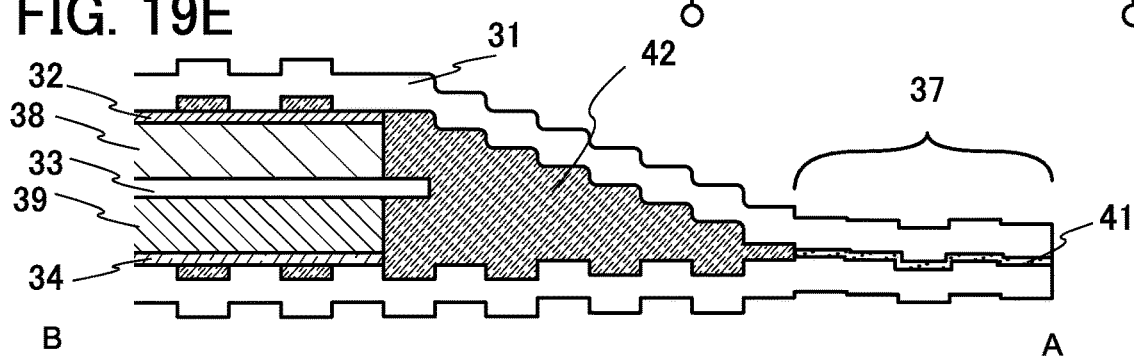

FIG. 19E illustrates an example of a cross section taken along dashed-dotted line A-B in FIG. 19D.

As illustrated in FIG. 19E, unevenness of the film 31 is different between a region overlapping with the positive electrode current collector 32 and the thermocompression-bonded region 37. As illustrated in FIG. 19E, the positive electrode current collector 32, a positive electrode active material layer 38, the separator 33, a negative electrode active material layer 39, and the negative electrode current collector 34 are stacked in this order and placed inside the folded film 31, an end portion is sealed with an adhesive layer 41, and the other space is provided with an electrolytic solution 42.

Examples of positive electrode active materials that can be used for the positive electrode active material layer 38 include a composite oxide with an olivine structure, a composite oxide with a layered rock-salt structure, and a composite oxide with a spinel structure. Specifically, a compound such as $LiFeO_2$, $LiCoO_2$, $LiNiO_2$, $LiMnO_{24}$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq 1$, $0<c<1$, $0<d<1$, and $0<e<1$), and $LiFe_fNi_gCo_hMn_iPO_4$ ($f+g+h+i\leq 1$, $0<f<1$, $0<g<1$, $0<h<1$, and $0<i<1$).

Alternatively, a complex material such as $Li_{(2-j)}MSiO_4$ (general formula) (M is one or more of Fe(II), Mn(II), Co(II), and Ni(II); $0\leq j\leq 2$) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\leq 1$, $0<m<1$, $0<n<1$, and $0<q<1$), and $Li_{(2-j)}Fe_rNi_sCo_tMn_uSiO_4$ ($r+s+t+u\leq 1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_{24})_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

As the separator 33, an insulator such as cellulose (paper), polyethylene with pores, polypropylene with pores, polyimide with pores, or a ceramic with pores can be used.

As an electrolyte of the electrolytic solution 42, a material that contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions or alkaline-earth metal ions, instead of lithium in the above lithium salts, an alkali metal (e.g., sodium and potassium), an alkaline-earth metal (e.g., calcium, strontium, barium, beryllium, and magnesium) may be used for the electrolyte.

As a solvent of the electrolytic solution, a material with the carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid is a salt in the liquid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N propylpiperidinium ($PP_{13}$) cation.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material of the negative electrode active material layer 39; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, a material which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as such a material, for example. Such elements have higher capacity than carbon. In particular, silicon has a significantly high theoretical capacity of 4200 mAh/g. For this reason, silicon is preferably used as the negative electrode active material. Examples of the material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active materials, an oxide such as SiO, SnO, $SnO_2$, titanium oxide (e.g., $TiO_2$), lithium titanium oxide (e.g., $Li_4Ti_5O_{12}$), lithium-graphite intercalation compound (e.g., $Li_xC_6$), niobium oxide (e.g., $Nb_2O_5$), tungsten oxide (e.g., $WO_2$), or molybdenum oxide (e.g., $MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 39 may further include a binder for increasing adhesion of active materials, a conductive additive for increasing the conductivity of the negative electrode active material layer 39, and the like in addition to the above negative electrode active materials.

In the secondary battery, for example, the separator 33 has a thickness of approximately 25 µm, the positive electrode current collector 32 has a thickness of approximately 20 µm to 40 µm, the positive electrode active material layer 38 has a thickness of approximately 100 µm, the negative electrode active material layer 39 has a thickness of approximately 100 µm, and the negative electrode current collector 34 has a thickness of approximately 20 µm to 40 µm. The film 31 has a thickness of 0.113 mm. Although the adhesive layer 41 is only partly illustrated in FIG. 19E, only a thermocompression-bonded portion of a layer made of polypropylene which is provided on the surface of the film 31 is the adhesive layer 41.

FIG. 19E illustrates an example where the bottom side of the film 31 is fixed and pressure bonding is performed. In this case, the top side is greatly bent and a step is formed. Thus, when a plurality of combinations of the above stacked layers (e.g., eight or more combinations) is provided inside the folded film 31, the step is large and the top side of the film 31 might be too stressed. Furthermore, an end face of the top side of the film might be misaligned with an end face of the bottom side of the film. To prevent misalignment of the end faces, a step may also be provided for the bottom side of the film and pressure bonding may be performed so that the thermocompression-bonded region 37 is positioned at a center portion in the thickness direction of the secondary battery, whereby stress is uniformly applied.

Here, a current flow in charging a secondary battery will be described with reference to FIG. 19F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Two terminals in FIG. 19F are connected to a charger, and a secondary battery 40 is charged. As the charge of the secondary battery 40 proceeds, a potential difference between electrodes increases. The positive direction in FIG. 19F is the direction in which a current flows from one terminal outside the secondary battery 40 to the positive electrode current collector 32, flows from the positive electrode current collector 32 to the negative electrode current collector 34 in the secondary battery 40, and flows from the negative electrode current collector 34 to the other terminal outside the secondary battery 40. In other words, a current flows in the direction of a flow of a charging current.

Although an example of application to a lithium-ion secondary battery is described in this embodiment, one embodiment of the present invention is not limited to this example. Application to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible.

Embodiment 7

In this embodiment, an example of a structure that is partly different from that of Embodiment 1 will be described with reference to FIGS. 25A and 25B.

Figure 25A:
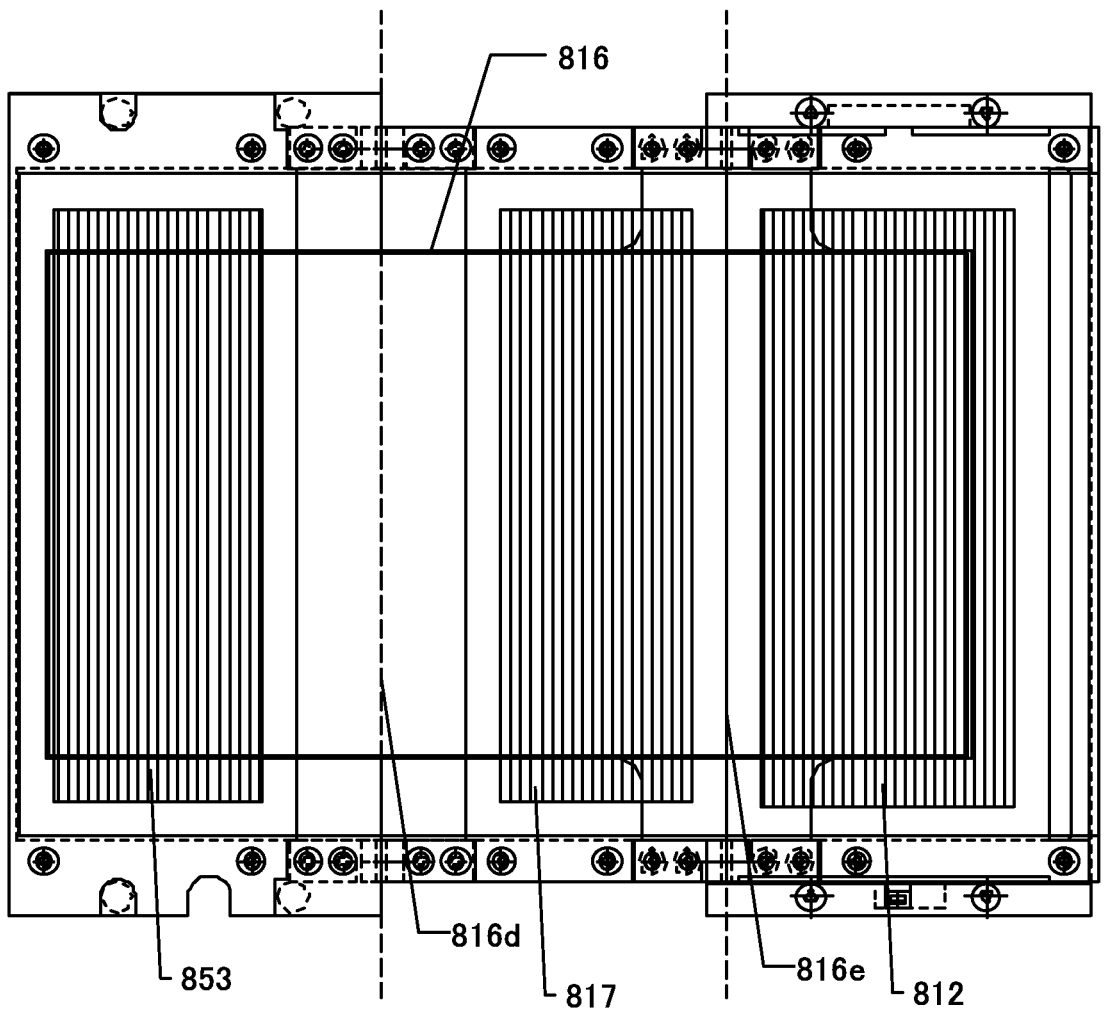
FIGS. 25A and 25B are a plan view and a cross-sectional view illustrating one embodiment of the present invention.

An example where the sizes and positions of three batteries are different as illustrated in FIG. 25A will be described.

FIG. 25A is a plan view illustrating an example of the positional relation of the display portion 816 and the batteries.

A bendable portion 816e of the display portion, which is shown by a dotted line in FIG. 25A is located between a battery 812 and a battery 817. A bendable portion 816d of the display portion, which is shown by a dotted line in FIG. 25A, and a hinge 813 are located between the battery 817 and a battery 853. A display region of the display portion 816 has a size of approximately 9.2 inches.

In this embodiment, a gap between the batteries 817 and 853 is larger than a gap between the batteries 812 and 817. The area of the battery 817 is smaller than those of the other batteries. The batteries 817 and 853 are fixed to the display portion 816 with an adhesive or the like and also serve as supports of part of the display portion 816. Since the batteries 812 and 817 are fixed to the display portion 816, an electronic device can be smoothly bent along the bendable portion 816e of the display portion when folded. Since the batteries 853 and 817 are fixed to the display portion 816, the electronic device can be smoothly bent along the bendable portion 816d of the display portion when folded.

This embodiment is different from Embodiment 1 also in the structure of the display portion. In this embodiment, both ends of the display portion do not have side rolled portions constantly bent. When the electronic device is made small by being bent along the bendable portion 816d of the display portion, the periphery of the bendable portion 816d of the display portion becomes a side rolled portion.

To fix the electronic device when it is made small by being bent, magnets are provided at a plurality of portions of a housing.

Figure 25B:
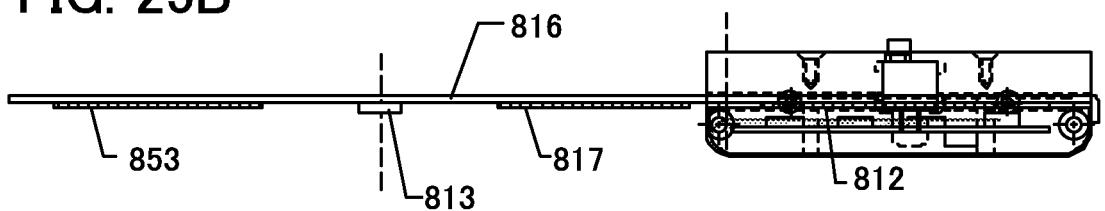

FIG. 25B is a cross-sectional view of FIG. 25A and illustrates the positional relation of components of the electronic device that is unfolded.

This embodiment can be freely combined with any of the other embodiments.

Embodiment 8

In this embodiment, an example of a method for operating a touch panel that can be used for a display panel included in the electronic device of one embodiment of the present invention will be described with reference to drawings.

Example of Sensing Method of Sensor

Figure 26A:
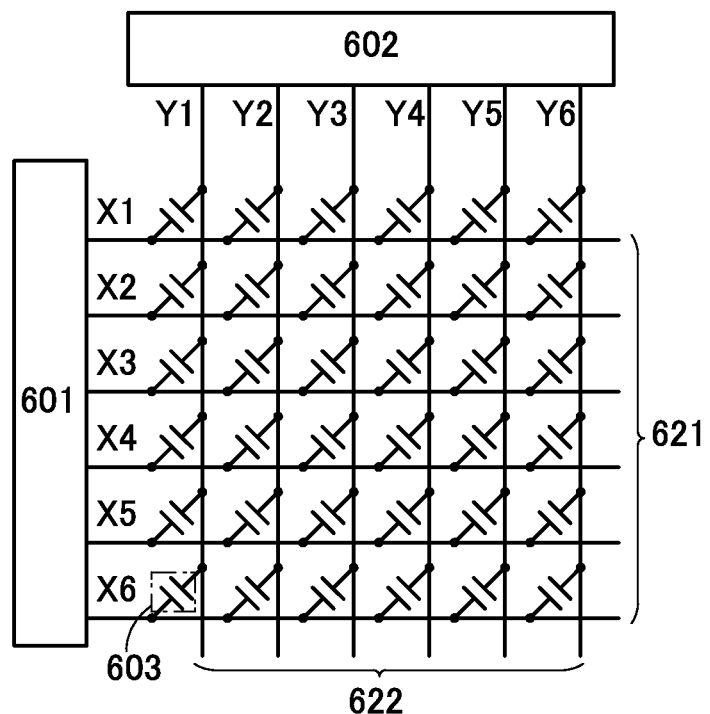
FIGS. 26A and 26B are a block diagram and a timing chart of a touch sensor.

FIG. 26A is a block diagram illustrating the structure of a mutual capacitive touch sensor. FIG. 26A illustrates a pulse voltage output circuit 601 and a current sensing circuit 602. Note that in FIG. 26A, six wirings X1 to X6 represent the electrodes 621 to which a pulse voltage is applied, and six wirings Y1 to Y6 represent the electrodes 622 that detect changes in current. FIG. 26A also illustrates a capacitor 603 that is formed where the electrodes 621 and 622 overlap with each other. Note that functional replacement between the electrodes 621 and 622 is possible.

The pulse voltage output circuit 601 is a circuit for sequentially applying a pulse voltage to the wirings X1 to X6. By application of a pulse voltage to the wirings X1 to X6, an electric field is generated between the electrodes 621 and 622 of the capacitor 603. When the electric field between the electrodes is shielded, for example, a change occurs in the capacitor 603 (mutual capacitance). The approach or contact of a sensing target can be sensed by utilizing this change.

The current sensing circuit 602 is a circuit for detecting changes in current flowing through the wirings Y1 to Y6 that are caused by the change in mutual capacitance in the capacitor 603. No change in current value is detected in the wirings Y1 to Y6 when there is no approach or contact of a sensing target, whereas a decrease in current value is detected when mutual capacitance is decreased owing to the approach or contact of a sensing target. Note that an integrator circuit or the like is used for sensing of current values.

Figure 26B:
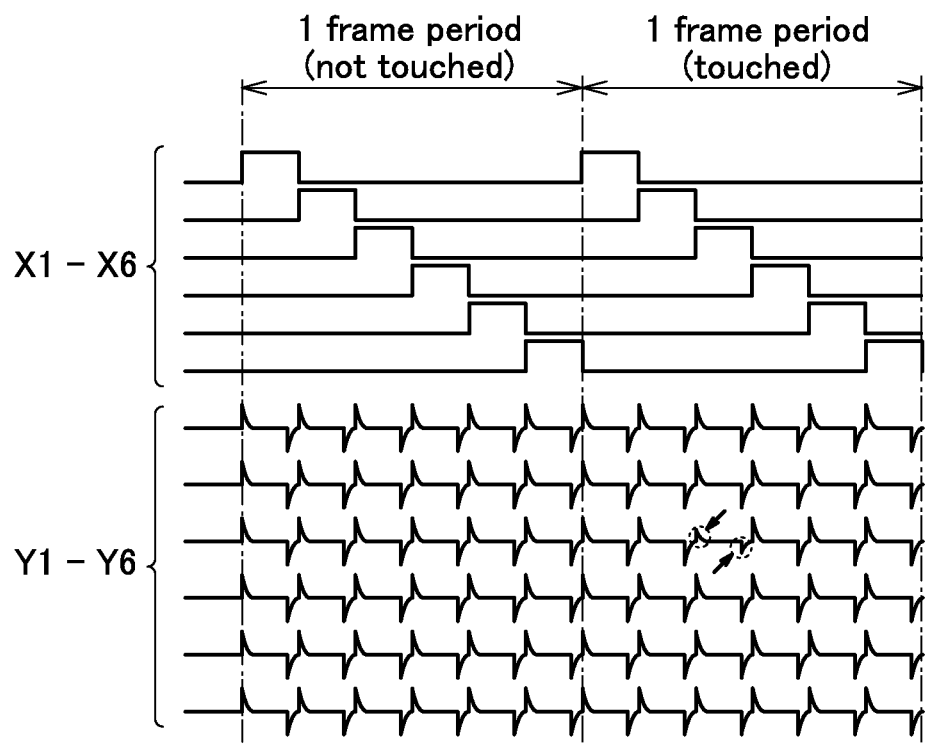

FIG. 26B is a timing chart showing input and output waveforms in the mutual capacitive touch sensor illustrated in FIG. 26A. In FIG. 26B, sensing of a sensing target is performed in all the rows and columns in one frame period. FIG. 26B shows a period when a sensing target is not sensed (not touched) and a period when a sensing target is sensed (touched). Sensed current values of the wirings Y1 to Y6 are shown as the waveforms of voltage values.

A pulse voltage is sequentially applied to the wirings X1 to X6, and the waveforms of the wirings Y1 to Y6 change in accordance with the pulse voltage. When there is no approach or contact of a sensing target, the waveforms of the wirings Y1 to Y6 change in accordance with changes in the voltages of the wirings X1 to X6. The current value is decreased at the point of approach or contact of a sensing target and accordingly the waveform of the voltage value changes (portions indicated by arrows in FIG. 26B).

By detecting a change in mutual capacitance in this manner, the approach or contact of a sensing target can be sensed.

Figure 27:
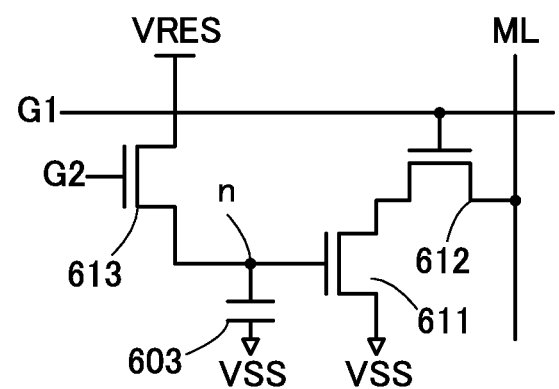
FIG. 27 is a circuit diagram of a touch sensor.

Although FIG. 26A is a passive touch sensor in which only the capacitor 603 is provided at the intersection of wirings as a touch sensor, an active touch sensor including a transistor and a capacitor may be used. FIG. 27 is a sensor circuit included in an active touch sensor.

The sensor circuit includes the capacitor 603 and transistors 611, 612, and 613. A signal G2 is input to a gate of the transistor 613. A voltage VRES is applied to one of a source and a drain of the transistor 613, and one electrode of the capacitor 603 and a gate of the transistor 611 are electrically connected to the other of the source and the drain of the transistor 613. One of a source and a drain of the transistor 611 is electrically connected to one of a source and a drain of the transistor 612, and a voltage VSS is applied to the other of the source and the drain of the transistor 611. A signal G2 is input to a gate of the transistor 612, and a wiring ML is electrically connected to the other of the source and the drain of the transistor 612. The voltage VSS is applied to the other electrode of the capacitor 603.

Next, the operation of the sensor circuit will be described. First, a potential for turning on the transistor 613 is supplied as the signal G2, and a potential with respect to the voltage VRES is thus applied to the node n connected to the gate of the transistor 611. Then, a potential for turning off the transistor 613 is applied as the signal G2, whereby the potential of the node n is maintained.

Then, mutual capacitance of the capacitor 603 changes owing to the approach or contact of a sensing target such as a finger, and accordingly the potential of the node n is changed from VRES.

In reading operation, a potential for turning on the transistor 612 is supplied as the signal G1. A current flowing through the transistor 611, that is, a current flowing through the wiring ML is changed in accordance with the potential of the node n. By sensing this current, the approach or contact of a sensing target can be sensed.

It is preferred that the transistors 611, 612, and 613 each include an oxide semiconductor in a semiconductor layer where a channel is formed. In particular, by using an oxide semiconductor in a semiconductor layer where a channel of the transistor 613 is formed, the potential of the node n can be held for a long time and the frequency of operation (refresh operation) of resupplying VRES to the node n can be reduced.

Example of Driving Method for Display Device

Figure 28A:
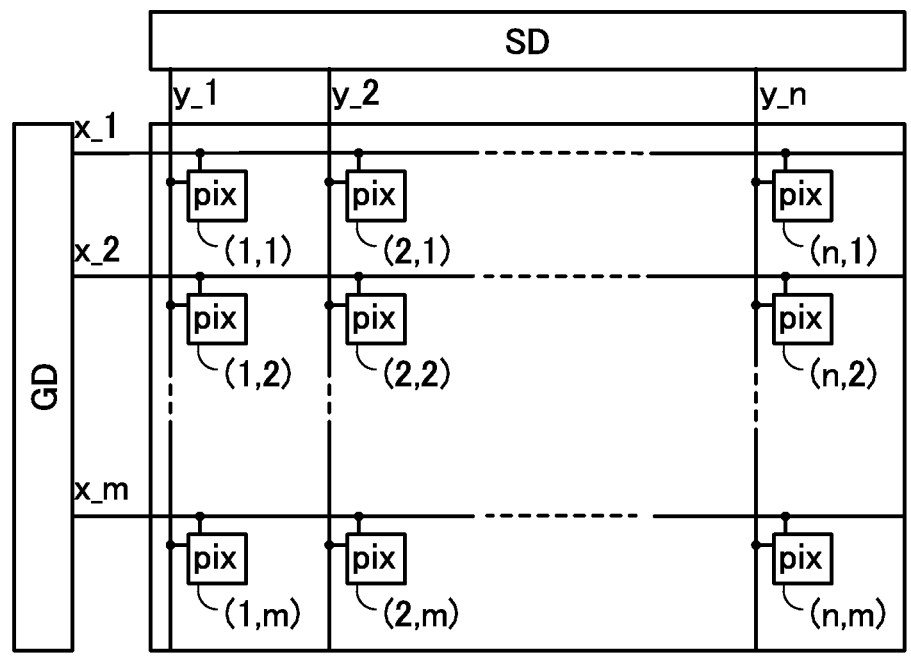
FIGS. 28A and 28B are a block diagram and a timing chart of a display device.

FIG. 28A is a block diagram illustrating an example of the structure of a display device. FIG. 28A illustrates a gate driver circuit GD, a source driver circuit SD, and a pixel pix. In FIG. 28A, gate lines x_1 to x_m (m is a natural number) electrically connected to the gate driver circuit GD and source lines y_1 to y_n (n is a natural number) electrically connected to the source driver circuit SD are illustrated. Corresponding to these lines, the pixels pix are denoted by (1, 1) to (n, m).

Figure 28B:
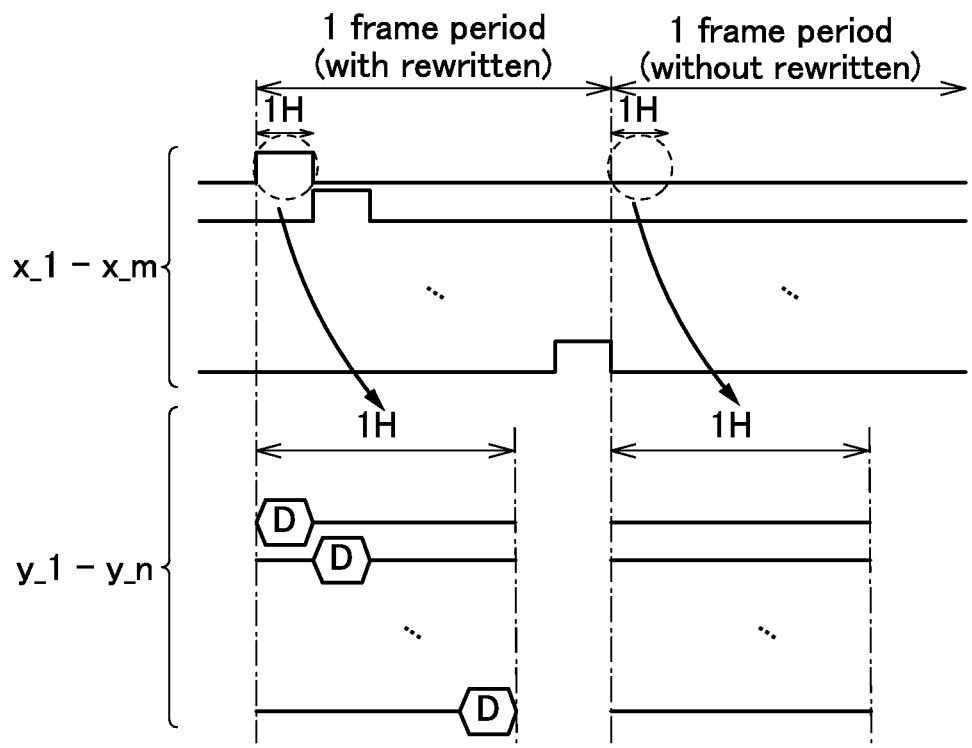

FIG. 28B is a timing chart of signals supplied to the gate lines and the source lines in the display device illustrated in FIG. 28A. The periods in FIG. 28B show the case where data signals are rewritten every frame period and the case where data signals are not rewritten. Note that periods such as a retrace period are not taken into consideration in FIG. 28B.

In the case where data signals are rewritten every frame period, scan signals are sequentially input to the gate lines x_1 to x_m. In a horizontal scanning period 1H, during which the scan signal is at H level, data signals D are input to the source lines y_1 to y_n in the columns.

In the case where data signals are not rewritten every frame period, the supply of scan signals to the gate lines x_1 to x_m is stopped. In the horizontal scanning period 1H, the supply of data signals to the source lines y_1 to y_n in the columns is stopped.

A driving method in which data signals are not rewritten every frame period is effective particularly when an oxide semiconductor is used for a semiconductor layer where a channel of a transistor included in a pixel is formed. A transistor including an oxide semiconductor can have much lower off-state current than a transistor including a semiconductor such as silicon. Thus, a data signal written in the previous period can be held without rewriting data signals every frame period, and the gray levels of pixels can be held for 1 second or longer, preferably 5 seconds or longer, for example.

Examples of Driving Methods for Display Device and Touch Sensor

Figure 29A:
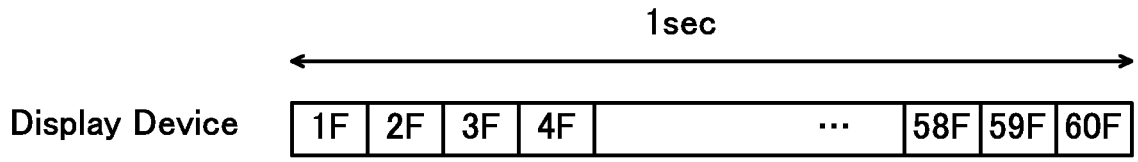
FIGS. 29A to 29D illustrate the operations of a display device and a touch sensor.

FIGS. 29A to 29D show examples of the operations in successive frame periods of the touch sensor described using FIGS. 26A and 26B and the display device described using FIGS. 28A and 28B that are driven for 1 sec (one second). In FIG. 29A, one frame period for the display device is 16.7 ms (frame frequency: 60 Hz), and one frame period for the touch sensor is 16.7 ms (frame frequency: 60 Hz).

Figure 29B:
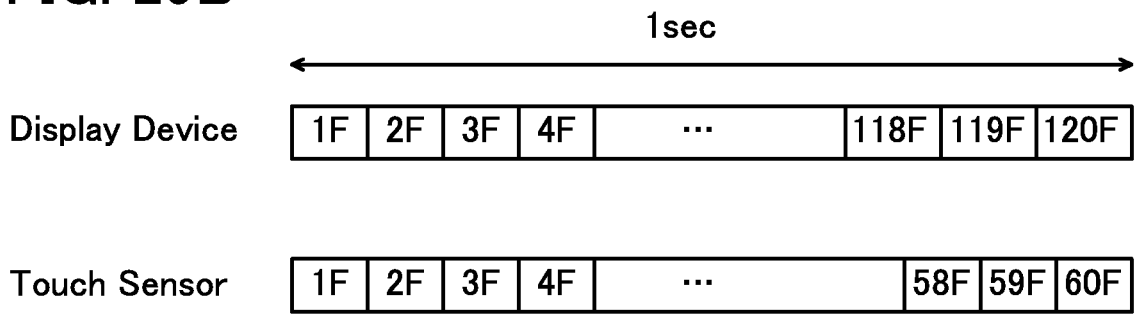

In the touch panel of this embodiment, the display device and the touch sensor operate independently of each other, and the touch sensor can have a touch sensing period concurrent with a display period. That is why one frame period for the display device and one frame period for the touch sensor can both be 16.7 ms (frame frequency: 60 Hz) as shown in FIG. 29A. The frame period for the touch sensor may differ from that of the display device. For example, as shown in FIG. 29B, one frame period for the display device may be 8.3 ms (frame frequency: 120 Hz) and one frame period for the touch sensor may be 16.7 ms (frame frequency: 60 Hz). The frame frequency for the display device may be 33.3 ms (frame frequency: 30 Hz) (not shown).

The frame frequency for the display device may be changeable, i.e., the frame frequency in displaying moving images may be increased (e.g., 60 Hz or more, or 120 Hz or more), whereas the frame frequency in displaying still images may be decreased (e.g., 60 Hz or less, 30 Hz or less, or 1 Hz or less). With this structure, power consumption of the display device can be reduced. The frame frequency for the touch sensor may be changeable so that the frame frequency in waiting is differ from the frame frequency in sensing a touch.

The touch panel of this embodiment holds data signals rewritten in the previous period without rewriting data signals in the display device, and one frame period for the display device can thus be longer than 16.7 ms. Thus, as shown in FIG. 29C, the operation can be switched so that one frame period for the display device is 1 sec (frame frequency: 1 Hz) and one frame period for the touch sensor is 16.7 ms (frame frequency: 60 Hz).

Figure 29C:
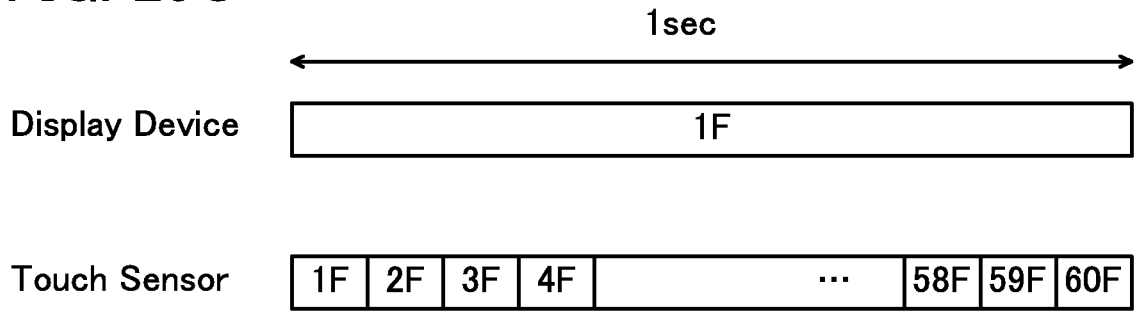
Figure 29D:
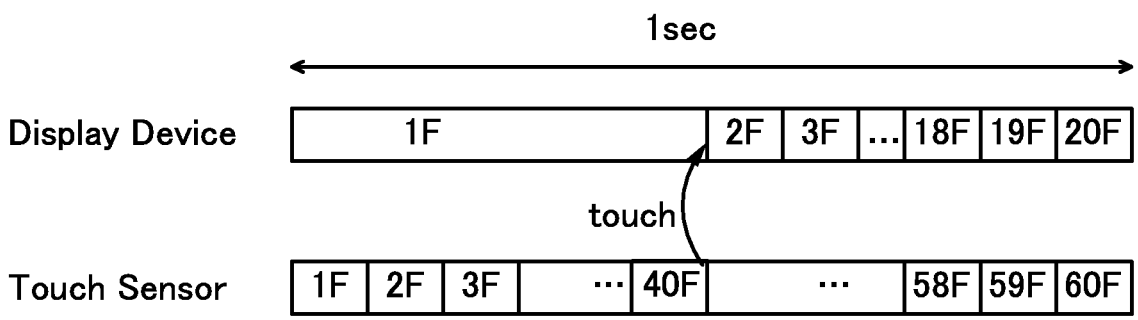

Furthermore, the touch panel of this embodiment can continue to operate the touch sensor in the driving shown in FIG. 29C. Thus, data signals in the display device can be rewritten at the timing at which the approach or contact of a sensing target is sensed by the touch sensor, as shown in FIG. 29D.

If rewriting of data signals in a display device is performed during a sensing period of a touch sensor, noise caused by operating the display device travels through the touch sensor and the sensitivity of the touch sensor might decrease. For this reason, rewriting of data signals in a display device and sensing in a touch sensor are preferably performed in different periods.

Figure 30A:
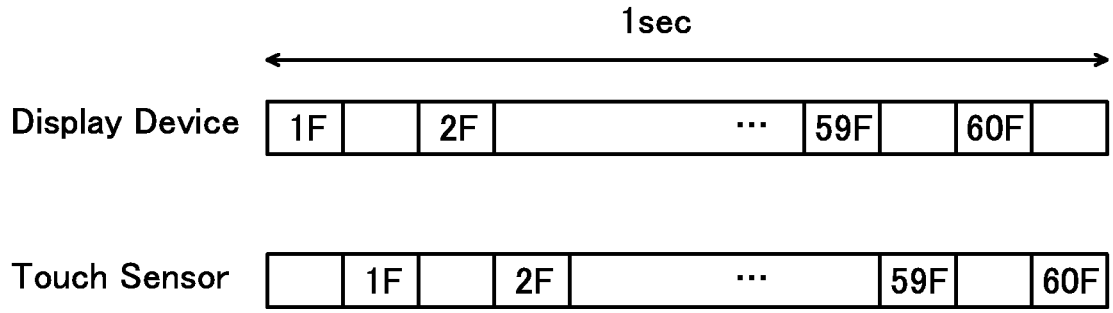
FIGS. 30A to 30D illustrate the operations of a display device and a touch sensor.
Figure 30B:
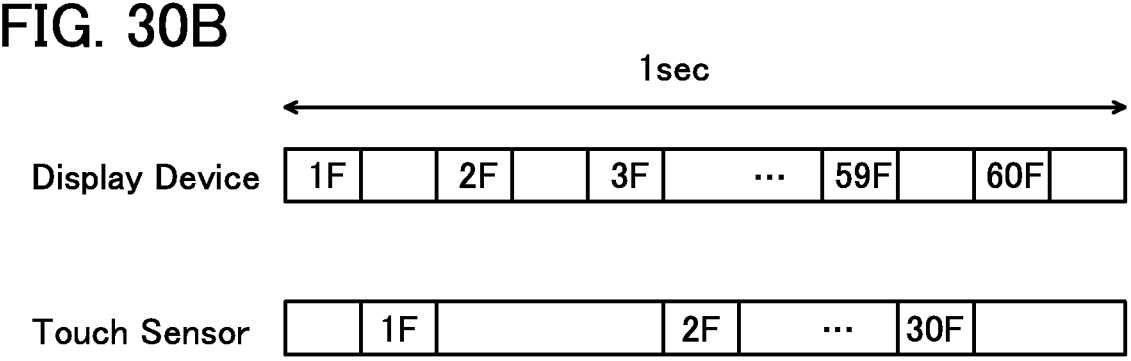

FIG. 30A shows an example in which rewriting of data signals in a display device and sensing in a touch sensor are performed alternately. FIG. 30B shows an example in which sensing in a touch sensor is performed one time every two rewritings of data signals in a display device. Note that sensing in a touch sensor may be performed once every three or more rewritings.

With the use of an oxide semiconductor for a semiconductor layer where a channel of a transistor used in a pixel of a display device is formed, an off-state current can be significantly reduced and the frequency of rewriting data signals can be sufficiently reduced. Specifically, a sufficiently long break period can be set between rewritings of data signals. The break period is 0.5 seconds or longer, 1 seconds or longer, or 5 seconds or longer, for example. The upper limit of the break period depends on the leakage current of a capacitor or a display element connected to a transistor; for example, 1 minutes or shorter, 10 minutes or shorter, 1 hour or shorter, or 1 day or shorter.

Figure 30C:
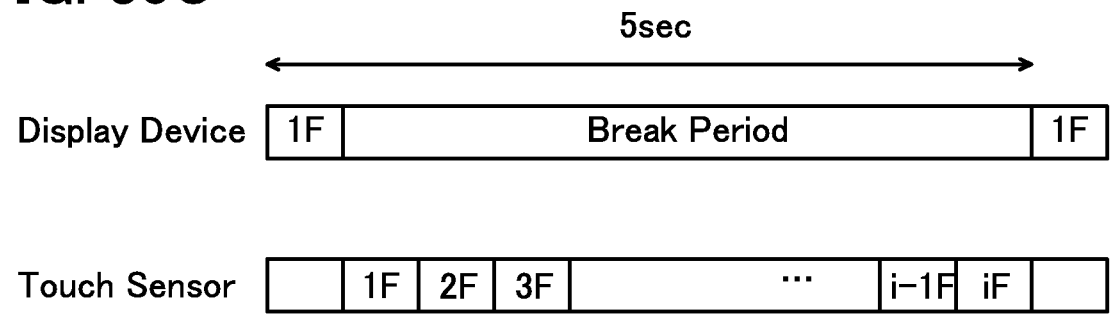
Figure 30D:
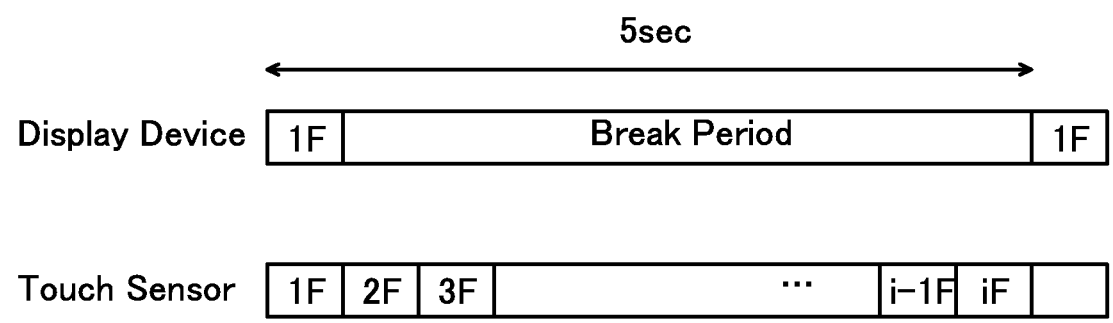

FIG. 30C shows an example in which rewriting of data signals in a display device is performed once every 5 seconds. A break period for stopping the operation of a display device is set in FIG. 30C between rewriting of data signals and next rewriting. In the break period, a touch sensor can be operated at a frame frequency of i Hz (i is more than or equal to the frame frequency of a display device; here, 0.2 Hz or more). It is preferred that sensing in a touch sensor be performed in a break period and not be performed in a rewriting period of data signals in a display device as shown in FIG. 30C, in which case the sensitivity of a touch sensor can be increased. When rewriting of data signals and sensing are performed at the same time as shown in FIG. 30D, operation signals can be simplified.

In a break period during which rewriting of data signals in a display device is not performed, only the supply of signals to a driver circuit may be stopped, and in addition, the supply of a power supply potential may be stopped for further reducing power consumption.

The touch panel described in this embodiment includes a display device and a touch sensor between two flexible substrates. With this structure, the distance between the display device and the touch sensor can be reduced. A decrease in the sensitivity of the touch sensor caused by noise generated by driving the display device can be suppressed by employing the driving method in this embodiment, and both a reduction in thickness and high sensitivity of a touch panel are achieved.

Embodiment 9

In this embodiment, a structural example of a touch panel that can be used for a display panel included in the electronic device of one embodiment of the present invention and an example of a method for driving the touch panel will be described with reference to drawings.

Configuration of Touch Panel

Figure 31:
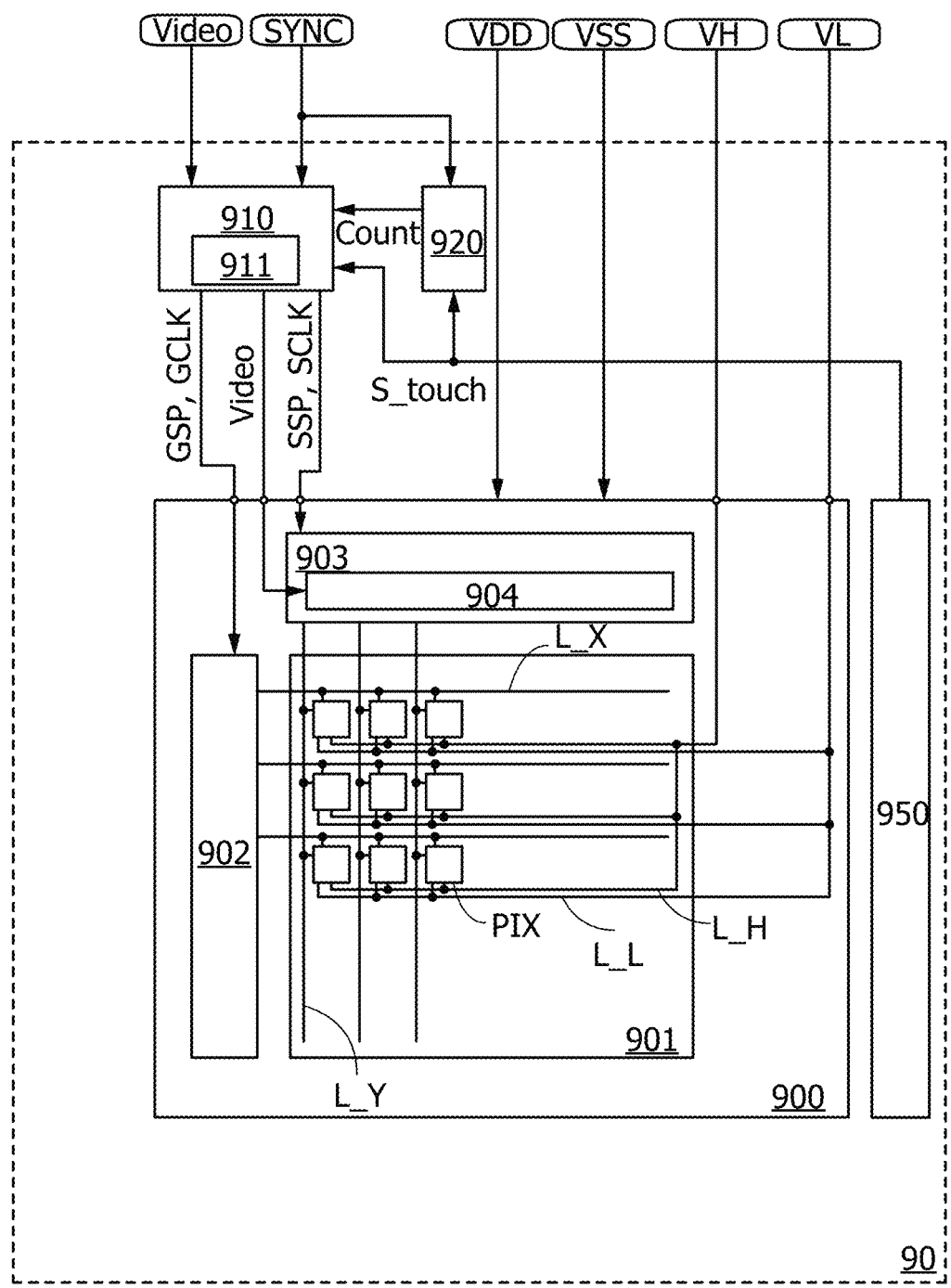
FIG. 31 is a block diagram of a touch panel.

FIG. 31 is a block diagram illustrating a configuration example of a touch panel that will be described below. As illustrated in FIG. 31, a touch panel 90 includes a display device 900, a control circuit 910, a counter circuit 920, and a touch sensor 950.

An image signal (Video), which is digital data, and a synchronization signal (SYNC) for controlling rewriting of a screen of the display device 900 are input to the touch panel 90. Examples of synchronization signals include a horizontal synchronization signal (Hsync), a vertical synchronization signal (Vsync), and a reference clock signal (CLK).

The display device 900 includes a display portion 901, a gate driver 902, and a source driver 903. The display portion 901 includes a plurality of pixels PIX. The pixels PIX in the same row are connected to the gate driver 902 through a common gate line L_X, and the pixels PIX in the same column are connected to the source driver 903 through a common source line L_Y.

A high-level voltage (VH), a low-level voltage (VL), and a high power supply voltage (VDD) and a low power supply voltage (VSS) which serve as power supply voltages are applied to the display device 900. The high-level voltage (hereinafter referred to as VH) is applied to each pixel PIX in the display portion 901 through a common wiring L_H. The low-level voltage (hereinafter referred to as VL) is applied to each pixel PIX in the display portion 901 through a wiring L_L.

The source driver 903 processes an input image signal to generate a data signal, and outputs the data signal to the source line L_Y. The gate driver 902 outputs, to the gate line L_X, a scan signal for selecting the pixel PIX into which a data signal is to be written.

The pixel PIX includes a switching element whose electrical connection to the source line L_Y is controlled by a scan signal. When the switching element is turned on, a data signal is written into the pixel PIX through the source line L_Y.

The control circuit 910 controls the whole touch panel 90 and includes a circuit that generates control signals for circuits included in the touch panel 90.

The control circuit 910 includes a control signal generation circuit that generates control signals for the gate driver 902 and the source driver 903 on the basis of the synchronization signal (SYNC). Examples of control signals for the gate driver 902 include a start pulse (GSP) and a clock signal (GCLK). Examples of control signals for the source driver 903 include a start pulse (SSP) and a clock signal (SCLK). For example, the control circuit 910 generates a plurality of clock signals with the same cycle and shifted phases as the clock signals (GCLK and SCLK).

The control circuit 910 controls the output of an image signal (Video), which is input from the outside of the touch panel 90 to the source driver 903.

In addition, a sensor signal (S_touch) is input to the control circuit 910 from the touch sensor portion 950, and the control circuit 910 corrects an image signal in accordance with the sensor signal. The correction of the image signal depends on the sensor signal; image processing corresponding to touch operation is performed.

The source driver 903 includes a digital/analog conversion circuit 904 (hereinafter referred to as a D-A conversion circuit 904). The D-A conversion circuit converts an image signal into an analog signal, thereby generating a data signal.

Note that in the case where an image signal input to the touch panel 90 is an analog signal, the image signal is converted into a digital signal in the control circuit 910 and output to the display device 900.

An image signal is image data for each frame. The control circuit 910 has a function of performing image processing on the image data and controlling output of the image signal to the source driver 903 on the basis of data obtained by the processing. For that function, the control circuit 910 includes a motion sensing portion 911 that performs image processing on the image data to sense motion in the image data for each frame. In the case where a sensor signal is input, the image signal based on the image data is corrected in response to the sensor signal.

When the motion sensing portion 911 determines that there is motion, the control circuit 910 continues to output image signals to the source driver 903. The control circuit 910 stops the output of image signals to the source driver 903 when the motion sensing portion 911 determines that there is no motion, and restarts the output of image signals when the motion sensing portion 911 determines that there is motion.

The control circuit 910 can control display in the display portion 901 by switching between a first mode for displaying images with motion (moving image display) and a second mode for displaying images without motion (still image display) based on determination by the motion sensing portion 911. In the first mode, when the frequency of the vertical synchronization signal (Vsync) is 60 Hz, for example, the frame frequency is set to 60 Hz or higher. In the second mode, when the frequency of the vertical synchronization signal (Vsync) is 60 Hz, for example, the frame frequency is set to lower than 60 Hz.

The frame frequency in the second mode is preferably set in advance in accordance with a voltage holding property of a pixel. For example, when the motion sensing portion 911 determines that there is no motion for a certain period of time and the control circuit 910 stops the output of image signals to the source driver 903, a voltage corresponding to the gray level of an image signal that is written in the pixel PIX is lowered. Therefore, it is preferable to write in a voltage corresponding to the gray level of an image signal for the same image in accordance with the frame frequency (such operation is also called refresh operation). The timing of the refresh operation (also referred to as a refresh rate) is set such that the refresh operation is performed every certain period of time. The timing is based on, for example, a signal obtained by counting the H level of the vertical synchronization signal (Vsync) in the counter circuit 920.

In the case where the refresh rate is set to once every second, when the frequency of the vertical synchronization signal (Vsync) is 60 Hz, for example, refresh operation is performed in response to a count signal (Count) that is output after the counter circuit 920 counts the H level of the vertical synchronization signal (Vsync) up to 60. In the case where the refresh rate is set to once every five seconds, when the frequency of the vertical synchronization signal (Vsync) is 60 Hz, for example, refresh operation is performed in response to a count signal (Count) that is output after the counter circuit 920 counts the H level of the vertical synchronization signal (Vsync) up to 300. Furthermore, the following operation is possible: when a sensor signal is input from the touch sensor portion 950, the counter circuit 920 forcibly switches the control circuit 910 from the second mode to the first mode in response to the sensor signal.

Note that there is no particular limitation on the image processing for sensing motion that is performed in the motion sensing portion 911. An example of a method for sensing motion is to obtain difference data from image data for two consecutive frames. It can be determined whether there is motion or not from the obtained difference data. Another example of the method is to sense a motion vector.

The operation and structure described in the above embodiment can be used for the touch sensor 950.

The display device and the touch sensor 950 of this embodiment operate independently of each other; thus, the touch sensor portion 950 can have a touch sensing period concurrent with a display period. Even in the structure in which the control circuit 910 switches between the first mode and the second mode, the operation of the touch sensor can thus be controlled independently of those modes. By synchronizing the operation of the display device 900 with the operation of the touch sensor 950 and performing rewriting of data signal in the display device 900 and sensing in the touch sensor 950 in different periods, the sensitivity of sensing can be increased.

Configuration Example of Pixel

Figure 32A:
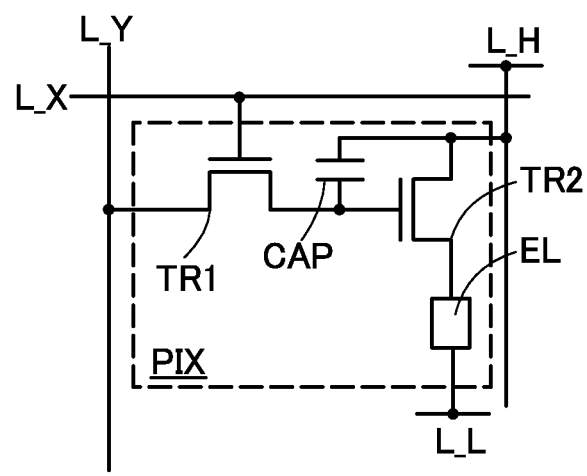
FIGS. 32A and 32B are pixel circuit diagrams.

FIG. 32A is a circuit diagram illustrating a configuration example of the pixel PIX. The pixel PIX includes a transistor TR1, a transistor TR2, a light-emitting element EL, and a capacitor Cap.

The transistor TR1 is a switching element that controls electrical connection between the source line L_Y and a gate of the transistor TR2. The transistor TR1 is turned on or off by a scan signal input to its gate. The transistor TR2 is a switching element that controls a current supplied to the light-emitting element EL.

Note that an oxide semiconductor is preferably used for a semiconductor layer where a channel is formed in the transistors TR1 and TR2.

The light-emitting element EL includes an EL layer containing a light-emitting organic compound between two electrodes. The emission luminance of the light-emitting element depends on a current flowing through the electrodes. A low-level voltage is applied from the wiring L_L to one electrode of the light-emitting element, and a high-level voltage is applied from the wiring L_H to the other electrode via the transistor TR2.

The capacitor Cap retains the potential of the gate of the transistor TR2.

Figure 32B:
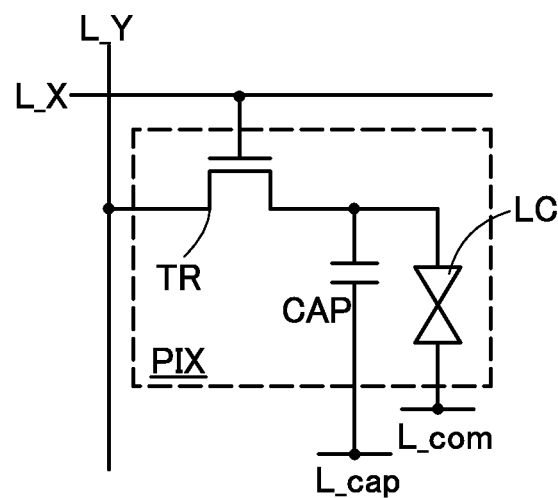

FIG. 32B is an example of the pixel PIX including a liquid crystal element. The pixel PIX includes a transistor TR, a liquid crystal element LC, and a capacitor Cap.

The transistor TR is a switching element that controls electrical connection between the liquid crystal element LC and the source line L_Y. The transistor TR is turned on or off by a scan signal input to its gate.

Note that an oxide semiconductor is preferably used for a semiconductor layer where a channel is formed in the transistor TR.

The liquid crystal element LC includes two electrodes and a liquid crystal. The alignment of the liquid crystal is changed by the action of an electric field between the two electrodes. One of the two electrodes of the liquid crystal element LC, which is connected to the source line L_Y through the transistor TR, is a pixel electrode, and the other, to which Vcom is applied, is connected to a common line L_com.

The capacitor Cap is connected in parallel with the liquid crystal element LC. Here, one electrode of the capacitor is an electrode connected to a source or a drain of the transistor TR, and the other electrode of the capacitor is connected to the capacitor line L_cap to which a capacitor line voltage is applied.

Note that although the light-emitting element LC or the light-emitting element EL is used as a display element here, one embodiment of the present invention is not limited thereto.

For example, in this specification and the like, a display element, a display device, which is a device including a display element, a light-emitting element, and a light-emitting device, which is a device including a light-emitting element, can employ a variety of modes or can include a variety of elements. Examples of a display element, a display device, a light-emitting element, or a light-emitting device include at least one of an electroluminescence (EL)

element (e.g., an EL element including organic and inorganic materials, an organic EL element, and an inorganic EL element), an LED (e.g., a white LED, a red LED, a green LED, and a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), MIRASOL (registered trademark), an interferometric modulation (IMOD) element, a MEMS shutter display element, an optical-interference-type MEMS display element, an electrowetting element, a piezoelectric ceramic display, and a display element using a carbon nanotube. Other than the above, a display medium whose contrast, luminance, reflectance, transmittance, or the like is changed by electrical or magnetic action may be included. Note that examples of display devices using EL elements include an EL display. Examples of display devices including electron emitters include a field emission display (FED) and an SED-type flat panel display (SED: surface-conduction electron-emitter display). Examples of display devices using liquid crystal elements include a liquid crystal display (e.g., a transmissive liquid crystal display, a transflective liquid crystal display, a reflective liquid crystal display, a direct-view liquid crystal display, and a projection liquid crystal display). An example of a display device including electronic ink or electrophoretic elements is electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a storage circuit such as an SRAM can be provided under the reflective electrodes, leading to lower power consumption.

For example, in this specification and the like, an active matrix method in which an active element is included in a pixel or a passive matrix method in which an active element is not included in a pixel can be used.

In an active matrix method, as an active element (a non-linear element), not only a transistor but also various active elements (non-linear elements) such as a MIM (metal insulator metal), and a TFD (thin film diode) can be used. Since such an element has few numbers of manufacturing steps, the manufacturing cost can be reduced or the yield can be improved. Alternatively, since the size of the element is small, the aperture ratio can be improved, so that power consumption can be reduced or higher luminance can be achieved.

Note that as a method other than an active matrix method, a passive matrix method in which an active element (a non-linear element) is not used can also be used. Since an active element (a non-linear element) is not used, the number of manufacturing steps is small, so that the manufacturing cost can be reduced or the yield can be improved. Alternatively, since an active element (a non-linear element) is not used, the aperture ratio can be improved, so that power consumption can be reduced or higher luminance can be achieved, for example.

Example of Driving Method for Touch Panel

Figure 33:
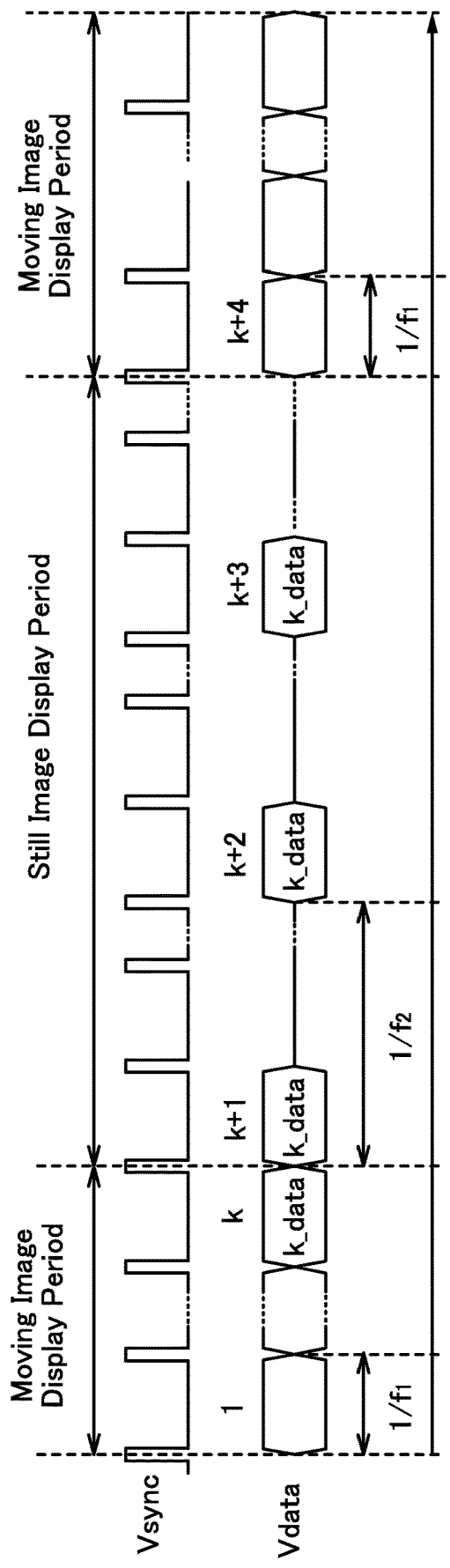
FIG. 33 is a timing chart showing the operation of a display device.

The operation of the touch panel 90, which performs display in the first mode for moving image display and in the second mode for still image display, will be described below with reference to a timing chart in FIG. 33. FIG. 33 shows the signal waveforms of the vertical synchronization signal (Vsync) and a data signal (Vdata) that is output to the source line L_Y from the source driver 903.

FIG. 33 is a timing chart of the touch panel 90. In FIG. 33, for example, moving image display, still image display, and moving image display are performed in that order. Here, there is motion in image data for the first to k-th frames. There is no motion in image data for the (k+1)-th to (k+3)-th frames. There is motion in image data for the (k+4)-th frame and frames after the (k+4)-th frame. Note that k is an integer of 2 or more.

In the first moving image display period, the motion sensing portion 911 determines that there is motion in image data for each frame, and the touch panel 90 operates in the first mode. The control circuit 910 outputs image signals (Video) to the source driver 903 at a frame frequency $f_1$ that is higher than or equal to the frequency of the vertical synchronization signal. The source driver 903 continuously outputs data signals (Vdata) to the source line L_Y. Note that the length of one frame period in the moving image display period is represented by $1/f_1$ (seconds).

Next, in the still image display period, the motion sensing portion 911 performs image processing for sensing motion and determines that there is no motion in image data for the (k+1)-th frame, and the touch panel 90 operates in the second mode. The control circuit 910 outputs image signals (Video) to the source driver 903 at a frame frequency $f_2$ that is lower than the frequency of the vertical synchronization signal. The source driver 903 intermittently outputs data signals (Vdata) to the source line L_Y. Note that the length of one frame period in the still image display period is represented by $1/f_2$ (seconds).

Since the source driver 903 intermittently outputs data signals (Vdata), the supply of control signals (e.g., a start pulse signal and a clock signal) to the gate driver 902 and the source driver 903 can also be performed intermittently; thus, the operations of the gate driver 902 and the source driver 903 can be stopped at regular intervals.

The intermittent output of data signals (Vdata) to the source line L_Y in the second mode will be specifically described. For example, as shown in FIG. 33, in the (k+1)-th frame, the control circuit 910 outputs control signals to the gate driver 902 and the source driver 903 and outputs image signals (Video) to the source driver 903 at the frame frequency $f_2$. The source driver 903 outputs the data signal (Vdata) written in the previous period, that is, the data signal (Vdata) output to the source line L_Y in the k-th frame, to the source line L_Y. In this manner, in the still image display period, the data signal (Vdata) written in the previous period is repeatedly written to the source line L_Y every $1/f_2$ seconds. Thus, a voltage corresponding to the gray level of an image signal for the same image can be written (i.e., refresh operation can be performed). Refresh operations performed at regular intervals can reduce flickers due to the shift of gray levels caused by a voltage drop and can improve the display quality of the touch panel.

The control circuit 910 operates in the second mode until the motion sensing portion 911 determines that there is motion in image data or until a sensor signal is input.

Then, when the motion sensing portion 911 determines that there is motion in image data for the (k+4)-th frame and frames after the (k+4)-th frame, the touch panel 90 operates in the first mode again. The control circuit 910 outputs image signals (Video) to the source driver 903 at the frame frequency $f_1$ that is higher than or equal to the frequency of the vertical synchronization signal. The source driver 903 continuously outputs data signals (Vdata) to the source line L_Y.

The touch panel described in this embodiment includes a display device and a touch sensor between two flexible substrates, for example. With this structure, the display device and the touch sensor can be extremely close to each other. A decrease in sensitivity of the touch sensor caused by noise generated by driving the display device can be suppressed by employing the driving method in this embodiment, and both reduction in thickness and high sensitivity of a touch panel are achieved.

Note that what is described (or part thereof) in one embodiment can be applied to, combined with, or replaced with different contents in the embodiment and/or what is described (or part thereof) in another embodiment or other embodiments.

Note that in each embodiment, what is described in the embodiment is contents described with reference to a variety of diagrams or contents described with text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in another embodiment or other embodiments, much more diagrams can be formed.

Note that contents that are not specified in any drawing or text in the specification can be excluded from one embodiment of the invention. Alternatively, when the range of a value that is defined by the maximum and minimum values is described, part of the range is appropriately narrowed or part of the range is removed, whereby one embodiment of the invention excluding part of the range can be constituted. In this manner, it is possible to specify the technical scope of one embodiment of the present invention so that a conventional technology is excluded, for example.

As a specific example, a diagram of a circuit including first to fifth transistors is illustrated. In that case, it can be specified that the circuit does not include a sixth transistor in the invention. It can be specified that the circuit does not include a capacitor in the invention. It can be specified that the circuit does not include a sixth transistor with a particular connection structure in the invention. It can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, the description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description. In other words, a description of a value that includes a term "preferable", "preferably", or the like does not necessarily limit the value.

As another specific example, the description "a voltage is preferred to be 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention.

As another specific example, the description "a film is an insulating film" is given to describe a property of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the insulating film is a conductive film is excluded from one embodiment of the invention. For example, it can be specified that the case where the insulating film is a semiconductor film is excluded from one embodiment of the invention.

As another specific example, the description of a stacked structure, "a film is provided between an A film and a B film" is given. In that case, for example, it can be specified that the case where the film is a layered film of four or more layers is excluded from the invention. For example, it can be specified that the case where a conductive film is provided between the A film and the film is excluded from the invention.

Note that various people can implement one embodiment of the invention described in this specification and the like. However, different people may be involved in the implementation of the embodiment of the invention. For example, in the case of a transmission/reception system, the following case is possible: Company A manufactures and sells transmitting devices, and Company B manufactures and sells receiving devices. As another example, in the case of a light-emitting device including a transistor and a light-emitting element, the following case is possible: Company A manufactures and sells semiconductor devices including transistors, and Company B purchases the semiconductor devices, provides light-emitting elements for the semiconductor devices, and completes light-emitting devices.

In such a case, one embodiment of the invention can be constituted so that a patent infringement can be claimed against each of Company A and Company B. In other words, one embodiment of the invention can be constituted so that only Company A implements the embodiment, and another embodiment of the invention can be constituted so that only Company B implements the embodiment. One embodiment of the invention with which a patent infringement suit can be filed against Company A or Company B is clear and can be regarded as being disclosed in this specification or the like. For example, in the case of a transmission/reception system, even when this specification or the like does not include a description of the case where a transmitting device is used alone or the case where a receiving device is used alone, one embodiment of the invention can be constituted by only the transmitting device and another embodiment of the invention can be constituted by only the receiving device. Those embodiments of the invention are clear and can be regarded as being disclosed in this specification or the like. Another example is as follows: in the case of a light-emitting device including a transistor and a light-emitting element, even when this specification or the like does not include a description of the case where a semiconductor device including the transistor is used alone or the case where a light-emitting device including the light-emitting element is used alone, one embodiment of the invention can be constituted by only the semiconductor device including the transistor and another embodiment of the invention can be constituted by only the light-emitting device including the light-emitting element. Those embodiments of the invention are clear and can be regarded as being disclosed in this specification or the like.

Note that in this specification and the like, it may be possible for those skilled in the art to constitute one embodiment of the invention even when portions to which all the terminals of an active element (e.g., a transistor or a diode), a passive element (e.g., a capacitor or a resistor), and the like are connected are not specified. In other words, one embodiment of the invention is clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function of a circuit is specified, one embodiment of the present invention is clear. Moreover, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, part of a diagram or text described in one embodiment can be taken out to constitute one embodiment of the invention. Thus, in the case where a diagram or text related to a certain portion is described, the contents taken out from part of the diagram or the text are also disclosed as one embodiment of the invention, and one embodiment of the invention can be constituted. The embodiment of the present invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to take out M circuit elements (e.g., transistors or capacitors; M is an integer, where M<N) and constitute one embodiment of the invention. For another example, it is possible to take out M layers (M is an integer, where M<N) from a cross-sectional view in which N layers (N is an integer) are provided and constitute one embodiment of the invention. For another example, it is possible to take out M elements (M is an integer, where M<N) from a flow chart in which N elements (N is an integer) are provided and constitute one embodiment of the invention. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

EXPLANATION OF REFERENCE

1: FPC, 2: FPC, 4: FPC, 5: FPC, 10: housing, 11: housing, 12: housing, 13: hinge, 14: window portion, 16: base, 16a: barrier film, 16b: base, 16c: resin layer, 17: protective base, 17p: protective layer, 19: sensing circuit, 20: sensor, 20U: sensing unit, 21: electrode, 22: electrode, 23: insulating layer, 31: film, 32: positive electrode current collector, 33: separator, 34: negative electrode current collector, 35: sealing layer, 36: lead electrode, 37: negative electrode active material layer, 38: positive electrode active material layer, 39: negative electrode active material layer, 40: secondary battery, 41: adhesive layer, 42: electrolytic solution, 90: touch panel, 100: input device, 110: device, 111: CPU, 112: battery, 113: regulator, 114: wireless receiving portion, 115: control module, 116: display portion, 116a: side rolled portion, 116b: side rolled portion, 116c: side rolled portion, 117: battery, 118: regulator, 119: display driver circuit, 120: wireless receiving portion, 121: display module, 125: system portion, 127: power management circuit, 128: wireless transmitting portion, 129: wireless transmitting portion, 140: circuit board, 141: lead electrode, 142: Part of driver circuit, 143: flexible film, 144: flexible film, 150: wireless transmitting portion, 152: touch sensor, 153: battery, 154: regulator, 156: touch input portion, 159: sensor driver circuit, 160: fold position sensor, 201: formation substrate, 203: separation layer, 205: layer to be separated, 207: bonding layer, 211: bonding layer, 221:

formation substrate, 223: separation layer, 225: layer to be separated, 226: insulating layer, 231: substrate, 233: bonding layer, 401: electrode, 402: EL layer, 403: electrode, 404: bonding layer, 404a: bonding layer, 404b: bonding layer, 405: insulating layer, 407: bonding layer, 420: flexible substrate, 422: adhesive layer, 424: insulating layer, 426: adhesive layer, 428: flexible substrate, 431: light-blocking layer, 432: coloring layer, 435: conductive layer, 441: conductive layer, 442: conductive layer, 443: insulating layer, 444: flexible substrate, 445: FPC, 450: organic EL element, 453: overcoat, 454: transistor, 455: transistor, 457: conductive layer, 463: insulating layer, 465: insulating layer, 467: insulating layer, 491: light-emitting portion, 493: driver circuit portion, 495: FPC, 496: spacer, 497: connector, 500: input/output device, 501: display portion, 502: pixel, 502B: sub-pixel, 502G: sub-pixel, 502R: sub-pixel, 502t: transistor, 503c: capacitor, 503g: scan line driver circuit, 503t: transistor, 510: base, 510a: barrier film, 510b: base, 510c: resin layer, 511: wiring, 519: terminal, 521: insulating film, 528: partition wall, 550R: light-emitting element, 560: sealant, 567p: anti-reflective layer, 580R: light-emitting module, 601: pulse voltage output circuit, 602: current sensing circuit, 603: capacitor, 611: transistor, 612: transistor, 613: transistor, 621: electrode, 622: electrode, 717: battery, 718: regulator, 753: battery, 754: regulator, 812: battery, 813: hinge, 816: display portion, 817: battery, 853: battery, 900: display device, 901: display portion, 902: gate driver, 903: source driver, 904: digital/analog conversion circuit, 910: control circuit, 911: motion sensing portion, 920: counter circuit, 950: touch sensor, 1700: curved surface, 1701: plane, 1702: curve, 1703: radius of curvature, 1704: center of curvature, 1800: center of curvature, 1801: film, 1802: radius of curvature, 1803: film, 1804: radius of curvature, and 1805: layer This application is based on Japanese Patent Application serial no. 2014-039913 filed with the Japan Patent Office on Feb. 28, 2014 and Japanese Patent Application serial no. 2014-045237 filed with the Japan Patent Office on Mar. 7, 2014, the entire contents of which are hereby incorporated by reference.

What is claimed is:

1. An electronic device comprising:
a first housing;
a second housing connected to the first housing via a hinge;
a first secondary battery provided in the first housing;
a second secondary battery provided in the second housing;
a display panel overlapping with the first housing and the second housing;
a plurality of magnets;
an antenna; and
a portion configured to wirelessly charge the first secondary battery,
wherein the display panel comprises a first region overlapping with the first housing and the first secondary battery, a second region overlapping with the second housing and the second secondary battery, and a third region between the first region and the second region,
wherein the third region is configured to bend, when the electronic device is folded,
wherein the third region does not overlap with the first secondary battery and the second secondary battery, in a folded state of the electronic device and in an opened state of the electronic device,
wherein, in the folded state of the electronic device, the first secondary battery overlaps with the second secondary battery,
wherein a size of the first secondary battery is different from a size of the second secondary battery,
wherein, in the opened state of the electronic device, the electronic device is configured to display an image in the first region, the second region, and the third region, and
wherein, in the folded state of the electronic device, the first region faces the second region.

2. The electronic device according to claim 1,
wherein the display panel comprises a transistor comprising an oxide semiconductor layer, and
wherein the oxide semiconductor layer comprises indium, gallium, and zinc.

3. The electronic device according to claim 1, further comprising:
a first transistor provided in the display panel; and
a second transistor below the first transistor,
wherein the display panel comprises a transistor comprising an oxide semiconductor layer, and
wherein the oxide semiconductor layer comprises indium, gallium, and zinc.

4. The electronic device according to claim 1, further comprising:
a display region,
wherein the display panel comprises a transistor comprising an oxide semiconductor layer,
wherein the oxide semiconductor layer comprises indium, gallium, and zinc,
wherein the display region is visible, in the folded state of the electronic device, and
wherein the display region overlaps with the first region, in the folded state of the electronic device.

5. An electronic device comprising:
a first housing;
a second housing connected to the first housing via a hinge;
a first secondary battery provided in the first housing;
a second secondary battery provided in the second housing;
a display panel overlapping with the first housing and the second housing, the display panel comprising a transistor comprising an oxide semiconductor layer;
a touch sensor;
a plurality of magnets;
an antenna; and
a portion configured to wirelessly charge the first secondary battery,
wherein the oxide semiconductor layer comprises indium, gallium, and zinc,
wherein the display panel comprises a first region overlapping with the first housing and the first secondary battery, a second region overlapping with the second housing and the second secondary battery, and a third region between the first region and the second region,
wherein the third region is configured to bend, when the electronic device is folded,
wherein the third region does not overlap with the first secondary battery and the second secondary battery, in a folded state of the electronic device and in an opened state of the electronic device, wherein, in the folded state of the electronic device, the first secondary battery overlaps with the second secondary battery, wherein a size of the first secondary battery is larger than a size of the second secondary battery, wherein, in the opened state of the electronic device, the electronic device is configured to display an image in the first region, the second region, and the third region, wherein, in the folded state of the electronic device, the first region faces the second region, and wherein the first region is different in size than the second region.

6. An electronic device comprising:

a first housing;

a second housing connected to the first housing via a hinge;

a first secondary battery provided in the first housing;

a second secondary battery provided in the second housing;

a touch panel overlapping with the first housing and the second housing, the touch panel comprising a first transistor which comprises an oxide semiconductor layer;

a plurality of magnets;

an antenna; and a portion configured to wirelessly charge the first secondary battery, wherein the oxide semiconductor layer comprises indium, gallium, and zinc, wherein the oxide semiconductor layer comprises a channel formation region of the first transistor, wherein the touch panel comprises a first region overlapping with the first housing and the first secondary battery, a second region overlapping with the second housing and the second secondary battery, and a third region between the first region and the second region, wherein the third region is configured to bend, when the electronic device is folded, wherein the third region does not overlap with the first secondary battery and the second secondary battery, in a folded state of the electronic device and in an opened state of the electronic device, wherein, in the folded state of the electronic device, the first secondary battery overlaps with the second secondary battery, wherein a size of the first secondary battery is different from a size of the second secondary battery, wherein, in the opened state of the electronic device, the electronic device is configured to display an image in the first region, the second region, and the third region, wherein, in the folded state of the electronic device, the first region faces the second region, wherein, in the folded state of the electronic device, the first region, the second region, and the third region are not visible by a user, wherein, in the folded state of the electronic device, a space is present between the first housing and the second housing, wherein the first transistor is provided over a flexible base comprising an organic material and a barrier film comprising silicon, wherein the first transistor is electrically connected to a light-emitting element, and wherein a first insulating layer, a second insulating layer having a planarization function, and a third insulating layer having a planarization function are provided over the first transistor and below the light-emitting element.

7. The electronic device according to claim 6, further comprising:

a second transistor below the first transistor.

* * * * *